United States Patent
Ren et al.

(10) Patent No.: US 12,272,005 B2
(45) Date of Patent: Apr. 8, 2025

(54) SYSTEM AND METHOD OF THREE-DIMENSIONAL IMMERSIVE APPLICATIONS IN MULTI-USER COMMUNICATION SESSIONS

(71) Applicant: Apple Inc., Cupertino, CA (US)

(72) Inventors: Miao Ren, Sunnyvale, CA (US); Connor A. Smith, Sunnyvale, CA (US); Hayden J. Lee, Palo Alto, CA (US); Bruno M. Sommer, Shelby Township, MI (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 18/174,337

(22) Filed: Feb. 24, 2023

(65) Prior Publication Data

US 2023/0274504 A1    Aug. 31, 2023

Related U.S. Application Data

(60) Provisional application No. 63/268,679, filed on Feb. 28, 2022.

(51) Int. Cl.
*G06T 19/00* (2011.01)
*G06F 3/16* (2006.01)
(Continued)

(52) U.S. Cl.
CPC .............. *G06T 19/003* (2013.01); *G06F 3/16* (2013.01); *G06T 7/20* (2013.01); *G06T 13/40* (2013.01); *H04N 13/351* (2018.05)

(58) Field of Classification Search
CPC ..... G06T 19/006; G06T 19/003; G06T 13/40; G06T 2219/024; G06F 3/011; G06F 3/16;
(Continued)

(56) References Cited

U.S. PATENT DOCUMENTS 1,173,824 A    2/1916    Mckee
5,515,488 A    5/1996    Hoppe et al.
(Continued)

FOREIGN PATENT DOCUMENTS

CA    3033344 A1    2/2018
CN    104714771 A    6/2015
(Continued)

OTHER PUBLICATIONS

Corrected Notice of Allowability received for U.S. Appl. No. 18/154,757, mailed on Aug. 30, 2024, 2 pages.
(Continued)

*Primary Examiner* — Hau H Nguyen
(74) *Attorney, Agent, or Firm* — Kubota & Basol LLP

(57) ABSTRACT

Some examples of the disclosure are directed to selective display of avatars corresponding to users of electronic devices in a multi-user communication session. In some examples, when immersive content is shared in the communication session, the avatars remain displayed when presenting the content in the three-dimensional environment. In some examples, when perspective-limited immersive content is shared in the communication session, the avatars cease being displayed when presenting the content in the three-dimensional environment. In some examples, when content presented in a full-screen mode is shared in the communication session, the avatars remain displayed when presenting the content in the full-screen mode in the three-dimensional environment. In some examples, when object-bounded content is shared in the communication session, the avatars remain displayed when presenting the object-bounded content in the three-dimensional environment.

20 Claims, 21 Drawing Sheets

(51) Int. Cl.
  *G06T 7/20* (2017.01)
  *G06T 13/40* (2011.01)
  *H04N 13/351* (2018.01)

(58) Field of Classification Search
  CPC .............. G06F 3/04842; G06F 3/048; G06F 3/04815; G06F 3/0481; G09G 5/14; G09G 5/12; G09G 1/007; H04N 13/351
  See application file for complete search history.

(56) References Cited

U.S. PATENT DOCUMENTS

| | | |
|---|---|---|
| 5,524,195 A | 6/1996 | Clanton et al. |
| 5,610,828 A | 3/1997 | Kodosky et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,877,766 A | 3/1999 | Bates et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,108,004 A | 8/2000 | Medl |
| 6,112,015 A | 8/2000 | Planas et al. |
| 6,154,559 A | 11/2000 | Beardsley |
| 6,456,296 B1 | 9/2002 | Cataudella et al. |
| 6,584,465 B1 | 6/2003 | Zhu et al. |
| 6,756,997 B1 | 6/2004 | Ward et al. |
| 7,035,903 B1 | 4/2006 | Baldonado |
| 7,137,074 B1 | 11/2006 | Newton et al. |
| 7,230,629 B2 | 6/2007 | Reynolds et al. |
| 7,706,579 B2 | 4/2010 | Oijer |
| 8,593,558 B2 | 11/2013 | Gardiner et al. |
| 8,793,620 B2 | 7/2014 | Stafford |
| 8,803,873 B2 | 8/2014 | Yoo et al. |
| 8,805,690 B1 | 8/2014 | Lebeau et al. |
| 8,866,880 B2 | 10/2014 | Tan et al. |
| 8,896,632 B2 | 11/2014 | Macdougall et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,108,109 B2 | 8/2015 | Pare et al. |
| 9,185,062 B1 | 11/2015 | Yang et al. |
| 9,201,500 B2 | 12/2015 | Srinivasan et al. |
| 9,256,785 B2 | 2/2016 | Qvarfordt |
| 9,293,118 B2 | 3/2016 | Matsui |
| 9,400,559 B2 | 7/2016 | Latta et al. |
| 9,448,635 B2 | 9/2016 | Macdougall et al. |
| 9,448,687 B1 | 9/2016 | McKenzie et al. |
| 9,465,479 B2 | 10/2016 | Cho et al. |
| 9,491,374 B1 | 11/2016 | Avrahami et al. |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,681,112 B2 | 6/2017 | Son |
| 9,684,372 B2 | 6/2017 | Xun et al. |
| 9,734,402 B2 | 8/2017 | Jang et al. |
| 9,778,814 B2 | 10/2017 | Ambrus et al. |
| 9,851,866 B2 | 12/2017 | Goossens et al. |
| 9,886,087 B1 | 2/2018 | Wald et al. |
| 9,933,833 B2 | 4/2018 | Tu et al. |
| 9,934,614 B2 | 4/2018 | Ramsby et al. |
| 10,049,460 B2 | 8/2018 | Romano et al. |
| 10,203,764 B2 | 2/2019 | Katz et al. |
| 10,307,671 B2 | 6/2019 | Barney et al. |
| 10,353,532 B1 | 7/2019 | Holz et al. |
| 10,394,320 B2 | 8/2019 | George-Svahn et al. |
| 10,431,216 B1 | 10/2019 | Lemon et al. |
| 10,530,731 B1 | 1/2020 | Wu et al. |
| 10,534,439 B2 | 1/2020 | Raffa et al. |
| 10,664,048 B2 | 5/2020 | Cieplinski et al. |
| 10,664,050 B2 | 5/2020 | Alcaide et al. |
| 10,699,488 B1 | 6/2020 | Terrano |
| 10,701,661 B1 | 6/2020 | Coelho et al. |
| 10,732,721 B1 | 8/2020 | Clements |
| 10,754,434 B2 | 8/2020 | Hall et al. |
| 10,768,693 B2 | 9/2020 | Powderly et al. |
| 10,861,242 B2 | 12/2020 | Lacey et al. |
| 10,890,967 B2 | 1/2021 | Stellmach et al. |
| 10,956,724 B1 | 3/2021 | Terrano |
| 10,983,663 B2 | 4/2021 | Iglesias |
| 11,055,920 B1 | 7/2021 | Bramwell et al. |
| 11,079,995 B1 | 8/2021 | Hulbert et al. |
| 11,082,463 B2 | 8/2021 | Felman |
| 11,112,875 B1 | 9/2021 | Zhou et al. |
| 11,175,791 B1 | 11/2021 | Patnaikuni et al. |
| 11,199,898 B2 | 12/2021 | Blume et al. |
| 11,200,742 B1 | 12/2021 | Post et al. |
| 11,232,643 B1 | 1/2022 | Stevens et al. |
| 11,294,472 B2 | 4/2022 | Tang et al. |
| 11,294,475 B1 | 4/2022 | Pinchon et al. |
| 11,307,653 B1 | 4/2022 | Qian et al. |
| 11,340,756 B2 | 5/2022 | Faulkner et al. |
| 11,348,300 B2 | 5/2022 | Zimmermann et al. |
| 11,461,973 B2 | 10/2022 | Pinchon |
| 11,496,571 B2 | 11/2022 | Berliner et al. |
| 11,573,363 B2 | 2/2023 | Zou et al. |
| 11,574,452 B2 | 2/2023 | Berliner et al. |
| 11,720,171 B2 | 8/2023 | Pastrana Vicente et al. |
| 11,726,577 B2 | 8/2023 | Katz |
| 11,733,824 B2 | 8/2023 | Iskandar et al. |
| 11,762,457 B1 | 9/2023 | Ikkai et al. |
| 12,099,653 B2 | 9/2024 | Chawda et al. |
| 12,099,695 B1 | 9/2024 | Smith et al. |
| 12,113,948 B1 | 10/2024 | Smith et al. |
| 12,118,200 B1 | 10/2024 | Shutzberg et al. |
| 2001/0047250 A1 | 11/2001 | Schuller et al. |
| 2002/0044152 A1 | 4/2002 | Abbott et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0243926 A1 | 12/2004 | Trenbeath et al. |
| 2005/0073136 A1 | 4/2005 | Larsson et al. |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0198143 A1 | 9/2005 | Moody et al. |
| 2005/0216866 A1 | 9/2005 | Rosen et al. |
| 2006/0080702 A1 | 4/2006 | Diez et al. |
| 2006/0283214 A1 | 12/2006 | Donadon et al. |
| 2008/0211771 A1 | 9/2008 | Richardson |
| 2009/0064035 A1 | 3/2009 | Shibata et al. |
| 2009/0164219 A1 | 6/2009 | Yeung et al. |
| 2009/0231356 A1 | 9/2009 | Barnes et al. |
| 2010/0097375 A1 | 4/2010 | Tadaishi et al. |
| 2010/0150526 A1 | 6/2010 | Rose et al. |
| 2010/0188503 A1 | 7/2010 | Tsai et al. |
| 2011/0018895 A1 | 1/2011 | Buzyn et al. |
| 2011/0018896 A1 | 1/2011 | Buzyn et al. |
| 2011/0169927 A1 | 7/2011 | Mages et al. |
| 2011/0216060 A1 | 9/2011 | Weising et al. |
| 2011/0254865 A1 | 10/2011 | Yee et al. |
| 2011/0310001 A1 | 12/2011 | Madau et al. |
| 2012/0086624 A1 | 4/2012 | Thompson et al. |
| 2012/0113223 A1 | 5/2012 | Hilliges et al. |
| 2012/0151416 A1 | 6/2012 | Bell et al. |
| 2012/0170840 A1 | 7/2012 | Caruso et al. |
| 2012/0218395 A1 | 8/2012 | Andersen et al. |
| 2012/0256967 A1 | 10/2012 | Baldwin et al. |
| 2012/0257035 A1 | 10/2012 | Larsen |
| 2012/0272179 A1 | 10/2012 | Stafford |
| 2012/0290401 A1 | 11/2012 | Neven |
| 2013/0127850 A1 | 5/2013 | Bindon |
| 2013/0169533 A1 | 7/2013 | Jahnke |
| 2013/0211843 A1 | 8/2013 | Clarkson |
| 2013/0222410 A1 | 8/2013 | Kameyama et al. |
| 2013/0229345 A1 | 9/2013 | Day et al. |
| 2013/0265227 A1 | 10/2013 | Julian |

(56) References Cited

U.S. PATENT DOCUMENTS

| | | |
|---|---|---|
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0326364 A1 | 12/2013 | Latta et al. |
| 2013/0335301 A1 | 12/2013 | Wong et al. |
| 2013/0342564 A1 | 12/2013 | Kinnebrew et al. |
| 2013/0342570 A1 | 12/2013 | Kinnebrew et al. |
| 2014/0002338 A1 | 1/2014 | Raffa et al. |
| 2014/0024324 A1 | 1/2014 | Mumick |
| 2014/0028548 A1 | 1/2014 | Bychkov et al. |
| 2014/0075361 A1 | 3/2014 | Reynolds et al. |
| 2014/0108942 A1 | 4/2014 | Freeman et al. |
| 2014/0125584 A1 | 5/2014 | Xun et al. |
| 2014/0125585 A1 | 5/2014 | Song et al. |
| 2014/0164928 A1 | 6/2014 | Kim |
| 2014/0168267 A1 | 6/2014 | Kim et al. |
| 2014/0198017 A1 | 7/2014 | Lamb et al. |
| 2014/0232639 A1 | 8/2014 | Hayashi et al. |
| 2014/0247208 A1 | 9/2014 | Henderek et al. |
| 2014/0258942 A1 | 9/2014 | Kutliroff et al. |
| 2014/0282272 A1 | 9/2014 | Kies et al. |
| 2014/0320404 A1 | 10/2014 | Kasahara |
| 2014/0347391 A1 | 11/2014 | Keane et al. |
| 2014/0351753 A1 | 11/2014 | Shin et al. |
| 2014/0372957 A1 | 12/2014 | Keane et al. |
| 2014/0375541 A1 | 12/2014 | Nister et al. |
| 2015/0035822 A1 | 2/2015 | Arsan et al. |
| 2015/0035832 A1 | 2/2015 | Sugden et al. |
| 2015/0042679 A1 | 2/2015 | Järvenpää |
| 2015/0067580 A1 | 3/2015 | Um et al. |
| 2015/0123890 A1 | 5/2015 | Kapur et al. |
| 2015/0131850 A1 | 5/2015 | Qvarfordt |
| 2015/0135108 A1 | 5/2015 | Pope et al. |
| 2015/0169506 A1 | 6/2015 | Leventhal et al. |
| 2015/0177937 A1 | 6/2015 | Poletto et al. |
| 2015/0187093 A1 | 7/2015 | Chu et al. |
| 2015/0205106 A1 | 7/2015 | Norden |
| 2015/0220152 A1 | 8/2015 | Tait et al. |
| 2015/0227285 A1 | 8/2015 | Lee et al. |
| 2015/0242095 A1 | 8/2015 | Sonnenberg |
| 2015/0255067 A1 | 9/2015 | White et al. |
| 2015/0287403 A1 | 10/2015 | Holzer Zaslansky et al. |
| 2015/0317832 A1 | 11/2015 | Ebstyne et al. |
| 2015/0331576 A1 | 11/2015 | Piya et al. |
| 2015/0332091 A1 | 11/2015 | Kim et al. |
| 2015/0350141 A1 | 12/2015 | Yang et al. |
| 2015/0370323 A1 | 12/2015 | Cieplinski et al. |
| 2016/0012642 A1 | 1/2016 | Lee et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0026242 A1 | 1/2016 | Burns et al. |
| 2016/0026253 A1 | 1/2016 | Bradski et al. |
| 2016/0041391 A1 | 2/2016 | Van et al. |
| 2016/0062636 A1 | 3/2016 | Jung et al. |
| 2016/0093108 A1 | 3/2016 | Mao et al. |
| 2016/0098094 A1 | 4/2016 | Minkkinen |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0193104 A1 | 7/2016 | Du |
| 2016/0196692 A1 | 7/2016 | Kjallstrom et al. |
| 2016/0239165 A1 | 8/2016 | Chen et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0306434 A1 | 10/2016 | Ferrin |
| 2016/0309081 A1 | 10/2016 | Frahm et al. |
| 2016/0313890 A1 | 10/2016 | Walline et al. |
| 2016/0350973 A1 | 12/2016 | Shapira et al. |
| 2016/0379409 A1 | 12/2016 | Gavriliuc et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0046872 A1 | 2/2017 | Geselowitz et al. |
| 2017/0060230 A1 | 3/2017 | Faaborg et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0146801 A1 | 5/2017 | Stempora |
| 2017/0148339 A1 | 5/2017 | Van Curen et al. |
| 2017/0153866 A1 | 6/2017 | Grinberg et al. |
| 2017/0206691 A1 | 7/2017 | Harrises et al. |
| 2017/0212583 A1 | 7/2017 | Krasadakis |
| 2017/0228130 A1 | 8/2017 | Palmaro |
| 2017/0236332 A1 | 8/2017 | Kipman et al. |
| 2017/0285737 A1 | 10/2017 | Khalid et al. |
| 2017/0287225 A1 | 10/2017 | Powderly et al. |
| 2017/0315715 A1 | 11/2017 | Fujita et al. |
| 2017/0344223 A1 | 11/2017 | Holzer et al. |
| 2017/0357390 A1 | 12/2017 | Alonso Ruiz et al. |
| 2017/0358141 A1 | 12/2017 | Stafford et al. |
| 2017/0364198 A1 | 12/2017 | Yoganandan et al. |
| 2018/0024681 A1 | 1/2018 | Bernstein et al. |
| 2018/0045963 A1 | 2/2018 | Hoover et al. |
| 2018/0075658 A1 | 3/2018 | Lanier et al. |
| 2018/0081519 A1 | 3/2018 | Kim |
| 2018/0095634 A1 | 4/2018 | Alexander |
| 2018/0095635 A1 | 4/2018 | Valdivia et al. |
| 2018/0095649 A1 | 4/2018 | Valdivia et al. |
| 2018/0101223 A1 | 4/2018 | Ishihara et al. |
| 2018/0114364 A1 | 4/2018 | Mcphee et al. |
| 2018/0150204 A1 | 5/2018 | MacGillivray |
| 2018/0150997 A1 | 5/2018 | Austin |
| 2018/0158222 A1 | 6/2018 | Hayashi |
| 2018/0181199 A1 | 6/2018 | Harvey et al. |
| 2018/0181272 A1 | 6/2018 | Olsson et al. |
| 2018/0188802 A1 | 7/2018 | Okumura |
| 2018/0210628 A1 | 7/2018 | Mcphee et al. |
| 2018/0239144 A1 | 8/2018 | Woods et al. |
| 2018/0275753 A1 | 9/2018 | Publicover et al. |
| 2018/0288206 A1 | 10/2018 | Stimpson et al. |
| 2018/0300023 A1 | 10/2018 | Hein |
| 2018/0315248 A1 | 11/2018 | Bastov et al. |
| 2018/0322701 A1 | 11/2018 | Pahud et al. |
| 2018/0348861 A1 | 12/2018 | Uscinski et al. |
| 2019/0012060 A1 | 1/2019 | Moore et al. |
| 2019/0018498 A1 | 1/2019 | West et al. |
| 2019/0034076 A1 | 1/2019 | Vinayak et al. |
| 2019/0050062 A1 | 2/2019 | Chen et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0101991 A1 | 4/2019 | Brennan |
| 2019/0130633 A1 | 5/2019 | Haddad et al. |
| 2019/0130733 A1 | 5/2019 | Hodge |
| 2019/0146128 A1 | 5/2019 | Cao et al. |
| 2019/0172261 A1 | 6/2019 | Alt et al. |
| 2019/0204906 A1 | 7/2019 | Ross et al. |
| 2019/0227763 A1 | 7/2019 | Kaufthal |
| 2019/0251884 A1 | 8/2019 | Burns et al. |
| 2019/0258365 A1 | 8/2019 | Zurmoehle et al. |
| 2019/0279407 A1 | 9/2019 | Mchugh et al. |
| 2019/0294312 A1 | 9/2019 | Rohrbacher |
| 2019/0310757 A1 | 10/2019 | Lee et al. |
| 2019/0324529 A1 | 10/2019 | Stellmach et al. |
| 2019/0333278 A1 | 10/2019 | Palangie et al. |
| 2019/0339770 A1 | 11/2019 | Kurlethimar et al. |
| 2019/0346678 A1 | 11/2019 | Nocham |
| 2019/0346922 A1 | 11/2019 | Young et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0370492 A1 | 12/2019 | Falchuk et al. |
| 2019/0371072 A1 | 12/2019 | Lindberg et al. |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2020/0004401 A1 | 1/2020 | Hwang et al. |

(56) References Cited

U.S. PATENT DOCUMENTS

| | | |
|---|---|---|
| 2020/0012341 A1 | 1/2020 | Stellmach et al. |
| 2020/0026349 A1 | 1/2020 | Fontanel et al. |
| 2020/0043243 A1 | 2/2020 | Bhushan et al. |
| 2020/0082602 A1 | 3/2020 | Jones |
| 2020/0089314 A1 | 3/2020 | Poupyrev et al. |
| 2020/0098140 A1 | 3/2020 | Jagnow et al. |
| 2020/0098173 A1 | 3/2020 | Mccall |
| 2020/0117213 A1 | 4/2020 | Tian et al. |
| 2020/0126291 A1 | 4/2020 | Nguyen et al. |
| 2020/0128232 A1 | 4/2020 | Hwang et al. |
| 2020/0129850 A1 | 4/2020 | Ohashi |
| 2020/0159017 A1 | 5/2020 | Lin et al. |
| 2020/0225735 A1 | 7/2020 | Schwarz |
| 2020/0225746 A1 | 7/2020 | Bar-zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0322178 A1 | 10/2020 | Wang et al. |
| 2020/0322575 A1 | 10/2020 | Valli |
| 2020/0356221 A1 | 11/2020 | Behzadi et al. |
| 2020/0357374 A1 | 11/2020 | Verweij et al. |
| 2020/0371673 A1 | 11/2020 | Faulkner |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0410960 A1 | 12/2020 | Saito et al. |
| 2021/0074062 A1 | 3/2021 | Madonna et al. |
| 2021/0090337 A1 | 3/2021 | Ravasz et al. |
| 2021/0096726 A1 | 4/2021 | Faulkner et al. |
| 2021/0097776 A1 | 4/2021 | Faulkner et al. |
| 2021/0125414 A1 | 4/2021 | Berkebile |
| 2021/0191600 A1 | 6/2021 | Lemay et al. |
| 2021/0286502 A1 | 9/2021 | Lemay et al. |
| 2021/0295602 A1 | 9/2021 | Scapel et al. |
| 2021/0303074 A1 | 9/2021 | Vanblon et al. |
| 2021/0312684 A1 | 10/2021 | Zimmermann et al. |
| 2021/0319617 A1 | 10/2021 | Ahn et al. |
| 2021/0327140 A1 | 10/2021 | Rothkopf et al. |
| 2021/0339134 A1 | 11/2021 | Knoppert |
| 2021/0350564 A1 | 11/2021 | Peuhkurinen et al. |
| 2021/0352172 A1 | 11/2021 | Kim et al. |
| 2021/0365108 A1 | 11/2021 | Burns et al. |
| 2021/0368136 A1 | 11/2021 | Chalmers et al. |
| 2021/0375022 A1 | 12/2021 | Lee et al. |
| 2022/0011855 A1 | 1/2022 | Hazra et al. |
| 2022/0012002 A1 | 1/2022 | Bar-zeev et al. |
| 2022/0030197 A1 | 1/2022 | Ishimoto |
| 2022/0070241 A1 | 3/2022 | Yerli |
| 2022/0083197 A1 | 3/2022 | Rockel et al. |
| 2022/0092862 A1 | 3/2022 | Faulkner et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121275 A1 | 4/2022 | Balaji et al. |
| 2022/0121344 A1 | 4/2022 | Pastrana Vicente et al. |
| 2022/0130107 A1 | 4/2022 | Lindh |
| 2022/0137705 A1 | 5/2022 | Hashimoto et al. |
| 2022/0155853 A1 | 5/2022 | Fan et al. |
| 2022/0155909 A1 | 5/2022 | Kawashima et al. |
| 2022/0157083 A1 | 5/2022 | Jandhyala et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0245888 A1 | 8/2022 | Singh et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0319453 A1 | 10/2022 | Llull et al. |
| 2022/0326837 A1 | 10/2022 | Dessero et al. |
| 2022/0350463 A1 | 11/2022 | Walkin et al. |
| 2022/0413691 A1 | 12/2022 | Becker et al. |
| 2022/0414999 A1 | 12/2022 | Ravasz et al. |
| 2023/0004216 A1 | 1/2023 | Rodgers et al. |
| 2023/0008537 A1 | 1/2023 | Henderson et al. |
| 2023/0021861 A1 | 1/2023 | Fujiwara et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0086766 A1 | 3/2023 | Olwal et al. |
| 2023/0092282 A1 | 3/2023 | Boesel et al. |
| 2023/0093979 A1 | 3/2023 | Stauber et al. |
| 2023/0094522 A1 | 3/2023 | Stauber et al. |
| 2023/0100689 A1 | 3/2023 | Chiu et al. |
| 2023/0133579 A1 | 5/2023 | Chang et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168788 A1 | 6/2023 | Faulkner et al. |
| 2023/0185426 A1 | 6/2023 | Rockel et al. |
| 2023/0186577 A1 | 6/2023 | Rockel et al. |
| 2023/0206921 A1 | 6/2023 | Edelsburg et al. |
| 2023/0244857 A1 | 8/2023 | Weiss et al. |
| 2023/0273706 A1 | 8/2023 | Smith et al. |
| 2023/0308610 A1 | 9/2023 | Henderson et al. |
| 2023/0315270 A1 | 10/2023 | Hylak et al. |
| 2023/0315385 A1 | 10/2023 | Akmal et al. |
| 2023/0316634 A1 | 10/2023 | Chiu et al. |
| 2023/0316658 A1 | 10/2023 | Smith et al. |
| 2023/0325004 A1 | 10/2023 | Burns et al. |
| 2023/0333646 A1 | 10/2023 | Pastrana Vicente et al. |
| 2023/0350539 A1 | 11/2023 | Owen et al. |
| 2023/0359199 A1 | 11/2023 | Adachi et al. |
| 2023/0384907 A1 | 11/2023 | Boesel et al. |
| 2023/0388357 A1 | 11/2023 | Faulkner et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094882 A1 | 3/2024 | Brewer et al. |
| 2024/0095984 A1 | 3/2024 | Ren et al. |
| 2024/0103613 A1 | 3/2024 | Chawda et al. |
| 2024/0103676 A1 | 3/2024 | Pastrana Vicente et al. |
| 2024/0103684 A1 | 3/2024 | Yu et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104873 A1 | 3/2024 | Pastrana Vicente et al. |
| 2024/0104877 A1 | 3/2024 | Henderson et al. |
| 2024/0111479 A1 | 4/2024 | Paul |
| 2024/0119682 A1 | 4/2024 | Rudman et al. |
| 2024/0221291 A1 | 7/2024 | Henderson et al. |
| 2024/0256032 A1 | 8/2024 | Holder et al. |
| 2024/0272782 A1 | 8/2024 | Pastrana Vicente et al. |
| 2024/0291953 A1 | 8/2024 | Cerra et al. |
| 2024/0302948 A1 | 9/2024 | Hylak et al. |
| 2024/0310971 A1 | 9/2024 | Kawashima et al. |
| 2024/0361835 A1 | 10/2024 | Hylak et al. |
| 2024/0361901 A1 | 10/2024 | Ravasz et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0404206 A1 | 12/2024 | Chiu et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |

FOREIGN PATENT DOCUMENTS

| | | |
|---|---|---|
| CN | 105264461 A | 1/2016 |
| CN | 105264478 A | 1/2016 |
| CN | 106575149 A | 4/2017 |
| CN | 108633307 A | 10/2018 |
| CN | 110476142 A | 11/2019 |
| CN | 110543230 A | 12/2019 |

(56) References Cited

FOREIGN PATENT DOCUMENTS

| | | |
|---|---|---|
| CN | 110673718 A | 1/2020 |
| CN | 111641843 A | 9/2020 |
| CN | 109491508 B | 8/2022 |
| EP | 2741175 A2 | 6/2014 |
| EP | 2947545 A1 | 11/2015 |
| EP | 3088997 A1 | 11/2016 |
| EP | 3249497 A1 | 11/2017 |
| EP | 3316075 A1 | 5/2018 |
| EP | 3451135 A1 | 3/2019 |
| EP | 3503101 A1 | 6/2019 |
| EP | 3570144 A1 | 11/2019 |
| EP | 3588255 A1 | 1/2020 |
| EP | 3654147 A1 | 5/2020 |
| JP | H10-51711 A | 2/1998 |
| JP | H1078845 A | 3/1998 |
| JP | 2005-215144 A | 8/2005 |
| JP | 2005333524 A | 12/2005 |
| JP | 2006-146803 A | 6/2006 |
| JP | 2006-295236 A | 10/2006 |
| JP | 2012-234550 A | 11/2012 |
| JP | 2013-196158 A | 9/2013 |
| JP | 2013-254358 A | 12/2013 |
| JP | 2013-257716 A | 12/2013 |
| JP | 2014-059840 A | 4/2014 |
| JP | 2014071663 A | 4/2014 |
| JP | 2014-099184 A | 5/2014 |
| JP | 2014-514652 A | 6/2014 |
| JP | 2015-515040 A | 5/2015 |
| JP | 2015-118332 A | 6/2015 |
| JP | 2016-096513 A | 5/2016 |
| JP | 2016-194744 A | 11/2016 |
| JP | 2017-027206 A | 2/2017 |
| JP | 2017-58528 A | 3/2017 |
| JP | 2018-005516 A | 1/2018 |
| JP | 2018-5517 A | 1/2018 |
| JP | 2018-106499 A | 7/2018 |
| JP | 6438869 B2 | 12/2018 |
| JP | 2019-169154 A | 10/2019 |
| JP | 2019-175449 A | 10/2019 |
| JP | 2022-053334 A | 4/2022 |
| JP | 2024503899 A | 1/2024 |
| KR | 20110017236 A | 2/2011 |
| KR | 10-2016-0012139 A | 2/2016 |
| KR | 10-2019-0100957 A | 8/2019 |
| WO | 2010/026519 A1 | 3/2010 |
| WO | 2012145180 A1 | 10/2012 |
| WO | 2015/130150 A1 | 9/2015 |
| WO | 2015/192117 A1 | 12/2015 |
| WO | 2017088487 A1 | 6/2017 |
| WO | 2018175735 A1 | 9/2018 |
| WO | 2019/067902 A1 | 4/2019 |
| WO | 2019/142560 A1 | 7/2019 |
| WO | 2019/217163 A1 | 11/2019 |
| WO | 2020/066682 A1 | 4/2020 |
| WO | 2020/247256 A1 | 12/2020 |
| WO | 2021173839 A1 | 9/2021 |
| WO | 2021/202783 A1 | 10/2021 |
| WO | 2022/046340 A1 | 3/2022 |
| WO | 2022/055822 A1 | 3/2022 |
| WO | 2022/066399 A1 | 3/2022 |
| WO | 2022/066535 A2 | 3/2022 |
| WO | 2022/146936 A1 | 7/2022 |
| WO | 2022/146938 A1 | 7/2022 |
| WO | 2022/147146 A1 | 7/2022 |
| WO | 2022/164881 A1 | 8/2022 |
| WO | 2022/225795 A1 | 10/2022 |
| WO | 2023096940 A2 | 6/2023 |
| WO | 2023/141535 A1 | 7/2023 |

OTHER PUBLICATIONS

Corrected Notice of Allowability received for U.S. Appl. No. 18/421,827, mailed on Aug. 29, 2024, 2 pages.
Corrected Notice of Allowability received for U.S. Appl. No. 18/463,739, mailed on Oct. 4, 2024, 2 pages.
European Search Report received for European Patent Application No. 21801378.7, mailed on Jul. 10, 2024, 5 pages.
Extended European Search Report received for European Patent Application No. 24159868.9, mailed on Oct. 9, 2024, 13 pages.
Extended European Search Report received for European Patent Application No. 24179830.5, mailed on Nov. 5, 2024, 11 Pages.
Final Office Action received for U.S. Appl. No. 18/182,300, mailed on Oct. 31, 2024, 34 pages.
Final Office Action received for U.S. Appl. No. 18/375,280, mailed on Jul. 12, 2024, 19 pages.
International Search Report received for PCT Patent Application No. PCT/US2024/013602, mailed on Apr. 29, 2024, 4 pages.
International Search Report received for PCT Patent Application No. PCT/US2024/026102, mailed on Aug. 26, 2024, 5 pages.
Non-Final Office Action received for U.S. Appl. No. 17/580,495, mailed on Aug. 15, 2024, 28 pages.
Non-Final Office Action received for U.S. Appl. No. 18/327,318, mailed on Sep. 16, 2024, 13 pages.
Notice of Allowance received for U.S. Appl. No. 18/154,757, mailed on Aug. 26, 2024, 12 pages.
Notice of Allowance received for U.S. Appl. No. 17/448,875, mailed on Jul. 12, 2024, 8 pages.
Notice of Allowance received for U.S. Appl. No. 17/932,999, mailed on Sep. 12, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
AquaSnap Window Manager: dock, snap, tile, organize [online], Nurgo Software, Available online at: <https://www.nurgo-software.com/products/aquasnap>, [retrieved on Jun. 27, 2023], 5 pages.
Corrected Notice of Allowability received for U.S. Appl. No. 17/448,875, mailed on Apr. 24, 2024, 4 pages.
Corrected Notice of Allowability received for U.S. Appl. No. 17/479,791, mailed on May 19, 2023, 2 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowability received for U.S. Appl. No. 18/465,098, mailed on Mar. 13, 2024, 3 pages.
Corrected Notice of Allowance received for U.S. Appl. No. 17/478,593, mailed on Dec. 21, 2022, 2 pages.
European Search Report received for European Patent Application No. 21791153.6, mailed on Mar. 22, 2024, 5 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Extended European Search Report received for European Patent Application No. 23197572.3, mailed on Feb. 19, 2024, 7 pages.
Final Office Action received for U.S. Appl. No. 17/448,875, mailed on Mar. 16, 2023, 24 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 18/182,300, mailed on Feb. 16, 2024, 32 pages.
Home | Virtual Desktop [online], Virtual Desktop, Available online at: <https://www.vrdesktop.net>, [retrieved on Jun. 29, 2023], 4 pages.
International Search Report for PCT Application No. PCT/US2022/076608, mailed Feb. 24, 2023, 8 pages.
International Search Report received for PCT Application No. PCT/US2022/076603, mailed on Jan. 9, 2023, 4 pages.
International Search Report received for PCT Application No. PCT/US2022/076719, mailed on Mar. 3, 2023, 8 pages.
International Search Report received for PCT Application No. PCT/US2023/017335, mailed on Aug. 22, 2023, 6 pages.
International Search Report received for PCT Application No. PCT/US2023/018213, mailed on Jul. 26, 2023, 6 pages.

(56) References Cited

OTHER PUBLICATIONS

Search Report received for PCT Application No. PCT/US2023/019458, mailed on Aug. 8, 2023, 7 pages.
Search Report received for PCT Application No. PCT/US2023/060943, mailed on Jun. 6, 2023, 7 pages.
Search Report received for PCT Patent Application No. PCT/US2021/049130, mailed on Dec. 7, 2021, 4 pages.
Search Report received for PCT Patent Application No. PCT/US2021/049131, mailed on Dec. 21, 2021, 4 pages.
Search Report received for PCT Patent Application No. PCT/US2021/050948, mailed on Mar. 4, 2022, 6 pages.
Search Report received for PCT Patent Application No. PCT/US2021/065240, mailed on May 23, 2022, 6 pages.
Search Report received for PCT Patent Application No. PCT/US2021/071518, mailed on Feb. 25, 2022, 7 pages.
Search Report received for PCT Patent Application No. PCT/US2021/071595, mailed on Mar. 17, 2022, 7 pages.
Search Report received for PCT Patent Application No. PCT/US2021/071596, mailed on Apr. 8, 2022, 7 pages.
Search Report received for PCT Patent Application No. PCT/US2022/013208, mailed on Apr. 26, 2022, 7 pages.
Search Report received for PCT Patent Application No. PCT/US2022/071704, mailed on Aug. 26, 2022, 6 pages.
Search Report received for PCT Patent Application No. PCT/US2023/074257, mailed on Nov. 21, 2023, 5 pages.
Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
International Search Report received for PCT Patent Application No. PCT/US2021/065242, mailed on Apr. 4, 2022, 3 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/479,791, mailed on May 11, 2022, 18 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/305,201, mailed on May 23, 2024, 11 pages.
Non-Final Office Action received for U.S. Appl. No. 18/336,770, mailed on Jun. 5, 2024, 12 pages.
Notice of Allowance received for U.S. Appl. No. 17/448,875, mailed on Apr. 17, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/650,775, mailed on Jan. 25, 2024, 10 pages.
Notice of Allowance received for U.S. Appl. No. 17/650,775, mailed on Sep. 18, 2023, 10 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 17/933,707, mailed on Jun. 28, 2024, 8 pages.
Notice of Allowance received for U.S. Appl. No. 17/933,707, mailed on Mar. 6, 2024, 9 pages.
Notice of Allowance received for U.S. Appl. No. 18/154,757, mailed on Jan. 23, 2024, 10 pages.
Notice of Allowance received for U.S. Appl. No. 18/154,757, mailed on May 10, 2024, 12 pages.
Notice of Allowance received for U.S. Appl. No. 18/182,304, mailed on Jan. 24, 2024, 9 pages.
Notice of Allowance received for U.S. Appl. No. 18/182,304, mailed on Oct. 2, 2023, 9 pages.
Notice of Allowance received for U.S. Appl. No. 18/421,675, mailed on Apr. 11, 2024, 9 pages.
Notice of Allowance received for U.S. Appl. No. 18/423,187, mailed on Jun. 5, 2024, 9 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Restriction Requirement received for U.S. Appl. No. 17/932,999, mailed on Oct. 3, 2023, 6 pages.
Search Report received for Chinese Patent Application No. 202310873465.7, mailed on Feb. 1, 2024, 5 pages (2 pages of English Translation and 3 pages of Official Copy).
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bolt et al., "Two-Handed Gesture in Multi-Modal Natural Dialog", Uist '92, 5th Annual Symposium on User Interface Software and Technology. Proceedings of the ACM Symposium on User Interface Software and Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Camalich Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.
Chatterjee et al., "Gaze+Gesture: Expressive, Precise and Targeted Free-Space Interactions", ICMI '15, Nov. 9-13, 2015, 8 pages.
Lin et al., "Towards Naturally Grabbing and Moving Objects in VR", IS&T International Symposium on Electronic Imaging and The Engineering Reality of Virtual Reality, 2016, 6 pages.

(56) References Cited

OTHER PUBLICATIONS

McGill et al., "Expanding the Bounds of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer et al., "Gaze + Pinch Interaction in Virtual Reality", In Proceedings of SUI '17, Brighton, United Kingdom, Oct. 16-17, 2017, pp. 99-108.
Simple Modal Window With Background Blur Effect, Available online at: <http://web.archive.org/web/20160313233427/https://www.cssscript.com/simple-modal-window-with-background-blur-effect/>, Mar. 13, 2016, 5 pages.
Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html>[Search Date Aug. 22, 2023], Sep. 20, 2021, 8 pages (1 page of English Abstract and 7 pages of Official Copy).
Corrected Notice of Allowability received for U.S. Appl. No. 17/935,095, mailed on Oct. 18, 2024, 3 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24179233.2, mailed on Oct. 2, 2024, 10 pages.
Final Office Action received for U.S. Appl. No. 17/202,034, mailed on Nov. 4, 2024, 50 pages.
Final Office Action received for U.S. Appl. No. 17/935,095, mailed on Dec. 29, 2023, 15 pages.
Final Office Action received for U.S. Appl. No. 18/157,040, mailed on Dec. 2, 2024, 25 pages.
Final Office Action received for U.S. Appl. No. 18/473,196, mailed on Dec. 6, 2024, 22 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Application No. PCT/US2024/032451, mailed on Nov. 15, 2024, 6 pages.
International Search Report received for PCT Application No. PCT/US2024/032456, mailed on Nov. 14, 2024, 6 pages.
International Search Report received for PCT Patent Application No. PCT/US2022/076985, mailed on Feb. 20, 2023, 5 pages.
International Search Report received for PCT Patent Application No. PCT/US2023/074793, mailed on Feb. 6, 2024, 6 pages.
Non-Final Office Action received for U.S. Appl. No. 17/935,095, mailed on Jun. 22, 2023, 15 pages.
Non-Final Office Action received for U.S. Appl. No. 18/322,469, mailed on Nov. 15, 2024, 34 pages.
Non-Final Office Action received for U.S. Appl. No. 18/375,280, mailed on Nov. 27, 2024, 17 pages.
Non-Final Office Action received for U.S. Appl. No. 18/473,196, mailed on Aug. 16, 2024, 21 pages.
Notice of Allowance received for U.S. Appl. No. 17/935,095, mailed on Jul. 3, 2024, 9 pages.
Notice of Allowance received for U.S. Appl. No. 18/154,697, mailed on Aug. 6, 2024, 8 pages.
Notice of Allowance received for U.S. Appl. No. 18/154,697, mailed on Dec. 3, 2024, 7 pages.
Notice of Allowance received for U.S. Appl. No. 18/336,770, mailed on Nov. 29, 2024, 9 pages.
Notice of Allowance received for U.S. Appl. No. 18/515,188, mailed on Nov. 27, 2024, 9 pages.
Supplemental Notice of Allowance received for U.S. Appl. No. 18/515,188, mailed on Dec. 12, 2024, 2 pages.
Pfeuffer, et al., "Gaze and Touch Interaction on Tablets", UIST '16, Tokyo, Japan, ACM, Oct. 16-19, 2016, pp. 301-311.
Schenk, et al., "SPOCK: A Smooth Pursuit Oculomotor Control Kit", CHI'16 Extended Abstracts, San Jose, CA, USA, ACM, May 7-12, 2016, pp. 2681-2687.

SYSTEM AND METHOD OF THREE-DIMENSIONAL IMMERSIVE APPLICATIONS IN MULTI-USER COMMUNICATION SESSIONS

CROSS-REFERENCE TO RELATED APPLICATIONS

This application claims the benefit of U.S. Provisional Application No. 63/268,679, filed Feb. 28, 2022, the content of which is incorporated herein by reference in its entirety for all purposes.

FIELD OF THE DISCLOSURE

This relates generally to systems and methods of three-dimensional immersive applications in multi-user communication sessions.

BACKGROUND OF THE DISCLOSURE

Some computer graphical environments provide two-dimensional and/or three-dimensional environments where at least some objects displayed for a user's viewing are virtual and generated by a computer. In some examples, the three-dimensional environments are presented by multiple devices communicating in a multi-user communication session. In some examples, an avatar (e.g., a representation) of each user participating in the multi-user communication session (e.g., via the computing devices) is displayed in the three-dimensional environment of the multi-user communication session. In some examples, content can be shared in the three-dimensional environment for viewing and interaction by multiple users participating in the multi-user communication session.

SUMMARY OF THE DISCLOSURE

Some examples of the disclosure are directed to systems and methods for sharing and presenting content in a three-dimensional environment that includes one or more avatars corresponding to one or more users of one or more electronic devices in a multi-user communication session. In some examples, a first electronic device and a second electronic device are communicatively linked in a multi-user communication session, wherein the first electronic device and the second electronic device are configured to display a three-dimensional environment, respectively. In some examples, the first electronic device displays an avatar corresponding to a user of the second electronic device in the three-dimensional environment, and the second electronic device displays an avatar corresponding to a user of the first electronic device in the three-dimensional environment. In some examples, an audio corresponding to a voice of the user of the first electronic device and the second electronic device, respectively, is presented with the avatar in the multi-user communication session. In some examples, the first electronic device and the second electronic device may share and present content in the three-dimensional environment. In some examples, depending on a type of content shared in the three-dimensional environment, the first electronic device and the second electronic device selectively maintain display of the avatar when presenting the content in the three-dimensional environment.

In some examples, when content of a first type (e.g., immersive content corresponding to a three-dimensional scene/environment) is shared between the first electronic device and the second electronic device, the avatars corresponding to the users of the first electronic device and the second electronic device remain displayed when presenting the content in the three-dimensional environment. In some examples, when content of a second type (e.g., immersive content corresponding to a three-dimensional representation of video) is shared between the first electronic device and the second electronic device, the avatars corresponding to the users of the first electronic device and the second electronic device cease being displayed when presenting the content in the three-dimensional environment. In some such examples, audio corresponding to the voices of the users of the first electronic device and the second electronic device remain presented when the avatars are no longer displayed. In some examples, when content of a third type (e.g., two-dimensional content corresponding to a two-dimensional representation of a video, image, or other content) is shared between the first electronic device and the second electronic device, the avatars corresponding to the users of the first electronic device and the second electronic device remain displayed when presenting the content in a full-screen mode in the three-dimensional environment. In some examples, when content of a fourth type (e.g., two-dimensional content displayed in a virtual object corresponding to an application window) is shared between the first electronic device and the second electronic device, avatars corresponding to the users of the first electronic device and the second electronic device remain displayed when presenting the content in the virtual object in the three-dimensional environment.

In some examples, while the first electronic device and the second electronic device are in the multi-user communication session, when content is presented in the three-dimensional environment at one electronic device but not the other electronic device, the avatars corresponding to the users of the first electronic device and the second electronic device selectively remain displayed in the three-dimensional environment depending on the type of content being presented. In some examples, when content of the first type is presented at one electronic device but not the other electronic device, the avatars corresponding to the users of the first electronic device and the second electronic device cease being displayed in the three-dimensional environment while in the multi-user communication session. In some examples, when content of the second type is presented at one electronic device but not the other electronic device, the avatars corresponding to the users of the first electronic device and the second electronic device cease being displayed in the three-dimensional environment while in the multi-user communication session. In some examples, when content of the third type is presented at one electronic device but not the other electronic device, the avatars corresponding to the users of the first electronic device and the second electronic device cease being displayed in the three-dimensional environment while in the multi-user communication session. In some examples, when content of the fourth type is presented at one electronic device but not the other electronic device, avatars corresponding to the users of the first electronic device and the second electronic device remain displayed in the three-dimensional environment while in the multi-user communication session.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
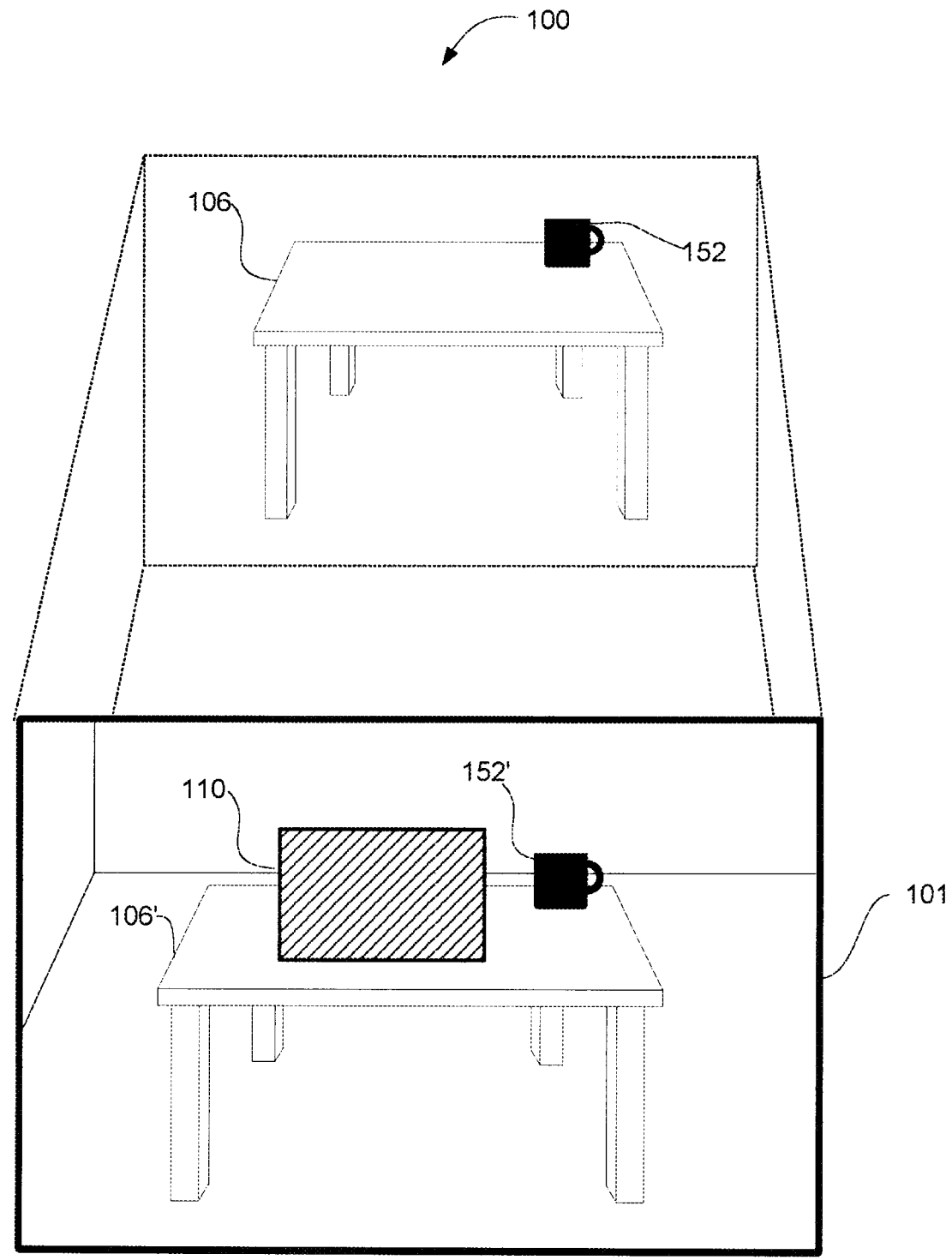
FIG. 1 illustrates an electronic device presenting an extended reality environment according to some examples of the disclosure.

Some examples of the disclosure are directed to systems and methods for sharing and presenting content in a three-dimensional environment that includes one or more avatars corresponding to one or more users of one or more electronic devices in a multi-user communication session. In some examples, a first electronic device and a second electronic device are communicatively linked in a multi-user communication session, wherein the first electronic device and the second electronic device are configured to display a three-dimensional environment, respectively. In some examples, the first electronic device displays an avatar corresponding to a user of the second electronic device in the three-dimensional environment, and the second electronic device displays an avatar corresponding to a user of the first electronic device in the three-dimensional environment. In some examples, an audio corresponding to a voice of the user of the first electronic device and the second electronic device, respectively, is presented with the avatar in the multi-user communication session. In some examples, the first electronic device and the second electronic device may share and present content in the three-dimensional environment. In some examples, depending on a type of content shared in the three-dimensional environment, the first electronic device and the second electronic device selectively maintain display of the avatar when presenting the content in the three-dimensional environment.

In some examples, when content of a first type (e.g., immersive content corresponding to a three-dimensional scene/environment) is shared between the first electronic device and the second electronic device, the avatars corresponding to the users of the first electronic device and the second electronic device remain displayed when presenting the content in the three-dimensional environment. In some examples, when content of a second type (e.g., immersive content corresponding to a three-dimensional representation of video) is shared between the first electronic device and the second electronic device, the avatars corresponding to the users of the first electronic device and the second electronic device cease being displayed when presenting the content in the three-dimensional environment. In some such examples, audio corresponding to the voices of the users of the first electronic device and the second electronic device remain presented when the avatars are no longer displayed. In some examples, when content of a third type (e.g., two-dimensional content corresponding to a two-dimensional representation of a video, image, or other content) is shared between the first electronic device and the second electronic device, the avatars corresponding to the users of the first electronic device and the second electronic device remain displayed when presenting the content in a full-screen mode in the three-dimensional environment. In some examples, when content of a fourth type (e.g., two-dimensional content displayed in a virtual object corresponding to an application window) is shared between the first electronic device and the second electronic device, avatars corresponding to the users of the first electronic device and the second electronic device remain displayed when presenting the content in the virtual object in the three-dimensional environment.

In some examples, while the first electronic device and the second electronic device are in the multi-user communication session, when content is presented in the three-dimensional environment at one electronic device but not the other electronic device, the avatars corresponding to the users of the first electronic device and the second electronic device selectively remain displayed in the three-dimensional environment depending on the type of content being presented. In some examples, when content of the first type is presented at one electronic device but not the other electronic device, the avatars corresponding to the users of the first electronic device and the second electronic device cease being displayed in the three-dimensional environment while in the multi-user communication session. In some examples, when content of the second type is presented at one electronic device but not the other electronic device, the avatars corresponding to the users of the first electronic device and the second electronic device cease being displayed in the three-dimensional environment while in the multi-user communication session. In some examples, when content of the third type is presented at one electronic device but not the other electronic device, the avatars corresponding to the users of the first electronic device and the second electronic device cease being displayed in the three-dimensional environment while in the multi-user communication session. In some examples, when content of the fourth type is presented at one electronic device but not the other electronic device, avatars corresponding to the users of the first electronic device and the second electronic device remain displayed in the three-dimensional environment while in the multi-user communication session.

In some examples, sharing the content in the three-dimensional environment while in the multi-user communication session may include interaction with one or more user interface elements. In some examples, a user's gaze may be tracked by the electronic device as an input for targeting a selectable option/affordance within a respective user interface element when sharing the content in the three-dimensional environment. For example, gaze can be used to identify one or more options/affordances targeted for selection using another selection input. In some examples, a respective option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

FIG. 1 illustrates an electronic device 101 presenting an extended reality (XR) environment (e.g., a computer-generated environment) according to some examples of the disclosure. In some examples, electronic device 101 is a hand-held or mobile device, such as a tablet computer, laptop computer, smartphone, or head-mounted display. Examples of device 101 are described below with reference to the architecture block diagram of FIG. 2. As shown in FIG. 1, electronic device 101, table 106, and coffee mug 152 are located in the physical environment 100. In some examples, electronic device 101 may be configured to capture images of physical environment 100 including table 106 and coffee mug 152 (illustrated in the field of view of electronic device 101). In some examples, in response to a trigger, the electronic device 101 may be configured to display a virtual object 110 (e.g., two-dimensional virtual content) in the computer-generated environment (e.g., represented by a rectangle illustrated in FIG. 1) that is not present in the physical environment 100, but is displayed in the computer-generated environment positioned on (e.g., anchored to) the top of a computer-generated representation 106' of real-world table 106. For example, virtual object 110 can be displayed on the surface of the computer-generated representation 106' of the table in the computer-generated environment next to the computer-generated representation 152' of real-world coffee mug 152 displayed via device 101 in response to detecting the planar surface of table 106 in the physical environment 100.

It should be understood that virtual object 110 is a representative virtual object and one or more different virtual objects (e.g., of various dimensionality such as two-dimensional or three-dimensional virtual objects) can be included and rendered in a three-dimensional computer-generated environment. For example, the virtual object can represent an application or a user interface displayed in the computer-generated environment. In some examples, the virtual object can represent content corresponding to the application and/or displayed via the user interface in the computer-generated environment. In some examples, the virtual object 110 is optionally configured to be interactive and responsive to user input, such that a user may virtually touch, tap, move, rotate, or otherwise interact with, the virtual object. In some examples, the virtual object 110 may be displayed in a three-dimensional computer-generated environment within a multi-user communication session ("multi-user communication session," "communication session"). In some such examples, as described in more detail below, the virtual object 110 may be viewable and/or configured to be interactive and responsive to multiple users and/or user input provided by multiple users, respectively. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
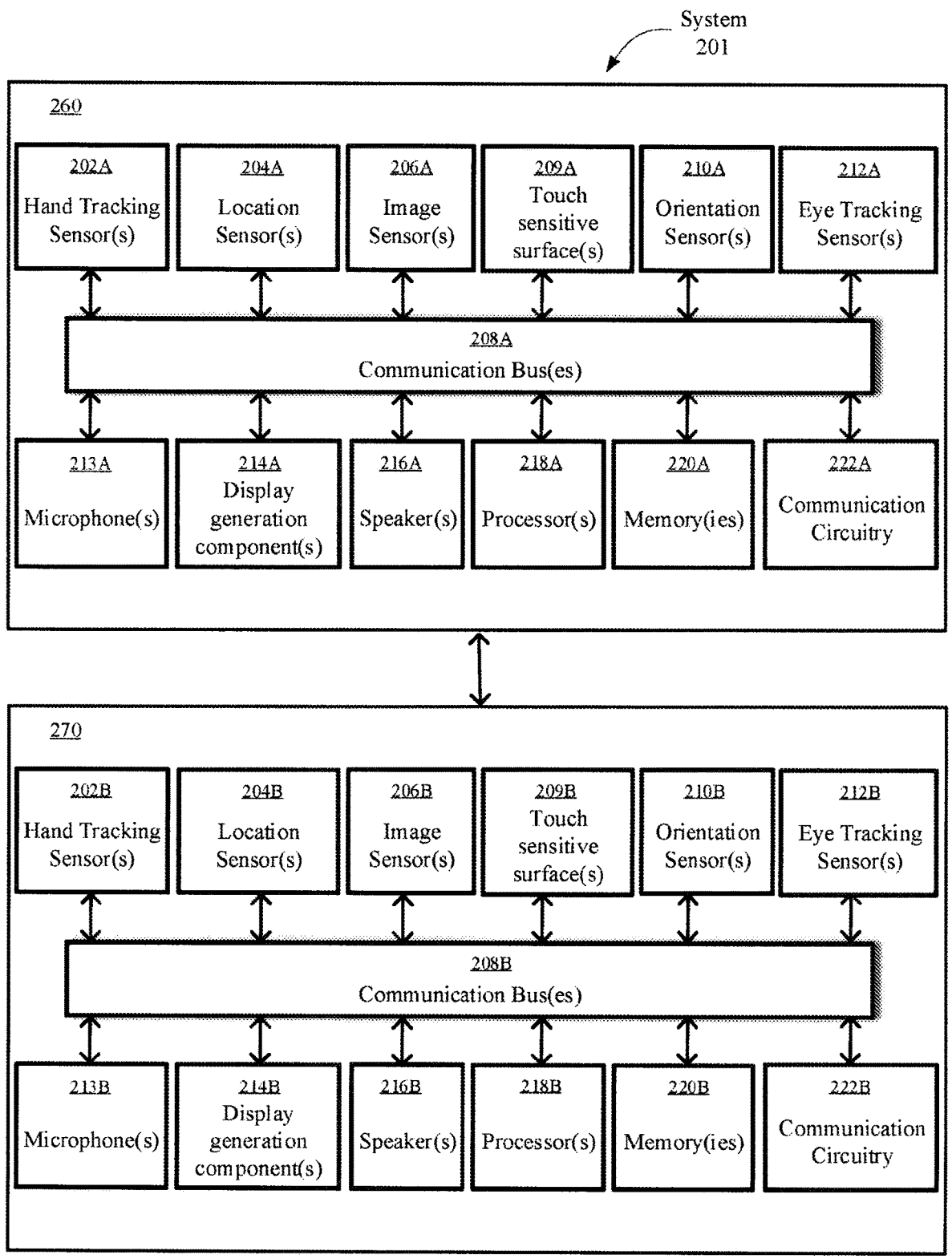
FIG. 2 illustrates a block diagram of an exemplary architecture for a system according to some examples of the disclosure.

FIG. 2 illustrates a block diagram of an exemplary architecture for a system 201 according to some examples of the disclosure. In some examples, system 201 includes multiple devices. For example, the system 201 includes a first electronic device 260 and a second electronic device 270, wherein the first electronic device 260 and the second electronic device 270 are in communication with each other. In some examples, the first electronic device 260 and the second electronic device 270 are a portable device, such as a mobile phone, smart phone, a tablet computer, a laptop computer, an auxiliary device in communication with another device, etc., respectively.

As illustrated in FIG. 2, the first device 260 optionally includes various sensors (e.g., one or more hand tracking sensor(s) 202A, one or more location sensor(s) 204A, one or more image sensor(s) 206A, one or more touch-sensitive surface(s) 209A, one or more motion and/or orientation sensor(s) 210A, one or more eye tracking sensor(s) 212A, one or more microphone(s) 213A or other audio sensors, etc.), one or more display generation component(s) 214A, one or more speaker(s) 216A, one or more processor(s) 218A, one or more memories 220A, and/or communication circuitry 222A. In some examples, the second device 270 optionally includes various sensors (e.g., one or more hand tracking sensor(s) 202B, one or more location sensor(s) 204B, one or more image sensor(s) 206B, one or more touch-sensitive surface(s) 209B, one or more motion and/or orientation sensor(s) 210B, one or more eye tracking sensor(s) 212B, one or more microphone(s) 213B or other audio sensors, etc.), one or more display generation component(s) 214B, one or more speaker(s) 216, one or more processor(s) 218B, one or more memories 220B, and/or communication circuitry 222B. One or more communication buses 208A and 208B are optionally used for communication between the above-mentioned components of devices 260 and 270, respectively. First device 260 and second device 270 optionally communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some examples, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some examples, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, display generation component(s) 214A, 214B include a single display (e.g., a liquid-crystal display (LCD), organic light-emitting diode (OLED), or other types of display). In some examples, display generation component(s) 214A, 214B includes multiple displays. In some examples, display generation component(s) 214A, 214B can include a display with touch capability (e.g., a touch screen), a projector, a holographic projector, a retinal projector, etc. In some examples, devices 260 and 270 include touch-sensitive surface(s) 209A and 209B, respectively, for receiving user inputs, such as tap inputs and swipe inputs or other gestures. In some examples, display generation component(s) 214A,214B and touch-sensitive surface(s) 209A, 209B form touch-sensitive display(s) (e.g., a touch screen integrated with devices 260 and 270, respectively, or external to devices 260 and 270, respectively, that is in communication with devices 260 and 270).

Devices 260 and 270 optionally includes image sensor(s) 206A and 206B, respectively. Image sensors(s) 206A/206B optionally include one or more visible light image sensors, such as charged coupled device (CCD) sensors, and/or complementary metal-oxide-semiconductor (CMOS) sensors operable to obtain images of physical objects from the real-world environment. Image sensor(s) 206A/206B also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206A/206B also optionally include one or more cameras configured to capture movement of physical objects in the real-world environment. Image sensor(s) 206A/206B also optionally include one or more depth sensors configured to detect the distance of physical objects from device 260/270. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, devices 260 and 270 use CCD sensors, event cameras, and depth sensors in combination to detect the physical environment around devices 260 and 270. In some examples, image sensor(s) 206A/206B include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, device 260/270 uses image sensor(s) 206A/206B to detect the position and orientation of device 260/270 and/or display generation component(s) 214A/214B in the real-world environment. For example, device 260/270 uses image sensor(s) 206A/206B to track the position and orientation of display generation component(s) 214A/214B relative to one or more fixed objects in the real-world environment.

In some examples, device 260/270 includes microphone(s) 213A/213B or other audio sensors. Device 260/270 uses microphone(s) 213A/213B to detect sound from the user and/or the real-world environment of the user. In some examples, microphone(s) 213A/213B includes an array of microphones (a plurality of microphones) that optionally operate in tandem, such as to identify ambient noise or to locate the source of sound in space of the real-world environment.

Device 260/270 includes location sensor(s) 204A/204B for detecting a location of device 260/270 and/or display generation component(s) 214A/214B. For example, location sensor(s) 204A/204B can include a GPS receiver that receives data from one or more satellites and allows device 260/270 to determine the device's absolute position in the physical world.

Device 260/270 includes orientation sensor(s) 210A/210B for detecting orientation and/or movement of device 260/270 and/or display generation component(s) 214A/214B. For example, device 260/270 uses orientation sensor(s) 210A/210B to track changes in the position and/or orientation of device 260/270 and/or display generation component(s) 214A/214B, such as with respect to physical objects in the real-world environment. Orientation sensor(s) 210A/210B optionally include one or more gyroscopes and/or one or more accelerometers.

Device 260/270 includes hand tracking sensor(s) 202A/202B and/or eye tracking sensor(s) 212A/212B, in some examples. Hand tracking sensor(s) 202A/202B are configured to track the position/location of one or more portions of the user's hands, and/or motions of one or more portions of the user's hands with respect to the extended reality environment, relative to the display generation component(s) 214A/214B, and/or relative to another defined coordinate system. Eye tracking sensor(s) 212A/212B are configured to track the position and movement of a user's gaze (eyes, face, or head, more generally) with respect to the real-world or extended reality environment and/or relative to the display generation component(s) 214A/214B. In some examples, hand tracking sensor(s) 202A/202B and/or eye tracking sensor(s) 212A/212B are implemented together with the display generation component(s) 214A/214B. In some examples, the hand tracking sensor(s) 202A/202B and/or eye tracking sensor(s) 212A/212B are implemented separate from the display generation component(s) 214A/214B.

In some examples, the hand tracking sensor(s) 202A/202B can use image sensor(s) 206A/206B (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some examples, one or more image sensor(s) 206A/206B are positioned relative to the user to define a field of view of the image sensor(s) 206A/206B and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212A/212B includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by a respective eye tracking camera/illumination source(s).

Device 260/270 and system 201 are not limited to the components and configuration of FIG. 2, but can include fewer, other, or additional components in multiple configurations. In some examples, system 201 can be implemented in a single device. A person or persons using system 201, is optionally referred to herein as a user or users of the device(s). Attention is now directed towards exemplary concurrent displays of a three-dimensional environment on a first electronic device (e.g., corresponding to device 260) and a second electronic device (e.g., corresponding to device 270). As discussed below, the first electronic device may be in communication with the second electronic device in a multi-user communication session. In some examples, an avatar (e.g., a representation of) a user of the first electronic device may be displayed in the three-dimensional environment at the second electronic device, and an avatar of a user of the second electronic device may be displayed in the three-dimensional environment at the first electronic device. In some examples, content may be shared within the three-dimensional environment while the first electronic device and the second electronic device are in the multi-user communication session.

Figure 3:
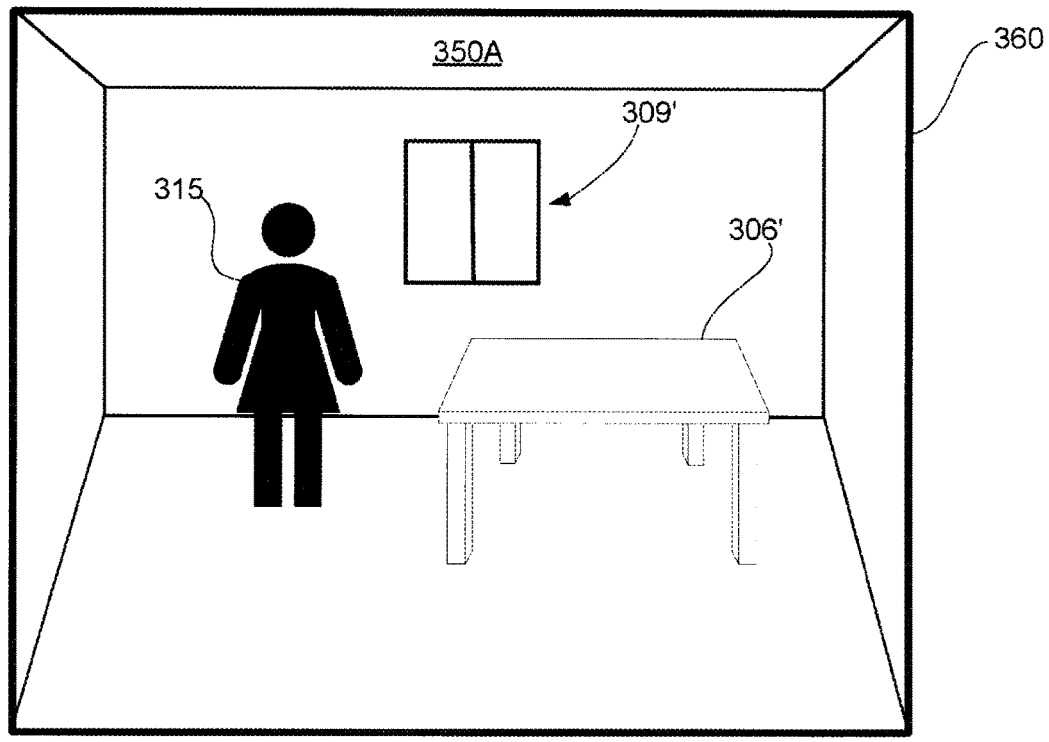
FIG. 3 illustrates an example of a multi-user communication session between a first electronic device and a second electronic device according to some examples of the disclosure.
Figure 3:
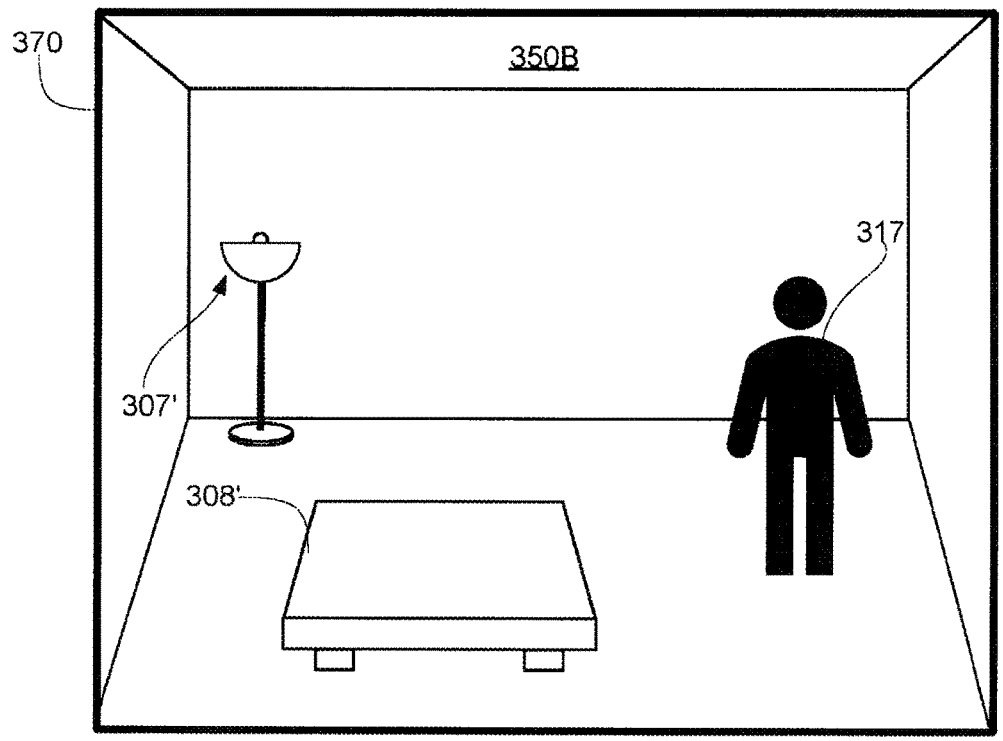

FIG. 3 illustrates an example of a multi-user communication session between a first electronic device 360 and a second electronic device 370 according to some examples of the disclosure. In some examples, the first electronic device 360 may present a three-dimensional environment 350A, and the second electronic device 370 may present a three-dimensional environment 350B. The first electronic device 360 and the second electronic device 370 may be similar to device 101 or 260/270, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, displays formed as lenses designed to be placed on a person's eyes (e.g., similar to contact lenses), respectively. In the example of FIG. 3, a first user is optionally wearing the electronic device 360 and a second user is optionally wearing the electronic device 370, such that the three-dimensional environment 350A/350B can be defined by X, Y and Z axes as viewed from a perspective of the electronic devices (e.g., a viewpoint associated with the electronic device 360/370, which may be a head-mounted display, for example).

As shown in FIG. 3, the electronic device 360 may be in a first physical environment that includes a table 306 and a window 309. Thus, the three-dimensional environment 350A presented using the electronic device 360 optionally includes captured portions of the physical environment surrounding the electronic device 360, such as a representation of the table 306' and a representation of the window 309'. Similarly, the electronic device 370 may be in a second physical environment, different from the first physical environment (e.g., separate from the first physical environment), that includes a floor lamp 307 and a coffee table 308. Thus, the three-dimensional environment 350B presented using the electronic device 370 optionally includes captured portions of the physical environment surrounding the electronic device 370, a representation of the floor lamp 307' and a representation of the coffee table 308'. Additionally, the three-dimensional environments 350A and 350B may include representations of the floor, ceiling, and walls of the room in which the first electronic device 360 and the second electronic device 370, respectively, are located.

As mentioned above, in some examples, the first electronic device 360 is optionally in a multi-user communication session with the second electronic device 370. For example, the first electronic device 360 and the second electronic device 370 (e.g., via communication circuitry 222A/222B) are configured to present a shared three-dimensional environment 350A/350B that includes one or more shared virtual objects (e.g., content such as images, video, audio and the like, representations of user interfaces of applications, etc.). As used herein, the term "shared three-dimensional environment" refers to a three-dimensional environment that is independently presented, displayed, and/or visible at two or more electronic devices via which content, applications, data, and the like may be shared and/or presented to users of the two or more electronic devices. In some examples, while the first electronic device 360 is in the multi-user communication session with the second electronic device 370, an avatar corresponding to the user of one electronic device is optionally displayed in the three-dimensional environment that is displayed via the other electronic device. For example, as shown in FIG. 3, at the first electronic device 360, an avatar 315 corresponding to the user of the second electronic device 370 is displayed in the three-dimensional environment 350A. Similarly, at the second electronic device 370, an avatar 317 corresponding to the user of the first electronic device 360 is displayed in the three-dimensional environment 350B.

In some examples, the presentation of avatars 315/317 as part of a shared three-dimensional environment is optionally accompanied by an audio effect corresponding to a voice of the users of the electronic devices 370/360. For example, the avatar 315 displayed in the three-dimensional environment 350A using the first electronic device 360 is optionally accompanied by an audio effect corresponding to the voice of the user of the second electronic device 370. In some such examples, when the user of the second electronic device 370 speaks, the voice of the user may be detected by the second electronic device 370 (e.g., via the microphone(s) 213B) and transmitted to the first electronic device 360 (e.g., via the communication circuitry 222B/222A), such that the detected voice of the user of the second electronic device 370 may be presented as audio (e.g., using speaker(s) 216A) to the user of the first electronic device 360 in three-dimensional environment 350A. In some examples, the audio effect corresponding to the voice of the user of the second electronic device 370 may be spatialized such that it appears to the user of the first electronic device 360 to emanate from the location of avatar 315 in the shared three-dimensional environment 350A. Similarly, the avatar 317 displayed in the three-dimensional environment 350B using the second electronic device 370 is optionally accompanied by an audio effect corresponding to the voice of the user of the first electronic device 360. In some such examples, when the user of the first electronic device 360 speaks, the voice of the user may be detected by the first electronic device 360 (e.g., via the microphone(s) 213A) and transmitted to the second electronic device 370 (e.g., via the communication circuitry 222A/222B), such that the detected voice of the user of the first electronic device 360 may be presented as audio (e.g., using speaker(s) 216B) to the user of the second electronic device 370 in three-dimensional environment 350B. In some examples, the audio effect corresponding to the voice of the user of the first electronic device 360 may be spatialized such that it appears to the user of the second electronic device 370 to emanate from the location of avatar 317 in the shared three-dimensional environment 350B.

In some examples, while in the multi-user communication session, the avatars 315/317 are displayed in the three-dimensional environments 350A/350B with respective orientations that correspond to and/or are based on orientations of the electronic devices 360/370 (and/or the users of electronic devices 360/370) in the physical environments surrounding the electronic devices 360/370. For example, as shown in FIG. 3, in the three-dimensional environment 350A, the avatar 315 is optionally facing toward the viewpoint of the user of the first electronic device 360, and in the three-dimensional environment 350B, the avatar 317 is optionally facing toward the viewpoint of the user of the second electronic device 370. As a particular user moves the electronic device (and/or themself) in the physical environment, the viewpoint of the user changes in accordance with the movement, which may thus also change an orientation of the user's avatar in the three-dimensional environment. For example, with reference to FIG. 3, if the user of the first electronic device 360 were to look leftward in the three-dimensional environment 350A such that the first electronic device 360 is rotated (e.g., a corresponding amount) to the left (e.g., counterclockwise), the user of the second electronic device 370 would see the avatar 317 corresponding to the user of the first electronic device 360 rotate to the right (e.g., clockwise) in accordance with the movement of the first electronic device 360.

In some examples, while in the multi-user communication session, the avatars 315/317 are displayed in the three-dimensional environments 350A/350B with regard to physical objects in the physical environments surrounding the electronic devices 360/370. For example, at the first electronic device 360, the avatar 315 corresponding to the user of the second electronic device 370 is optionally displayed at a predetermined location in the three-dimensional environment 350A (e.g., beside the representation of the table 306'). Similarly, at the second electronic device 370, the avatar 317 corresponding to the user of the first electronic device 360 is optionally displayed at a predetermined location in the three-dimensional environment 350B (e.g., to the right of the representation of the coffee table 308'). In some examples, the predetermined locations at which the avatars 315/317 are displayed in the three-dimensional environments 350A/350B are selected with respect to physical objects in the physical environments surrounding the electronic devices 360/370. For example, the avatar 315 is displayed in the three-dimensional environment 350A at a respective location that is not obscured by a (e.g., representation of) a physical object (e.g., the table 306'), and the avatar 317 is displayed in the three-dimensional environment 350B at a respective location that is not obscured by a (e.g., representation of) a physical object (e.g., the coffee table 308' or floor lamp 307').

Additionally, in some examples, while in the multi-user communication session, a viewpoint of the three-dimensional environments 350A/350B and/or a location of the viewpoint of the three-dimensional environments 350A/350B optionally changes in accordance with movement of the electronic devices 360/370 (e.g., by the users of the electronic devices 360/370). For example, while in the communication session, if the electronic device 360 is moved closer toward the representation of the table 306' and/or the avatar 315 (e.g., because the user of the electronic device 360 moved forward in the physical environment surrounding the electronic device 360), the viewpoint of the three-dimensional environment 350A would change accordingly, such that the representation of the table 306', the representation of the window 309' and the avatar 315 appear larger in the field of view. In some examples, each user may independently interact with the three-dimensional environment 350A/350B, such that changes in viewpoints of the three-dimensional environment 350A and/or interactions with virtual objects in the three-dimensional environment 350A by the first electronic device 360 optionally do not affect what is shown in the three-dimensional environment 350B at the second electronic device 370, and vice versa.

In some examples, the avatars 315/317 are a representation (e.g., a full-body rendering) of the users of the electronic devices 370/360. In some examples, the avatar 315/317 is a representation of a portion (e.g., a rendering of a head, face, head and torso, etc.) of the users of the electronic devices 370/360. In some examples, the avatars 315/317 are a user-personalized, user-selected, and/or user-created representation displayed in the three-dimensional environments 350A/350B that is representative of the users of the electronic devices 370/360. It should be understood that, while the avatars 315/317 illustrated in FIG. 3 correspond to full-body representations of the users of the electronic devices 370/360, respectively, alternative avatars may be provided, such as those described above.

As mentioned above, while the first electronic device 360 and the second electronic device 370 are in the multi-user communication session, the three-dimensional environments 350A/350B may be a shared three-dimensional environment that is presented using the electronic devices 360/370. In some examples, content that is viewed by one user at one electronic device may be shared with another user at another electronic device in the multi-user communication session. In some such examples, the content may be experienced (e.g., viewed and/or interacted with) by both users (e.g., via their respective electronic devices) in the shared three-dimensional environment, as described in more detail below.

It should be understood that, in some examples, more than two electronic devices may be communicatively linked in a multi-user communication session. For example, in a situation in which three electronic devices are communicatively linked in a multi-user communication session, a first electronic device would display two avatars, rather than just one avatar, corresponding to the users of the other two electronic devices. It should therefore be understood that the various processes and exemplary interactions described herein with reference to the first electronic device 360 and the second electronic device 370 in the multi-user communication session optionally apply to situations in which more than two electronic devices are communicatively linked in a multi-user communication session.

In some examples, it may be advantageous to selectively control the display of the avatars corresponding to the users of electronic devices that are communicatively linked in a multi-user communication session. For example, as described herein, content may be shared and presented in the three-dimensional environment such that the content is optionally viewable by and/or interactive to multiple users in the multi-user communication session. As discussed above, the three-dimensional environment optionally includes avatars corresponding to the users of the electronic devices that are in the communication session. In some instances, the presentation of the content in the three-dimensional environment with the avatars corresponding to the users of the electronic devices may cause portions of the content to be blocked or obscured from a viewpoint of one or more users in the multi-user communication session and/or may distract one or more users in the multi-user communication session. In some examples, presentation of the content in the three-dimensional environment with the avatars corresponding to the users of the electronic devices may not cause portions of the content to be blocked or obscured from a viewpoint of one or more users in the multi-user communication session and/or may not distract one or more users in the multi-user communication session. Additionally, in some examples, it may be advantageous to, when presenting content in the three-dimensional environment during a multi-user communication session, cease display of the avatars corresponding to the users of the electronic devices depending on the type of content that is being presented, as described herein in more detail.

FIGS. 4A-4F illustrate example interactions with shared content of a first type in a multi-user communication session according to some examples of the disclosure. In some examples, while the first electronic device 460 is in the multi-user communication session with the second electronic device 470, the three-dimensional environment 450A is presented using electronic device 460 and the three-dimensional environment 450B is presented using electronic device 470. In some examples, the electronic devices 460/470 optionally correspond to electronic devices 360/370 discussed above. In some examples, the three-dimensional environments 450A/450B include captured portions of the physical environment in which electronic devices 460/470 are located. For example, the three-dimensional environment 450A includes a table (e.g., a representation of table 406') and a window (e.g., representation of window 409'), and the three-dimensional environment 450B includes a coffee table (e.g., representation of coffee table 408') and a floor lamp (e.g., representation of floor lamp 407'). In some examples, the three-dimensional environments 450A/450B optionally correspond to three-dimensional environments 350A/350B described above with reference to FIG. 3. As described above, the three-dimensional environments also include avatars 415/417 corresponding to a user of the electronic devices 470/460, respectively. In some examples, the avatars 415/417 optionally corresponds to avatars 315/317 described above with reference to FIG. 3.

Figure 4A:
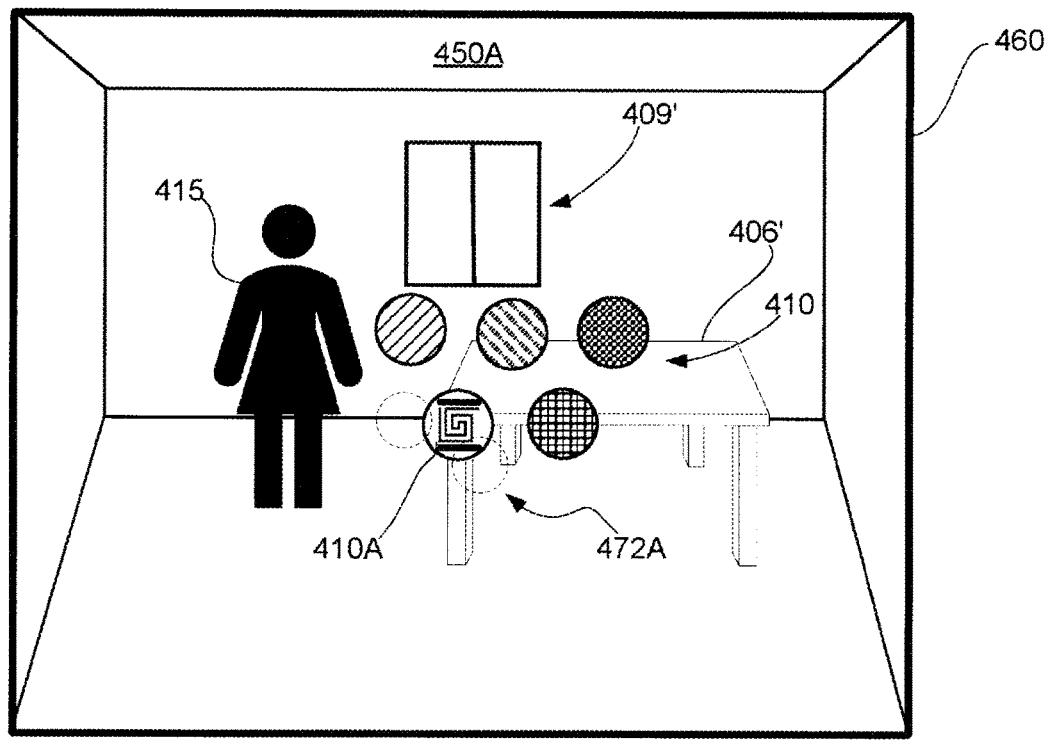
FIGS. 4A-4F illustrate example interactions with shared content of a first type in a multi-user communication session according to some examples of the disclosure.
Figure 4A:
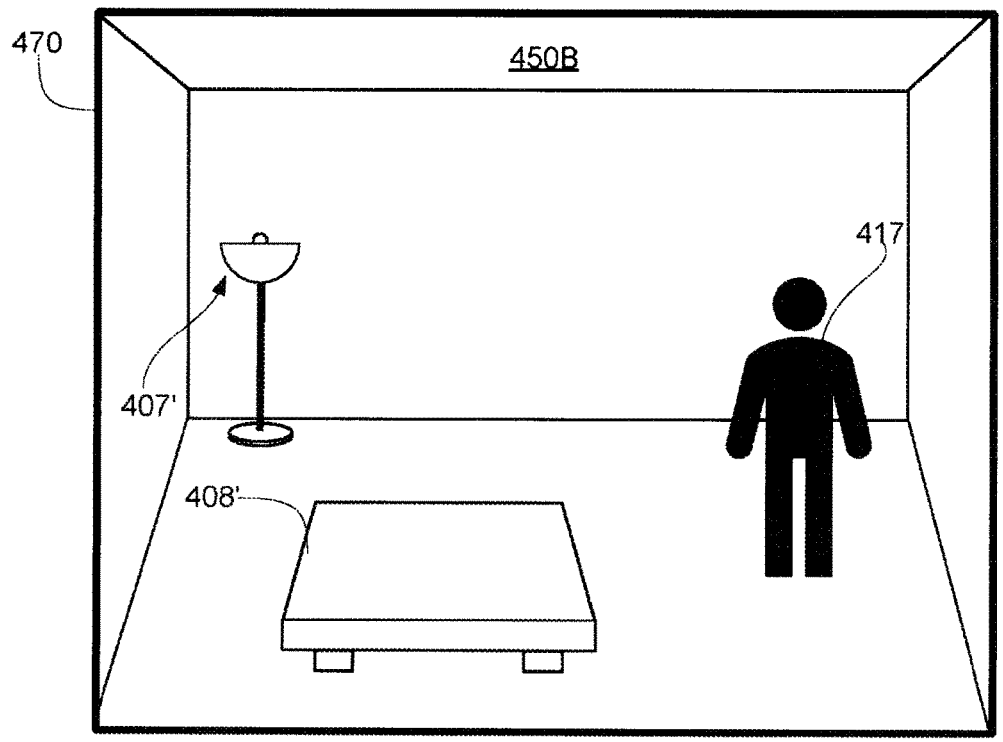

In some examples, the three-dimensional environments 450A/450B may include one or more virtual objects (e.g., corresponding to virtual object 110 shown in FIG. 1) that are displayed with the avatar corresponding to the user of the second electronic device 470. For example, as shown in FIG. 4A, the three-dimensional environment 450A optionally includes a plurality of virtual objects 410, which optionally correspond to representations of icons associated with respective applications that may be launched at electronic device 460. In some examples, the plurality of virtual objects 410 includes a first virtual object 410A, which optionally corresponds to a representation of an icon associated with a respective art gallery application that may be launched at the first electronic device 460. For example, the virtual object 410A may be activated in three-dimensional environment 450A to cause the electronic device 460 to generate and display content associated with the respective art gallery application in the three-dimensional environment 450A. In some examples, the content associated with the respective art gallery application replaces display of three-dimensional environment 450A at electronic device 460. As discussed in more detail below, the content associated with the respective art gallery application may be an immersive (e.g., a three-dimensional) art gallery in which the user may (e.g., virtually) explore and walk around in. In other words, in some examples, the user may navigate within immersive content presented within three-dimensional environment 450A with six degrees of freedom.

Figure 4B:
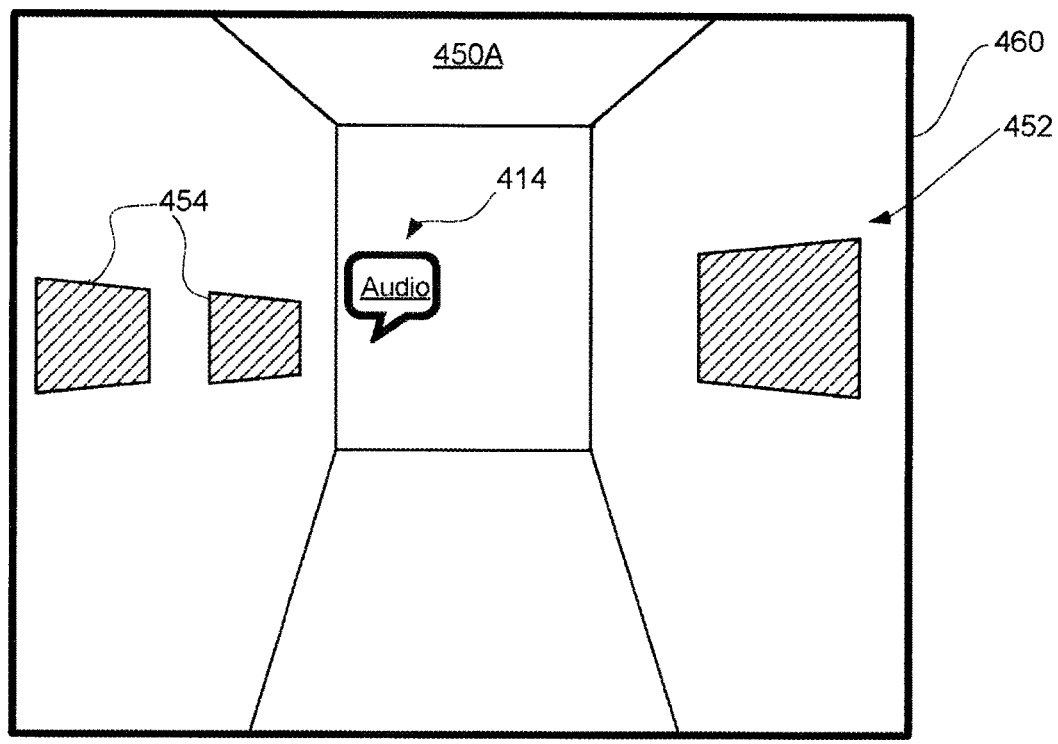
Figure 4B:
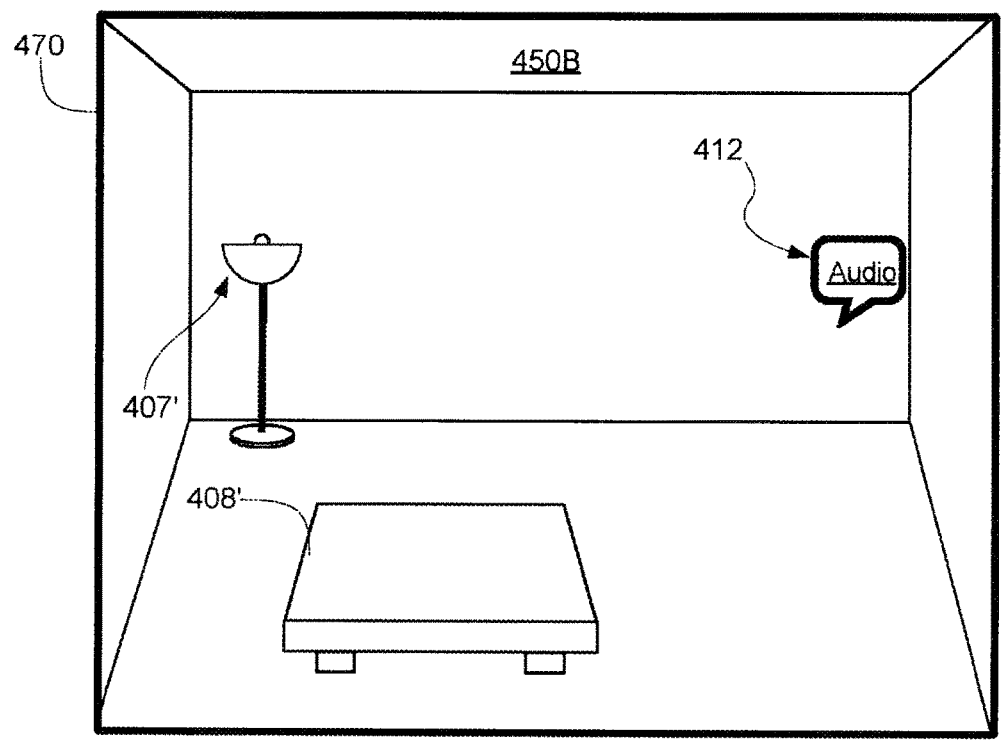

As shown in FIG. 4A, the user of the first electronic device 460 is optionally providing a selection input 472A directed to the first virtual object 410A. For example, the user may provide a pinch input (e.g., in which the index finger and the thumb of the hand of the user make contact) while the gaze of the user is directed toward the first virtual object 410A (or other suitable input such as a tap input, gaze for more than a threshold period of time, etc.). In some examples, in response to receiving the selection input 472A directed to the first virtual object 410A, the electronic device 460 may generate and present the immersive content (e.g., the immersive (e.g., three-dimensional) art gallery) 452 associated with the virtual object 410A (e.g., the respective art gallery application) in three-dimensional environment 450A, as shown in FIG. 4B. For example, as shown in FIG. 4B, the electronic device 460 optionally updates three-dimensional environment 450A to display the immersive content 452 (e.g., immersive art gallery), which may include art pieces 454 (e.g., paintings, stills, sketches, and the like). As shown, updating display of the three-dimensional environment 450A to include the immersive content 452 optionally does not cause the second electronic device 470 to update display of three-dimensional environment 450B to include the immersive content 452.

As shown in FIG. 4B, the user of the first electronic device 460 is optionally experiencing (e.g., viewing and/or interacting with) the immersive content 452 displayed in three-dimensional environment 450A, and the user of the second electronic device 470 is optionally not experiencing the immersive content 452 because the immersive content 452 is not displayed in three-dimensional environment 450B. As described herein, the first electronic device 460 is in a multi-user communication session with the second electronic device 470, such that the first electronic device 460 and the second electronic device 470 optionally display the shared three-dimensional environments 450A/450B. Because the first electronic device 460 is now displaying the immersive content 452, as shown in FIG. 4B, the three-dimensional environments 450A/450B are no longer a true shared environment between electronic devices 460 and 470. Accordingly, the first electronic device 460 ceases displaying the avatar 415 corresponding to the user of the second electronic device 470, and the second electronic device 470 ceases displaying the avatar 417 corresponding to the user of the first electronic device 460, as shown. As described above with reference to FIG. 3, the display of avatars 415/417 in three-dimensional environments 450A/450B is optionally accompanied by the presentation of an audio effect corresponding to a voice of each of the users of the electronic devices 470/460, which, in some examples, may be spatialized such that the audio appears to the user of the electronic devices 470/460 to emanate from the locations of avatars 415/417 in three-dimensional environments 450A/450B. In some examples, as shown in FIG. 4B, when the avatars 415/417 cease to be displayed in three-dimensional environments 450A/450B, respectively, the electronic devices 460/470 maintain the presentation of the audio of the users of the electronic devices, as indicated by audio bubbles 414/412. However, in some examples, the audio of the users of the electronic devices may no longer be spatialized when the avatars 415/417 cease to be displayed and may instead be presented in mono or stereo. Thus, despite the avatars 415/417 no longer being displayed in three-dimensional environments 450A/450B, respectively, the users of the electronic devices 460/470 may continue communicating (e.g., verbally) since the first electronic device 460 and the second electronic device 470 are still in the multi-user communication session.

In some examples, rather than ceasing display of the avatars 415/417 in three-dimensional environments 450A/450B, the electronic devices 460/470 may replace display of the avatars 415/417 with alternative representations in three-dimensional environments 450A/450B. For example, the first electronic device 460 may replace display of the avatar 415 corresponding to the user of the second electronic device 470 with an alternative representation of the user, such as a bubble (e.g., similar to audio bubble 414), an abstract representation of the user (e.g., such as a cloud), a three-dimensional or two-dimensional point (e.g., circular point, rectangular point, or triangular point), and the like. Similarly, in some examples, the second electronic device 470 may replace display of the avatar 417 corresponding to the user of the first electronic device 460 with an alternative representation of the user, such as one of those described above. It should be understood that, in some such examples, the alternative representations of the users in the three-dimensional environments 450A/450B may be accompanied by audio corresponding to the voices of the users, as discussed above.

As mentioned previously herein, content can be shared in the three-dimensional environments 450A/450B while the first electronic device 460 and the second electronic device 470 are communicatively linked in the multi-user communication session. In some examples, the immersive content 452 displayed at the first electronic device 460 can be shared with the second electronic device 470 such that the immersive content 452 can also be displayed in three-dimensional environment 450B at the second electronic device 470. For example, the user of the first electronic device 460 can provide a respective input corresponding to a request to share the immersive content 452 with the second electronic device 470.

Figure 4C:
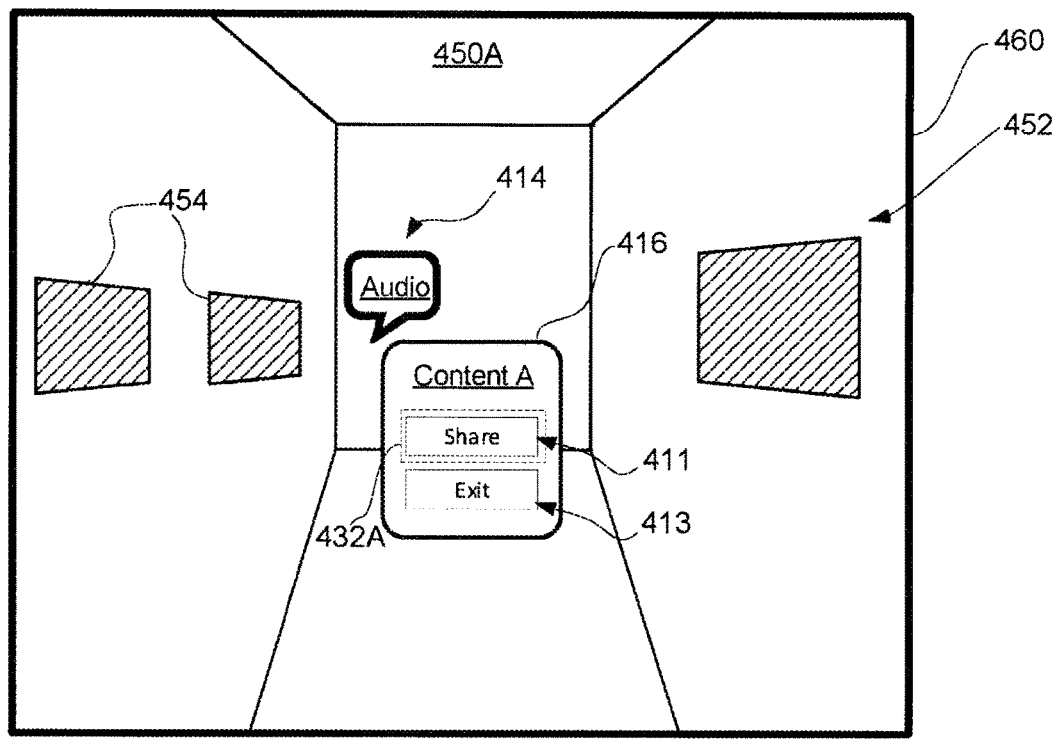
Figure 4C:
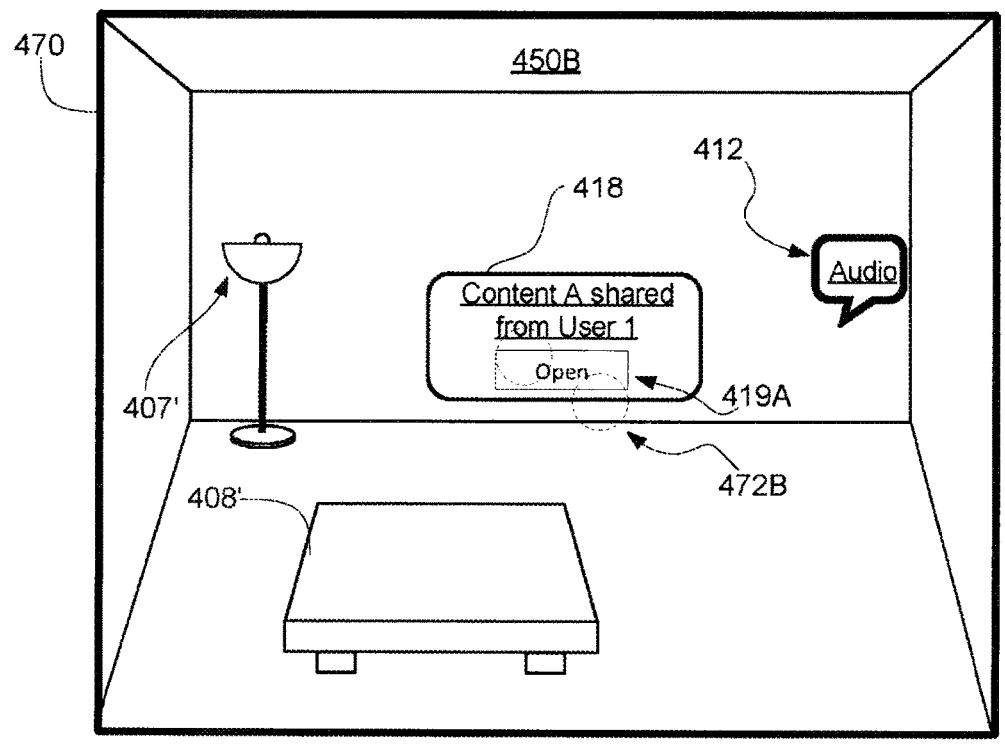

As shown in FIG. 4C, the first electronic device 460 may display a first user interface element 416 for controlling display of the immersive content 452 in three-dimensional environment 450A. In some examples, the first user interface element 416 includes a first option 411 that is selectable to initiate a process for sharing the immersive content 452 with the second electronic device 470. In some examples, the first user interface element 416 includes a second option 413 that is selectable to initiate a process for ceasing display of the immersive content 452 in three-dimensional environment 450A. As shown in FIG. 4C, the first option 411 has been selected, as indicated by selection 432A, in the first user interface element 416 in three-dimensional environment 450A. For example, the user of the first electronic device 460 has provided a pinch input, a tap input, a verbal command, or some other direct or indirect input directed to the first option 411.

In some examples, in response to receiving the selection input directed to the first option 411, while the first electronic device 460 and the second electronic device 470 are in the communication session, the second electronic device 470 receives an indication of a request from the first electronic device 460 to share content with the second electronic device 470. For example, as shown in FIG. 4C, in response to receiving the indication from the first electronic device 460, the second electronic device 470 optionally displays a second user interface element 418 (e.g., a notification) corresponding to the request to share content (e.g., Content A) with the second electronic device 470. In some examples, the second user interface element 418 includes an option 419A that is selectable to accept the share request, and thus initiate a process to display the immersive content 452 in the three-dimensional environment 450B at the second electronic device 470. As shown in FIG. 4C, the user of the second electronic device 470 is providing a selection input directed to the option 419A. In FIG. 4C, during the process of sharing the content (e.g., immersive content 452) with the second electronic device 470, the avatars corresponding to the users of the electronic devices 460/470 are still not displayed in three-dimensional environments 450A/450B. However, as discussed above, the users of the electronic devices 460/470 may continue communicating verbally in three-dimensional environments 450A/450B during this process.

Figure 4D:
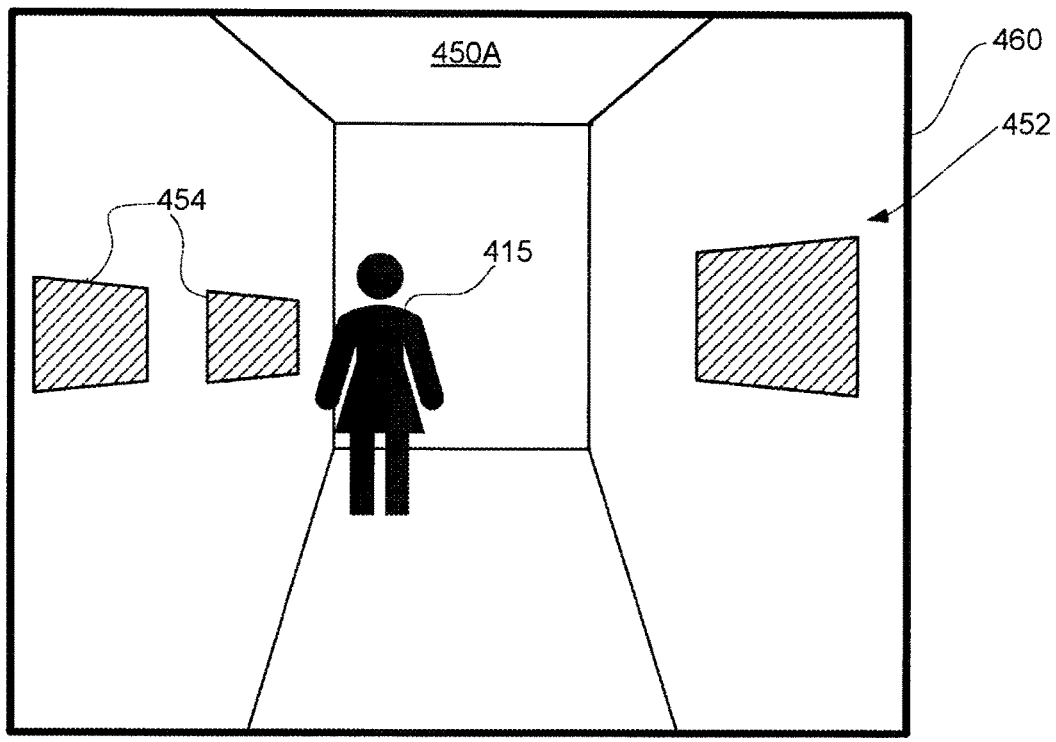
Figure 4D:
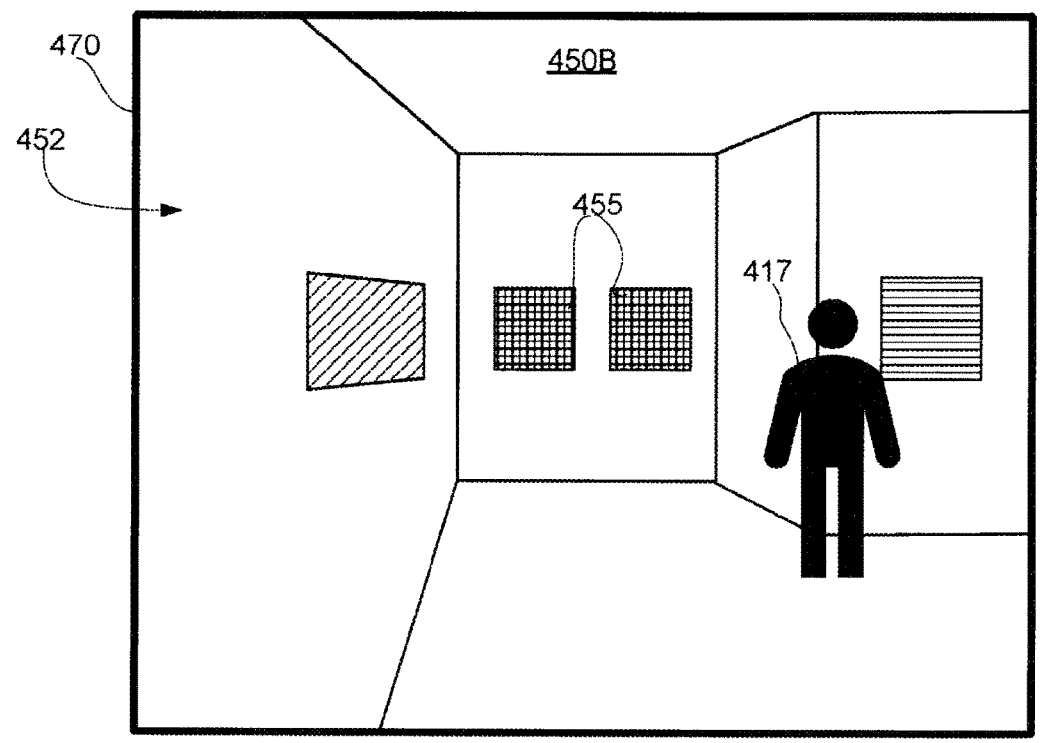

In some examples, in response to receiving the selection input 472B directed to the option 419A in the second user interface element 418, the second electronic device 470 updates display of the three-dimensional environment 450B to include the immersive content 452 (e.g., the immersive art gallery), as shown in FIG. 4D. For example, the user of the first electronic device 460 and the user of the second electronic device 470 are experiencing the immersive content 452 (e.g., an immersive art gallery) within the shared three-dimensional environments 450A/450B. Additionally, the user of the first electronic device 460 and the user of the second electronic device 470 have unique viewpoints of the immersive content 452, as shown in FIG. 4D. For example, the user of the first electronic device 460 has a first viewpoint of the immersive content 452 in which a first set of art pieces (e.g., 454) are displayed, and the user of the second electronic device 470 has a second viewpoint of the immersive content 452 in which a second set of art pieces (e.g., 455), different from the first set of art pieces, are displayed.

In some examples, in response to displaying the immersive content 452 in three-dimensional environment 450B, such that the immersive content 452 is displayed at both the first electronic device 460 and the second electronic device 470, the avatars corresponding to the users of the electronic devices 460/470 are redisplayed in the three-dimensional environment. For example, as shown in FIG. 4D, the avatar 415 corresponding to the user of the second electronic device 470 is redisplayed in three-dimensional environment 450A, and the avatar 417 corresponding to the user of the first electronic device 460 is redisplayed in three-dimensional environment 450B. In some examples, the audio of the users of electronic devices 460/470 may be re-spatialized such that they appear to emanate from the current location of avatars 417/415 in three-dimensional environments 450B/450A. As mentioned above, in some examples, while in the communication session, the first electronic device 460 and the second electronic device 470 may selectively display the avatars 415/417 depending on the type of content that is shared and displayed in three-dimensional environments 450A/450B. The immersive content 452 optionally corresponds to an immersive scene/experience (e.g., an immersive art gallery) in which the users of the electronic devices 460/470 may virtually explore (e.g., virtually walk around in and/or look around). For example, the users of the electronic devices 460/470 can move the electronic devices 460/470 (e.g., while wearing, holding, and/or looking through the display of the electronic device) in the physical environment surrounding electronic devices 460/470 to virtually move a location of the viewpoint of the three-dimensional environments 450A/450B. Further, the users of the electronic devices 460/470 can reorient the electronic devices 460/470 (e.g., by moving the user's head/hands wearing/holding the electronic device to a different pose/orientation) in the physical environment surrounding electronic devices 460/470 to change the viewpoint of the three-dimensional environments 450A/450B. Thus, the immersive content 452 provides the user with six virtual degrees of freedom when experiencing (e.g., viewing, walking around within, interacting with, etc.) the immersive content 452 in three-dimensional environments 450A/450B. Accordingly, as discussed above, when sharing immersive content that is an immersive experience/scene in a multi-user communication session, the electronic devices 460/470 optionally display the avatars corresponding to the users of the electronic devices. Thus, one advantage of the disclosed method of displaying content corresponding to immersive applications in a multi-user communication session is that users may continue interacting with each other visually and verbally while individually experiencing the content corresponding to the immersive applications in the shared three-dimensional environment. Such an experience is possible with immersive content because the spatial relationships between users and shared virtual content within the three-dimensional environment may be consistent among all the users.

Figure 4E:
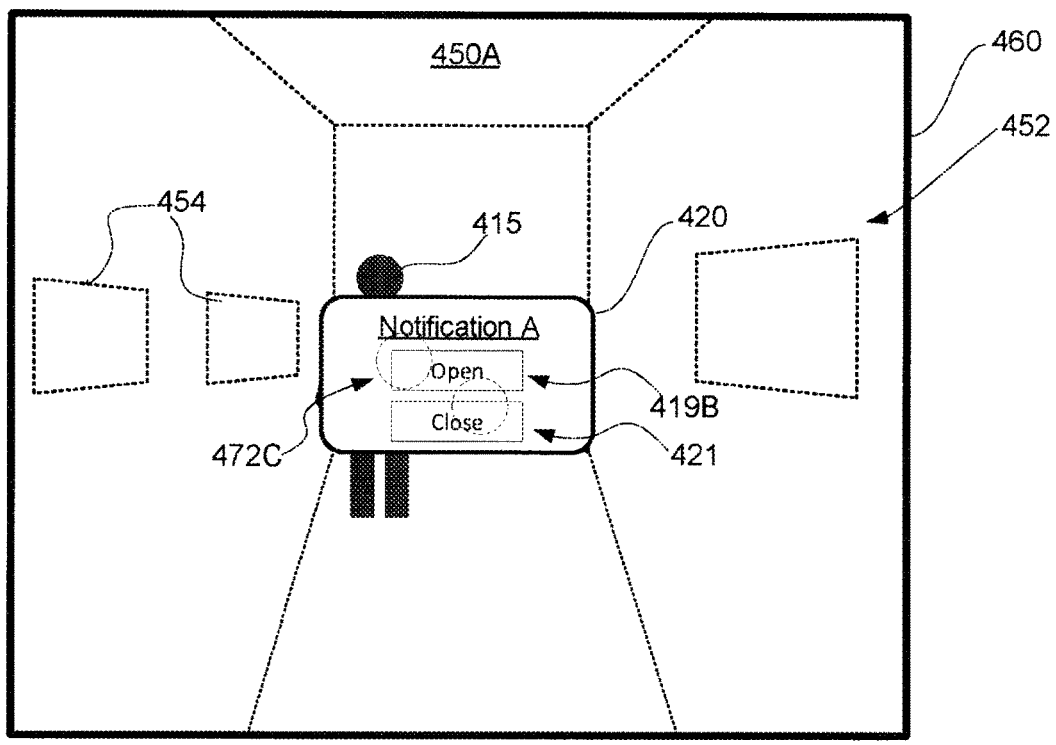
Figure 4E:
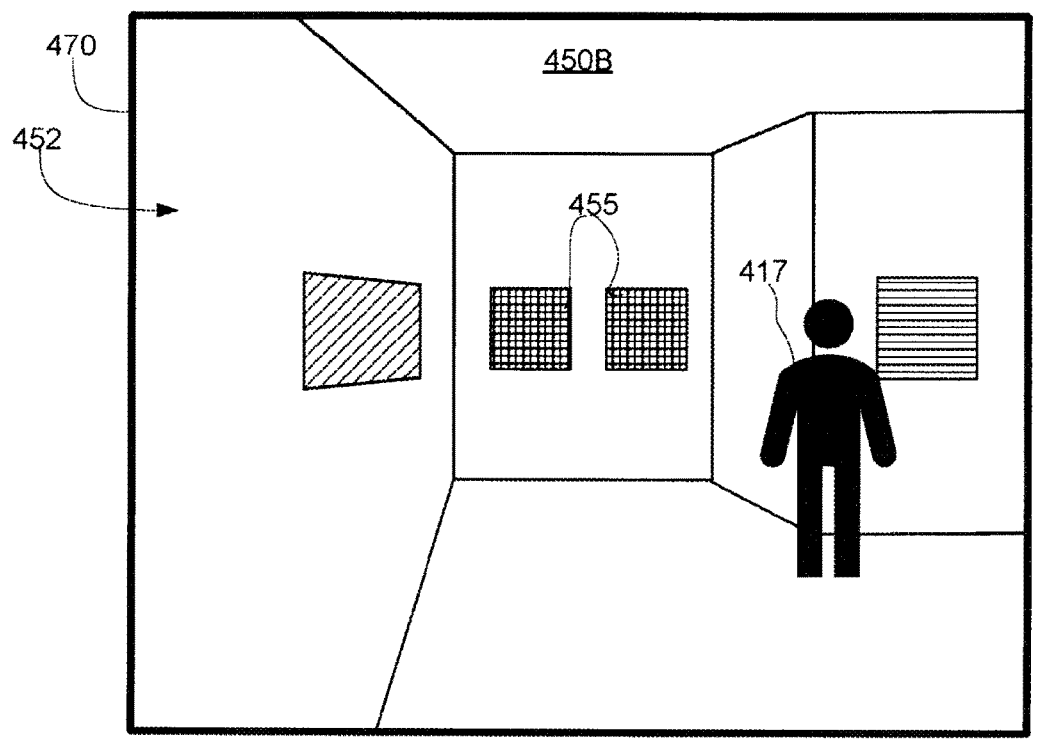

In some examples, while displaying the immersive content 452 in the three-dimensional environments 450A/450B, the user of the first electronic device 460 may receive a notification 420 corresponding to a trigger from a respective application (e.g., a respective application associated with one of the plurality of virtual objects 410 shown in FIG. 4A), as shown in FIG. 4E. In some examples, as shown, the notification 420 optionally prompts the user of the first electronic device 460 to attend to the trigger from the respective application (e.g., a messaging application, an email application, or a phone application). For example, the notification may include a first option 419B that is selectable to cause the electronic device 460 to cease displaying the immersive content 452 and launch the respective application that generated the notification 420. The notification 420 may also include a second option 421 that is selectable to cause the electronic device 460 to cease displaying the notification 420 in three-dimensional environment 450A. As shown, in some examples, all or a portion of the immersive content 452 may become visually deemphasized in three-dimensional environment 450A (e.g., as indicated by dashed lines) when the notification 420 is displayed. As shown in FIG. 4E, the notification 420 is not displayed in three-dimensional environment 450B at the second electronic device 470 because the respective application that generated the notification is an application installed on the first electronic device 460.

Figure 4F:
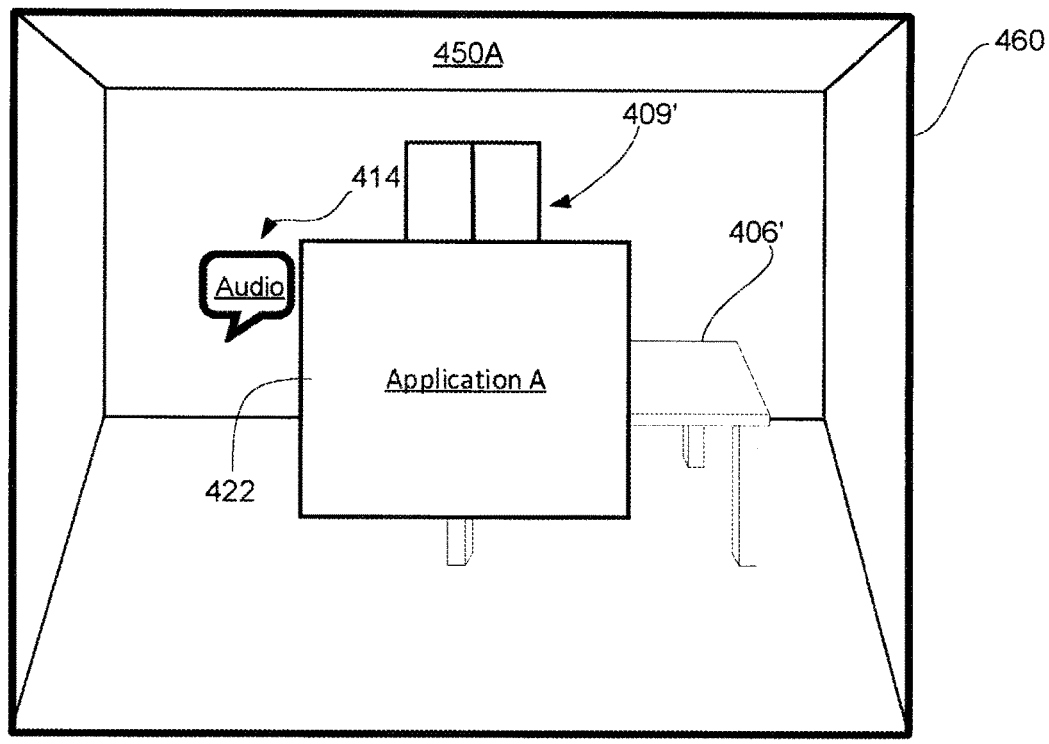
Figure 4F:
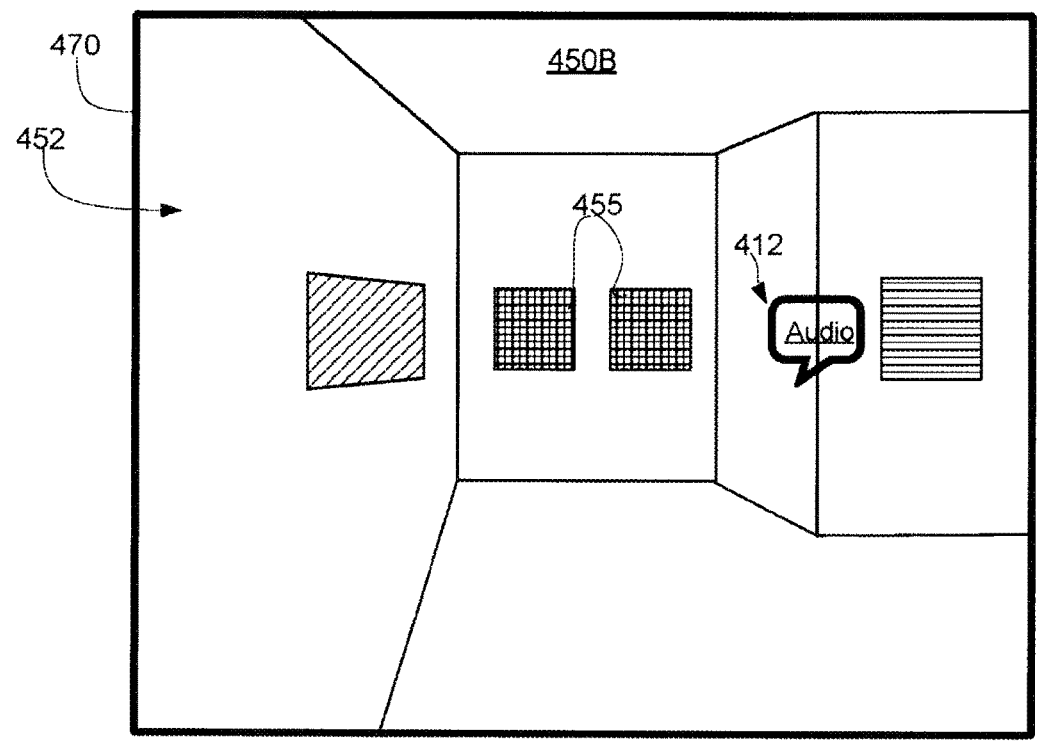

As shown in FIG. 4E, the user is providing a selection input 472C directed to the first option 419B in the notification 420 at the first electronic device 460. For example, the first electronic device 460 detects a pinch input, a touch input, a tap input, a verbal command, or some other direct or indirect gesture while the gaze of the user is directed to the first option 419B. In some examples, in response to receiving the selection input 472C, the first electronic device 460 ceases display of the immersive content 452 in three-dimensional environment 450A, as shown in FIG. 4F. For example, as shown, the immersive content 452 is no longer displayed in three-dimensional environment 450A, and the three-dimensional environment 450A once again includes the representations of portions of the physical environment surrounding the electronic device 460, such as the representation of the table 406' and the representation of the window 409'. As shown, a respective virtual object 422 corresponding to the notification 420 is displayed in three-dimensional environment 450A. In some examples, the virtual object 422 may display a user interface of the respective application (e.g., Application A) that generated the notification.

As shown in FIG. 4F, when the first electronic device 460 ceases display of the immersive content 452 in three-dimensional environment 450A, the second electronic device 470 may maintain display of the immersive content 452 in three-dimensional environment 450B. In some examples, because the first electronic device 460 and the second electronic device 470 are no longer both displaying the immersive content 452, the first electronic device 460 ceases displaying the avatar 415 corresponding to the user of the second electronic device 470, and the second electronic device 470 ceases displaying the avatar 417 corresponding to the user of the first electronic device 460. As similarly described above, though the avatars corresponding to the users of the electronic devices 460/470 are no longer displayed in three-dimensional environments 450A/450B, the first electronic device 460 optionally continues presenting the audio corresponding to the voice of the user of the second electronic device 470, as indicated by audio bubble 414, and the second electronic device 470 optionally continues presenting the audio corresponding to the voice of the user of the first electronic device 460, as indicated by audio bubble 412. In some examples, the audio corresponding to the voices of the users of electronic devices 470/460 may no longer be spatialized when avatars 415/417 cease to be displayed.

In some examples, the second electronic device 470 may cease displaying the immersive content 452 in the three-dimensional environment 450B. For example, the user of the second electronic device 470 may provide one or more respective inputs (e.g., pinch, tap, touch, verbal, etc.) corresponding to a request to navigate away from (e.g., cease displaying) the immersive content 452. In some examples, the second electronic device 470 may cease displaying the immersive content 452 in response to detecting that the first electronic device 460 is no longer displaying the immersive content 452 in three-dimensional environment 450A. For example, after detecting that the first electronic device 460 is no longer displaying the immersive content 452 in three-dimensional environment 450A, the second electronic device 470 may lose access (e.g., entitlement) to the immersive content 452 that was initially shared by the first electronic device 460. In some such examples, the second electronic device 470 may cease displaying the immersive content 452 in three-dimensional environment 450B after a threshold period (e.g., 1, 1.5, 2, 2, 4, 5, 8, or 10 s) has elapsed since the first electronic device 460 stopped displaying the immersive content 452.

In some examples, when the immersive content 452 is no longer displayed in the three-dimensional environments 450A/450B shared between the first electronic device 460 and the second electronic device 470, the avatars corresponding to the users of the electronic devices 460/470 are redisplayed in three-dimensional environments 450A/450B. For example, the first electronic device 460 optionally redisplays the avatar 415 corresponding to the user of the second electronic device 470 in three-dimensional environment 450A, and the second electronic device 470 optionally redisplays the avatar 417 corresponding to the user of the first electronic device 460 in three-dimensional environment 450B (e.g., as similarly shown in FIG. 3).

It should be understood that, while the immersive content 452 was described above as being an immersive art gallery, any type of immersive content can be provided. For example, the immersive content may refer to a video game, an immersive environmental rendering (e.g., a three-dimensional representation of a beach or a forest), a computer-generated model (e.g., a three-dimensional mockup of a house designed in a computer graphics application), and the like. Each of these types of immersive content optionally follow the above-described behavior for dictating the display of avatars in the shared three-dimensional environment. In some examples, the immersive content may refer to any content that may be navigated by a user with six degrees of freedom.

As described herein, various types of content can be shared between multiple devices while in the multi-user communication session. Attention is now directed to sharing an alternative type of content (e.g., a second type of content) in the three-dimensional environment shared between the first electronic device and the second electronic device. As described below, content that includes immersive content (e.g., video or a three-dimensional scene/environment) that is shared between the first electronic device and the second electronic device and displayed in the three-dimensional environment optionally causes the first electronic device and the second electronic device to cease displaying the avatars corresponding to the users in the shared three-dimensional environment.

FIGS. 5A-5D illustrate example interactions with shared content of a second type in a multi-user communication session according to some examples of the disclosure. In some examples, while the first electronic device 560 is in the multi-user communication session with the second electronic device 570, the three-dimensional environment 550A is presented using electronic device 560 and the three-dimensional environment 550B is presented using electronic device 570. In some examples, the electronic devices 560/570 optionally correspond to electronic devices 460/470 discussed above and/or electronic devices 360/370 in FIG. 3. In some examples, the three-dimensional environments 550A/550B include captured portions of the physical environment in which electronic devices 560/570 are located. For example, the three-dimensional environment 550A includes a table (e.g., a representation of table 506') and a window (e.g., representation of window 509'), and the three-dimensional environment 550B includes a coffee table (e.g., representation of coffee table 508') and a floor lamp (e.g., representation of floor lamp 507'). In some examples, the three-dimensional environments 550A/550B optionally correspond to three-dimensional environments 450A/450B described above and/or three-dimensional environments 350A/350B in FIG. 3. As described above, the three-dimensional environments also include avatars 515/517 corresponding to a user of the electronic devices 570/560. In some examples, the avatars 515/517 optionally correspond to avatars 415/417 described above and/or avatars 315/317 in FIG. 3.

Figure 5A:
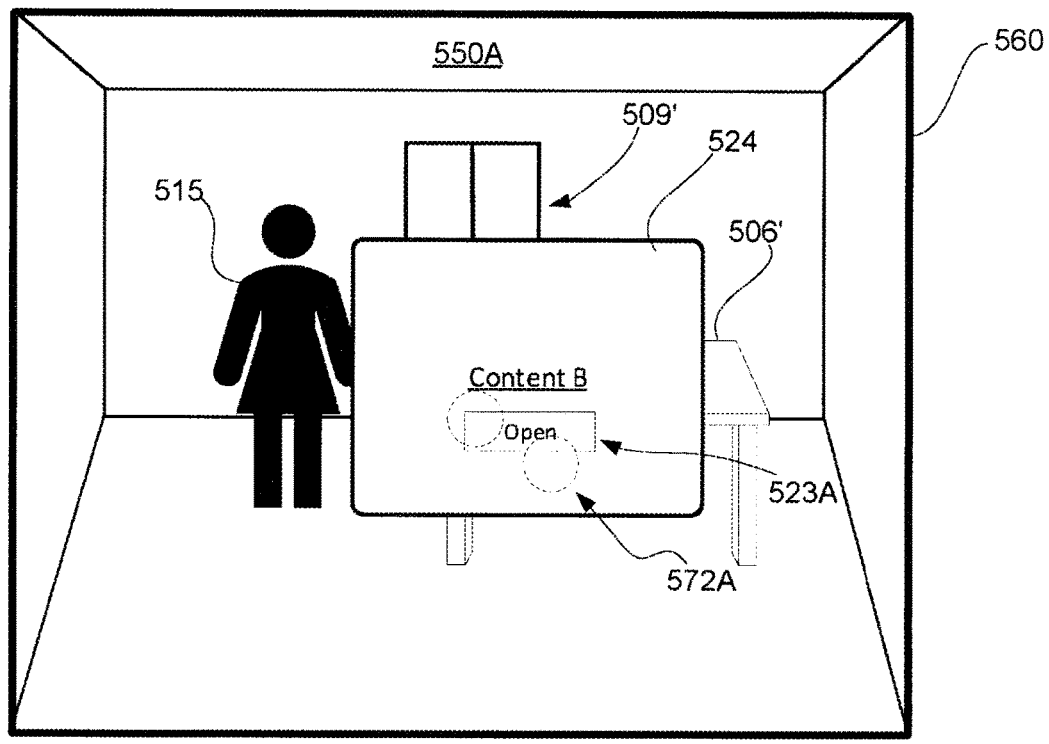
FIGS. 5A-5D illustrate example interactions with shared content of a second type in a multi-user communication session according to some examples of the disclosure.
Figure 5A:
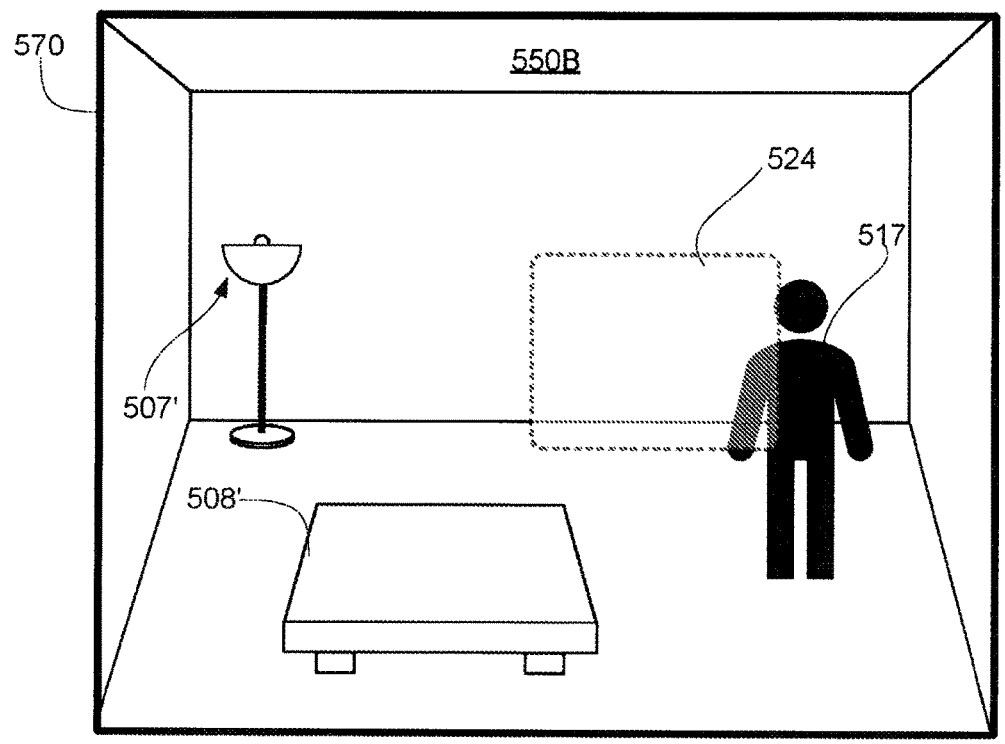

As shown in FIG. 5A, the first electronic device 560 is optionally displaying a user interface element 524 corresponding to a respective application running on the first electronic device 560 (e.g., one of the applications corresponding to virtual objects 410 in FIG. 4A). In some examples, the user interface element 524 corresponds to an immersive video playback application running on the first electronic device 560. For example, the user interface element 524 includes an option 523A that is selectable to cause the electronic device 560 to display content (e.g., Content B) corresponding to the immersive video playback application in three-dimensional environment 550A. In some examples, the content is an immersive (e.g., three-dimensional) video (e.g., an immersive (e.g., three-dimensional) representation of a movie, an episode, a clip, etc.) or scene/environment that can be displayed in the three-dimensional environments 550A/550B.

In some examples, virtual objects (e.g., application windows and user interfaces, representations of content, application icons, and the like) that are viewable by a user may be private while the user is participating in a multi-user communication session with one or more other users (e.g., via electronic devices that are communicatively linked in the multi-user communication session). For example, as discussed above, the user of the first electronic device 560 is optionally viewing the user interface element 524 in three-dimensional environment 550A. In some examples, a representation of the user interface element is displayed in three-dimensional environment 550B at the second electronic device 570 with the avatar 517 corresponding to the user of the first electronic device 560. In some such examples, the representation of the user interface element 524 displayed in three-dimensional environment 550B is optionally an occluded (e.g., a faded or blurred) representation of the user interface element 524 displayed in three-dimensional environment 550A. For example, the user of the second electronic device 570 is prevented from viewing the contents of the user interface element 524 displayed in three-dimensional environment 550A at the first electronic device 560.

Figure 5B:
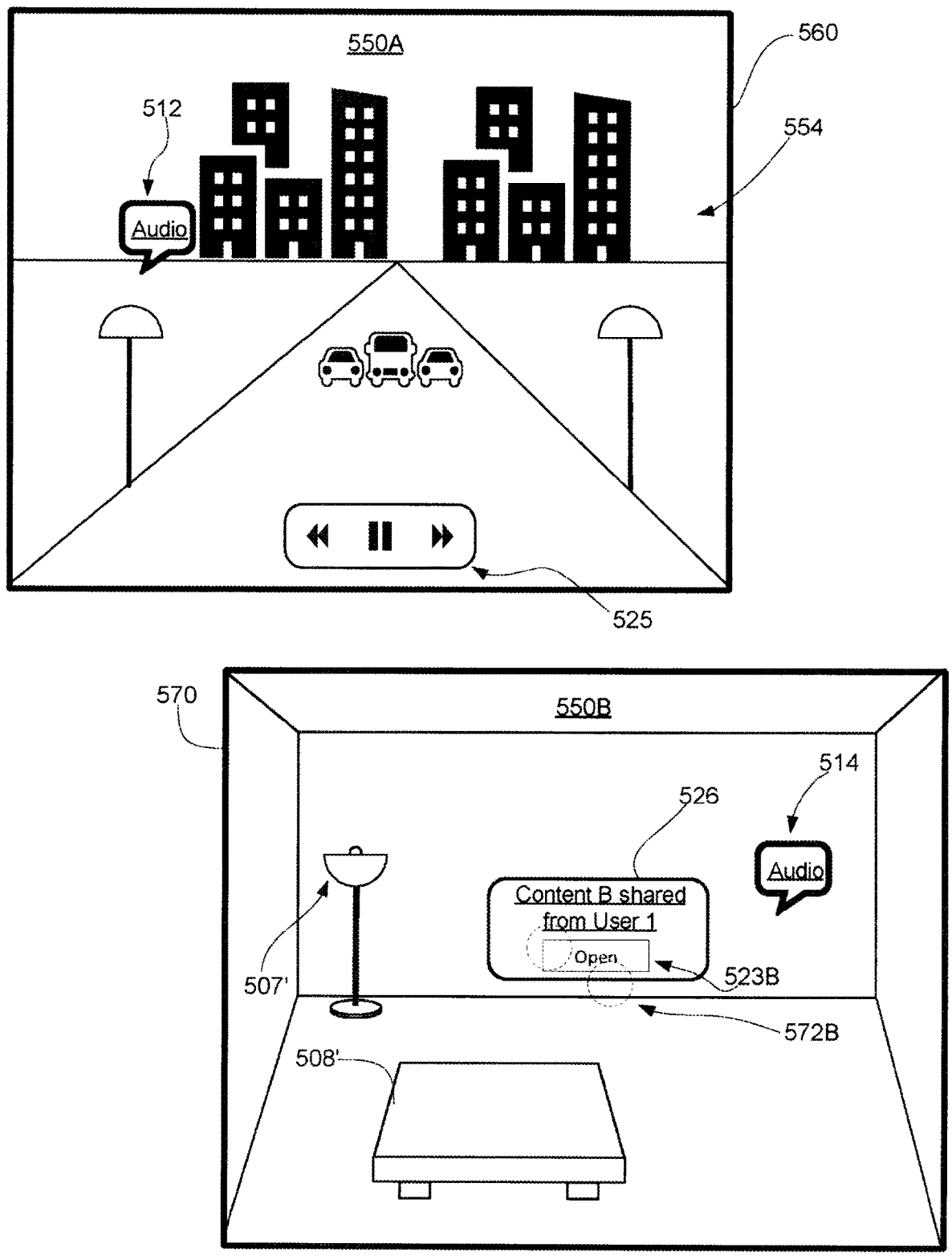

As shown in FIG. 5A, the user of the first electronic device 560 is providing a selection input 572A directed to the selectable option 523A. For example, the first electronic device 560 detects a pinch input (e.g., in which the index finger and the thumb of the user make contact), a tap or touch input (e.g., via the index finger of the user), a verbal command, or some other direct or indirect input while the gaze of the user is directed to the option 523A. In some examples, in response to receiving the selection input 572A, the first electronic device 560 optionally updates display of the three-dimensional environment 550A to include a three-dimensional representation of the immersive content, as shown in FIG. 5B. For example, as shown in FIG. 5B, in some examples, the first electronic device 560 replaces display of the three-dimensional environment 550A of FIG. 5A with the three-dimensional representation of the immersive content 554. In some examples, the first electronic device 560 displays a virtual object (e.g., a three-dimensional representation) corresponding to the immersive content in the three-dimensional environment 550A of FIG. 5A. In some examples, as shown, the immersive content 554 is an immersive (e.g., three-dimensional) video. In other examples, the immersive content is a three-dimensional scene/environment that is viewable from a limited perspective (e.g., with three degrees of freedom). In some examples, the first electronic device 560 also displays one or more affordances 525 that are selectable for controlling playback of the immersive content 554.

As discussed above with reference to FIGS. 4A-4F, in some examples, while the first electronic device 560 and the second electronic device 570 are communicatively linked in the multi-user communication session, when one electronic device displays certain types of content in the three-dimensional environment that has not been shared with the other electronic device, the avatars corresponding to the users of the electronic devices 560/570 cease to be displayed. For example, as shown in FIG. 5B, at the first electronic device 560, the avatar 515 corresponding to the user of the second electronic device 570 ceases to be displayed in three-dimensional environment 550A, but the audio corresponding to the voice of the user of the second electronic device 570 continues to be presented, as indicated by audio bubble 512. In some examples, the audio corresponding to the voice of the user of the second electronic device 570 may also transition from a spatial presentation to a mono or stereo presentation. Similarly, as shown, at the second electronic device 570, the avatar 517 corresponding to the user of the first electronic device 560 ceases to be displayed in three-dimensional environment 550B, but the audio corresponding to the voice of the user of the first electronic device 560 continues to be presented, as indicated by audio bubble 514. In some examples, the audio corresponding to the voice of the user of the first electronic device 560 may also transition from a spatial presentation to a mono or stereo presentation.

In some examples, as previously described herein, the immersive content 554 may be shared with the second electronic device 570 for displaying the immersive content 554 in three-dimensional environment 550B. For example, while the first electronic device 560 and the second electronic device 570 are in the multi-user communication session, the user of the first electronic device 560 may provide one or more inputs for sharing the immersive content 554 with the second electronic device 570 (e.g., via a "share" affordance displayed in a respective user interface element or application user interface in three-dimensional environment 550A, a verbal command, etc.). In some examples, the second electronic device 570 may detect an indication corresponding to a request from the first electronic device 560 to share the immersive content 554 with the second electronic device 570. In response to detecting the indication, the second electronic device 570 may display a respective user interface element 526 corresponding to the share request. For example, as shown in FIG. 5B, the respective user interface element 526 may include an option 523B that is selectable for causing the second electronic device to accept the share request from electronic device 560 and display the immersive content (e.g., immersive video) 554 in three-dimensional environment 550B. As shown, the user of the second electronic device 570 is optionally providing a selection input 572B directed to the selectable option 523B in the respective user interface element 526 in three-dimensional environment 550A. For example, the second electronic device 570 optionally detects a pinch input, touch or tap input, verbal command, or some other direct or indirect input while the gaze of the user of the second electronic device 570 is directed to the selectable option 523B.

Figure 5C:
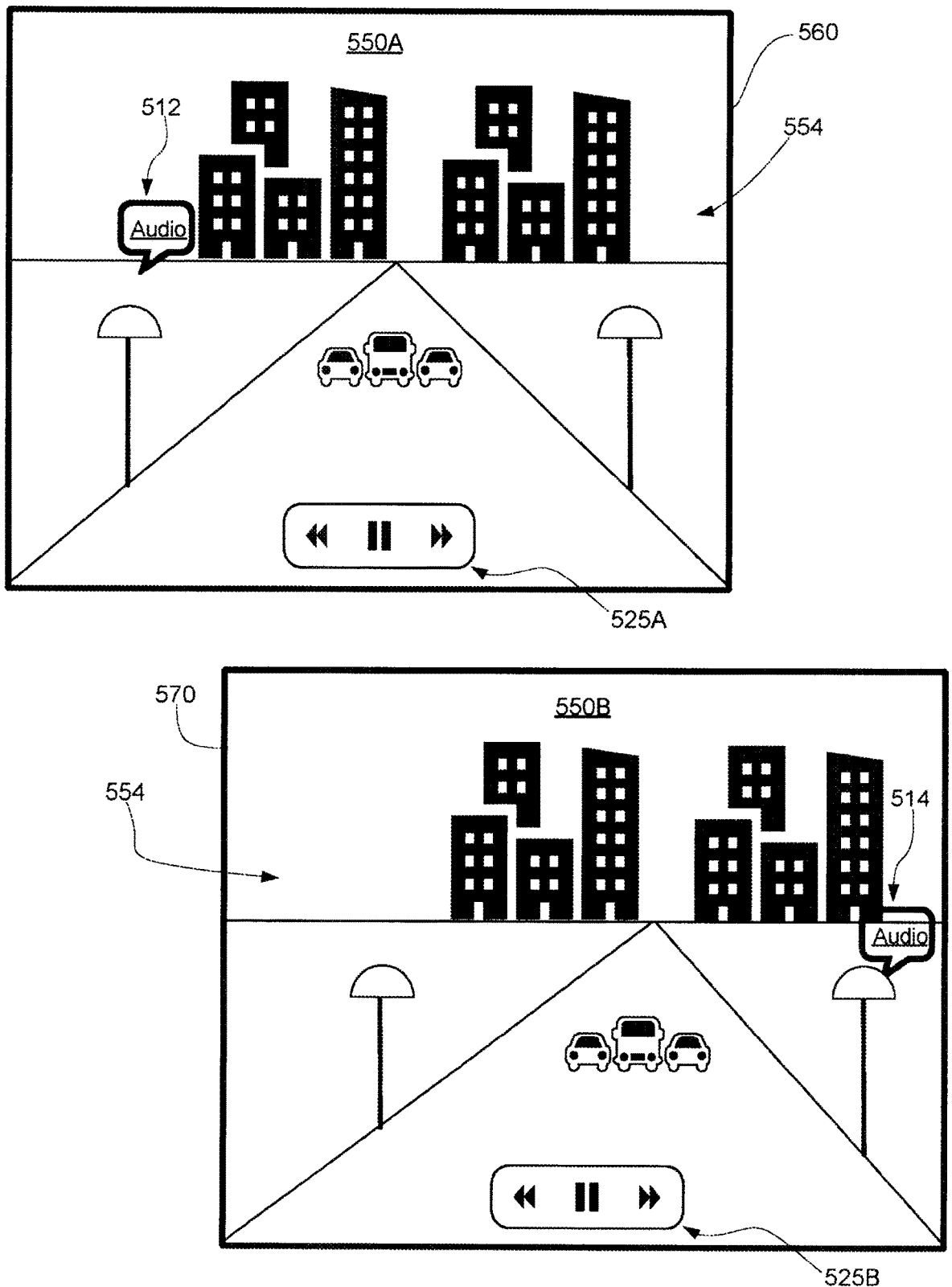

In some examples, as shown in FIG. 5C, in response to detecting the selection input 572B, the second electronic device 570 may update display of three-dimensional environment 550B with the three-dimensional representation of the immersive video 554. As shown, the first electronic device 560 and the second electronic device 570 are now both displaying the immersive content 554, such that a respective playback position within the video content is the same at both electronic devices 560 and 570. For example, the user of the first electronic device 560 and the user of the second electronic device 570 are experiencing the immersive content 554 at the same playback position and speed within the shared three-dimensional environments 550A/550B. Additionally, the user of the first electronic device 560 and the user of the second electronic device 570 optionally have unique (e.g., different) viewpoints of the immersive content 554, as shown in FIG. 5C. For example, the user of the first electronic device 560 has a first viewpoint of the immersive content in which the cars in a respective scene of the immersive content 554 are positioned substantially centrally in the center of the user's field of view, and the user of the second electronic device 570 has a second viewpoint of the immersive content 554 in which the cars in the respective scene of the immersive content 554 are positioned substantially to the right of center in the user's field of view.

In some examples, in response to displaying the immersive video 554 in three-dimensional environment 550B, such that the immersive video 554 is displayed at both the first electronic device 560 and the second electronic device 570, the avatars corresponding to the users of the electronic devices 560/570 are not redisplayed in the three-dimensional environments. For example, as shown in FIG. 5C, the avatar (e.g., 515 in FIG. 5A) corresponding to the user of the second electronic device 570 is not redisplayed in three-dimensional environment 550A, and the avatar (e.g., 517 in FIG. 5A) corresponding to the user of the first electronic device 560 is not redisplayed in three-dimensional environment 550B. As mentioned above, in some examples, while in the communication session, the first electronic device 560 and the second electronic device 570 may selectively display the avatars 515/517 depending on the type of content that is shared and displayed in three-dimensional environments 550A/550B. Because the immersive content shared between the two electronic devices optionally corresponds to an immersive video, the users of the electronic devices 560/570 may view the content from a fixed location. For example, the users of the electronic devices 560/570 can reorient the electronic devices 560/570 (e.g., by moving the user's head/hands wearing/holding the electronic device to a different pose/orientation) in the physical environment surrounding electronic devices 560/570 to change the viewpoint of the three-dimensional environments 550A/550B. However, the users of the electronic devices 560/570 cannot virtually move a location of the viewpoint of the three-dimensional environments 550A/550B. Thus, the immersive content 554 provides the user with three virtual degrees of freedom when viewing the immersive content 554 in three-dimensional environments 550A/550B. In some such examples, display of the avatars corresponding to the users of the electronic devices could obscure or distract from portions of the immersive content 554 from one or more users' viewpoints, which could thus hinder or negatively impact the viewing experience of the one or more users. Additionally or alternatively, in some examples, if the users' viewpoints of the immersive content 554 are the same (e.g., are at the same location in three-dimensional environments 550A/550B), the avatars corresponding to the users of the electronic devices may not be displayed as they would undesirably be positioned at the same location in three-dimensional environments 550A/550B.

Accordingly, as outlined above, when sharing immersive content that is viewable from a limited perspective (e.g., with three degrees of freedom, such as an immersive video) in a multi-user communication session, the electronic devices 560/570 optionally forgo displaying the avatars corresponding to the users of the electronic devices and maintain presentation of the audio corresponding to the voices of the users. In some examples, the audio corresponding to the voices of the users may no longer be spatialized when corresponding avatars are not displayed. Thus, one advantage of the disclosed method of displaying immersive content in a multi-user communication session is that users may continue interacting with each other verbally while an unobscured view of the immersive content is maintained in the shared three-dimensional environment.

Figure 5D:
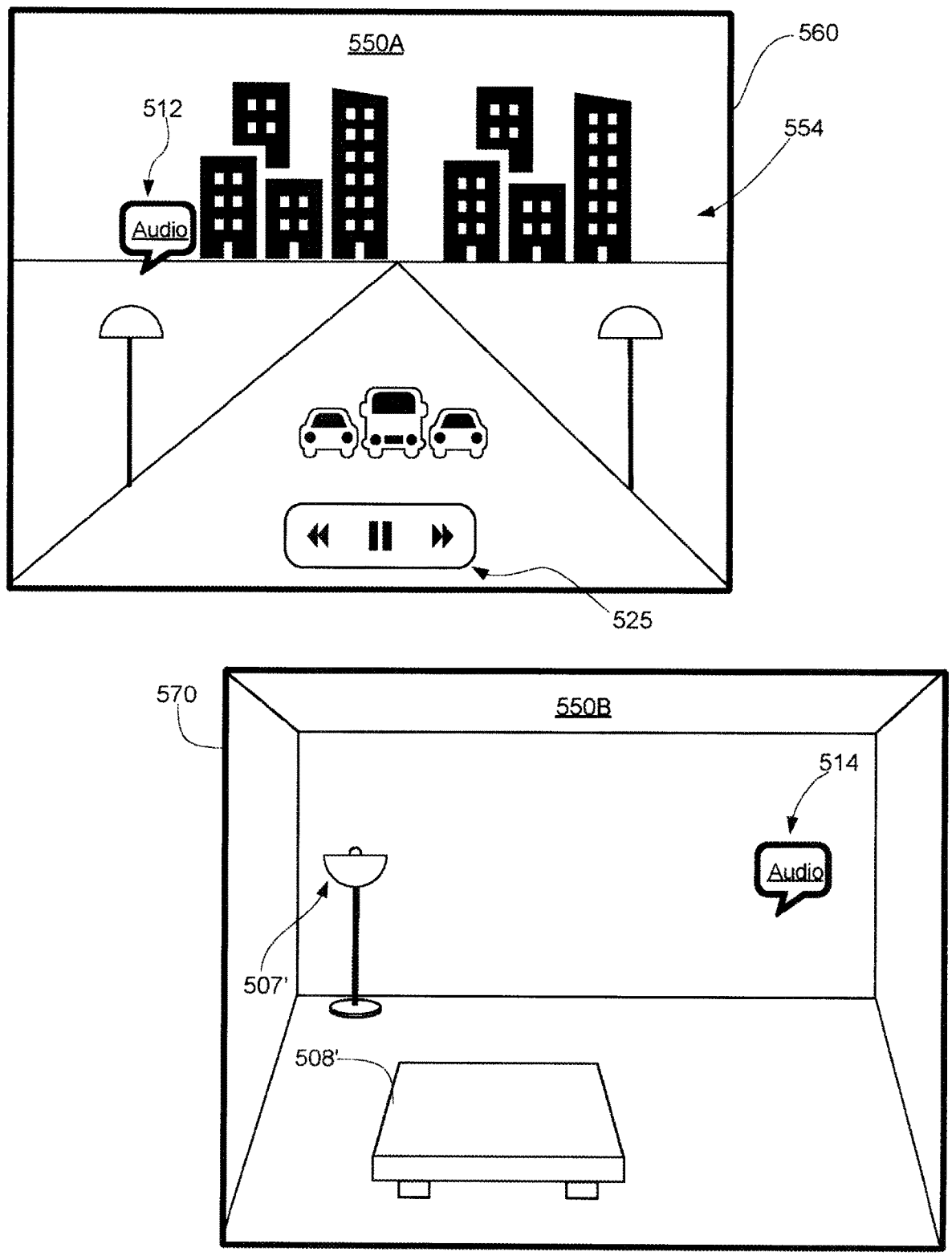

In some examples, the user of electronic devices 560/570 may provide one or more respective inputs corresponding to a request to cease displaying the immersive content 554 in three-dimensional environments 550A/550B. For example, while the first electronic device 560 and the second electronic device 570 are in the multi-user communication session, the user of the second electronic device 570 may provide one or more inputs for ceasing display of the immersive content 554 in the three-dimensional environment 550B (e.g., via a "close" or "exit" affordance displayed in a respective user interface element in three-dimensional environment 550B, a verbal command, etc.). In some examples, in response to receiving the one or more respective inputs, the second electronic device optionally ceases display of the immersive content in three-dimensional environment 550B, as shown in FIG. 5D. For example, as shown, the second electronic device 570 optionally redisplays the captured portions of the physical environment surrounding the electronic device 570, such as the representation of the floor lamp 507' and the representation of the coffee table 508', in three-dimensional environment 550B.

In some examples, after the immersive content 554 ceases to be displayed in three-dimensional environment 550B, the first electronic device 560 and the second electronic device 570 forgo redisplaying the avatars corresponding to the users of the electronic devices 560 and 570. As shown in FIG. 5D, because the immersive content 554 is still displayed at the first electronic device 560, the avatar (e.g., 515 in FIG. 5A) corresponding to the user of the second electronic device 570 is not displayed in three-dimensional environment 550A and the avatar (e.g., 517 in FIG. 5A) corresponding to the user of the first electronic device 560 is not displayed in three-dimensional environment 550B. As illustrated in FIG. 5D, though the avatars corresponding to the users of the electronic devices 560/570 are not displayed in the three-dimensional environment, the presentation of the audio corresponding to the voices of the users of the electronic devices is optionally maintained, as indicated by audio bubbles 512/514. However, in some examples, the audio corresponding to the voices of the users of the electronic devices may no longer be spatialized when the corresponding avatars are no longer displayed.

It should be understood that, in some examples, if the user of the first electronic device 560 were to provide one or more respective inputs (e.g., such as pinch, tap, touch, verbal, etc. described above) corresponding to a request to cease displaying the immersive video 554, in response to receiving the one or more respective inputs, the first electronic device 560 would cease displaying the immersive video 554 in three-dimensional environment 550A. Additionally, after ceasing display of the immersive video 554 at the first electronic device 560, the first electronic device 560 and the second electronic device 570 would redisplay the avatars corresponding to the users of the electronic devices 560/570 in the three-dimensional environments (e.g., as similarly shown in FIG. 3). In some examples, the first electronic device and the second electronic device 570 may also re-spatialize the audio corresponding to the voices of the users of the first electronic device 560 and the second electronic device 570.

As described herein, various types of content can be shared between multiple devices while in the multi-user communication session. Attention is now directed to sharing an alternative type of content (e.g., a third type of content) in the three-dimensional environment shared between the first electronic device and the second electronic device. As described below, content that includes non-immersive content (e.g., two-dimensional images, two-dimensional videos, three-dimensional objects, or the like) that is shared between the first electronic device and the second electronic device and displayed in the three-dimensional environment optionally causes the first electronic device and the second electronic device to maintain displaying the avatars corresponding to the users in the shared three-dimensional environment.

Figure 6A:
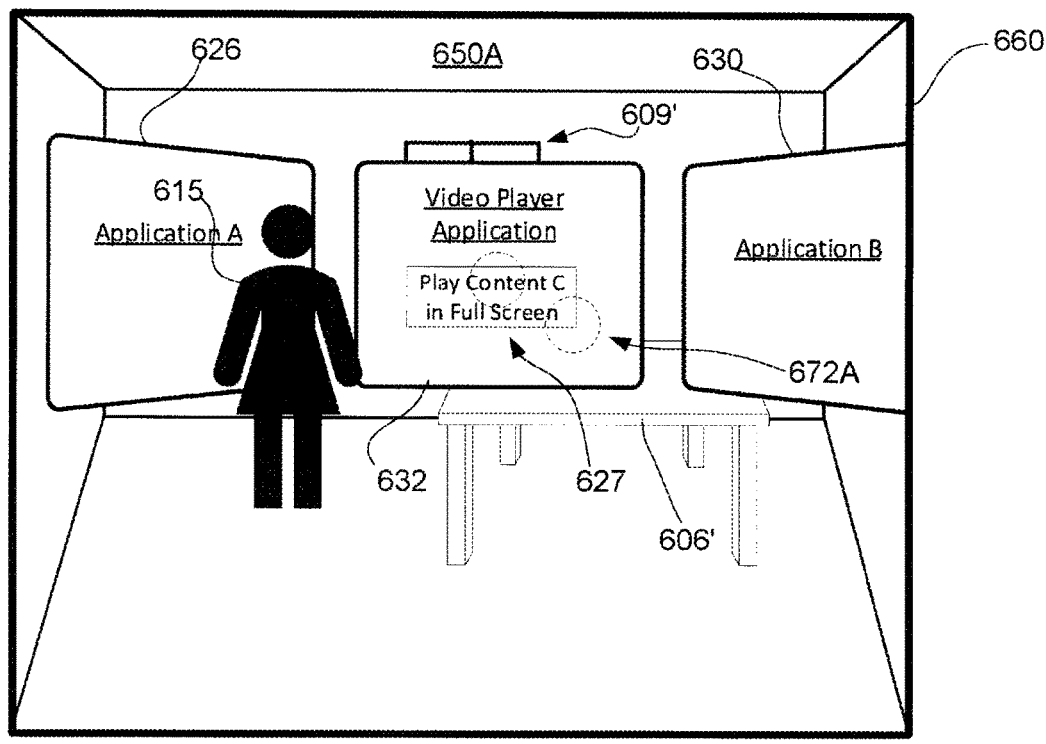
FIGS. 6A-6C illustrate example interactions with shared content of a third type in a multi-user communication session according to some examples of the disclosure.
Figure 6A:
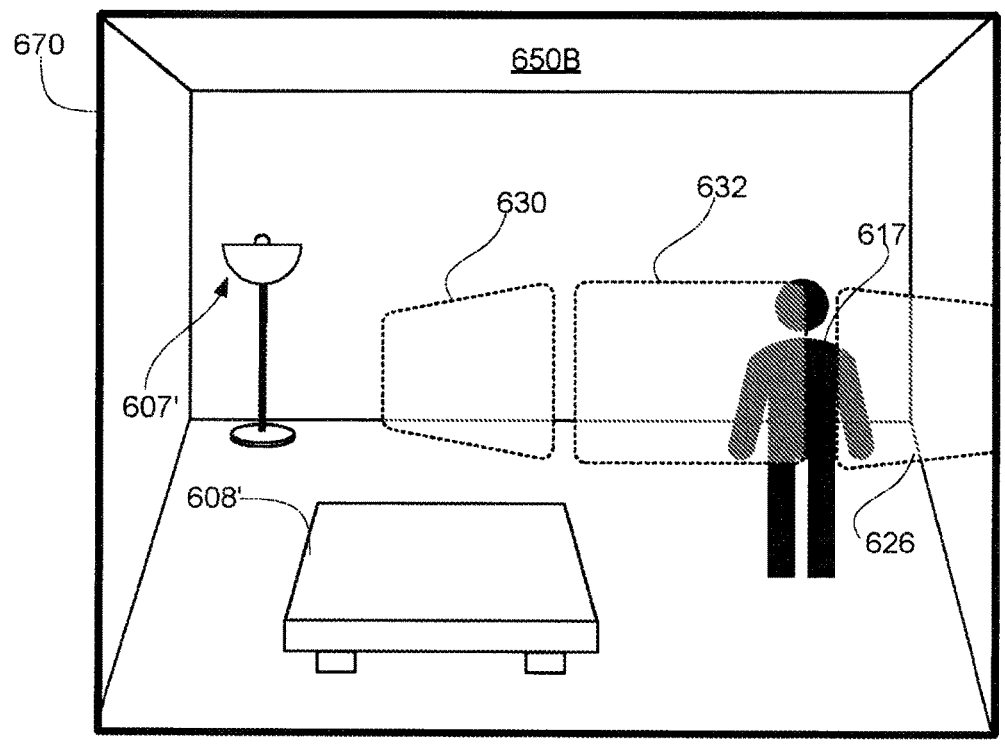
Figure 6B:
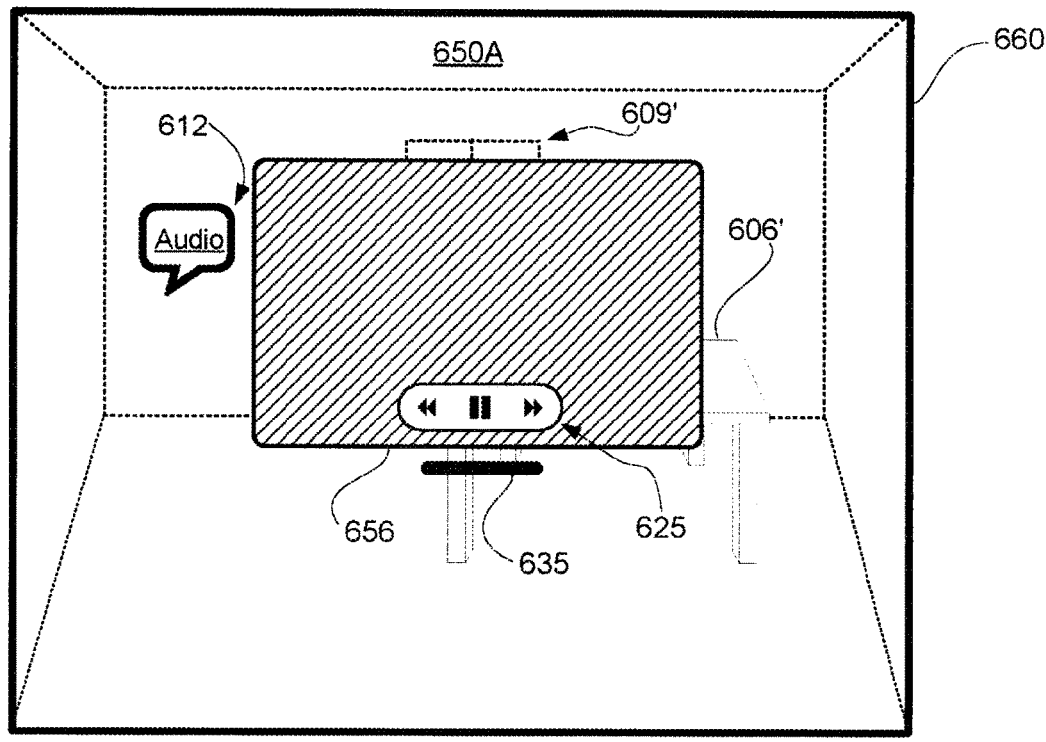
Figure 6B:
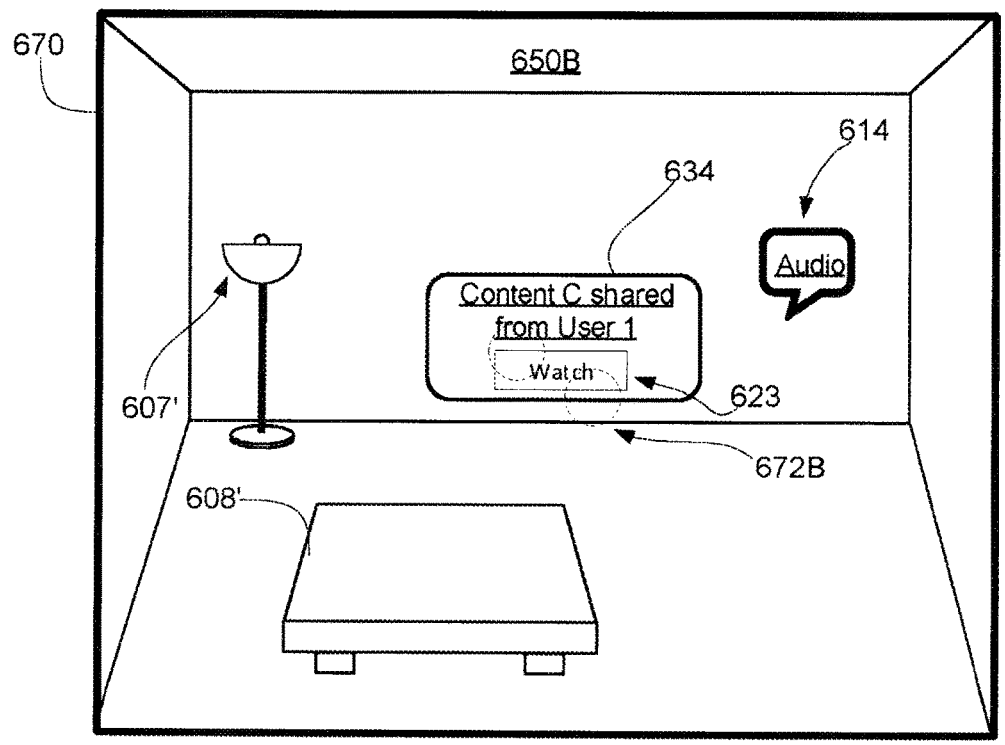
Figure 6C:
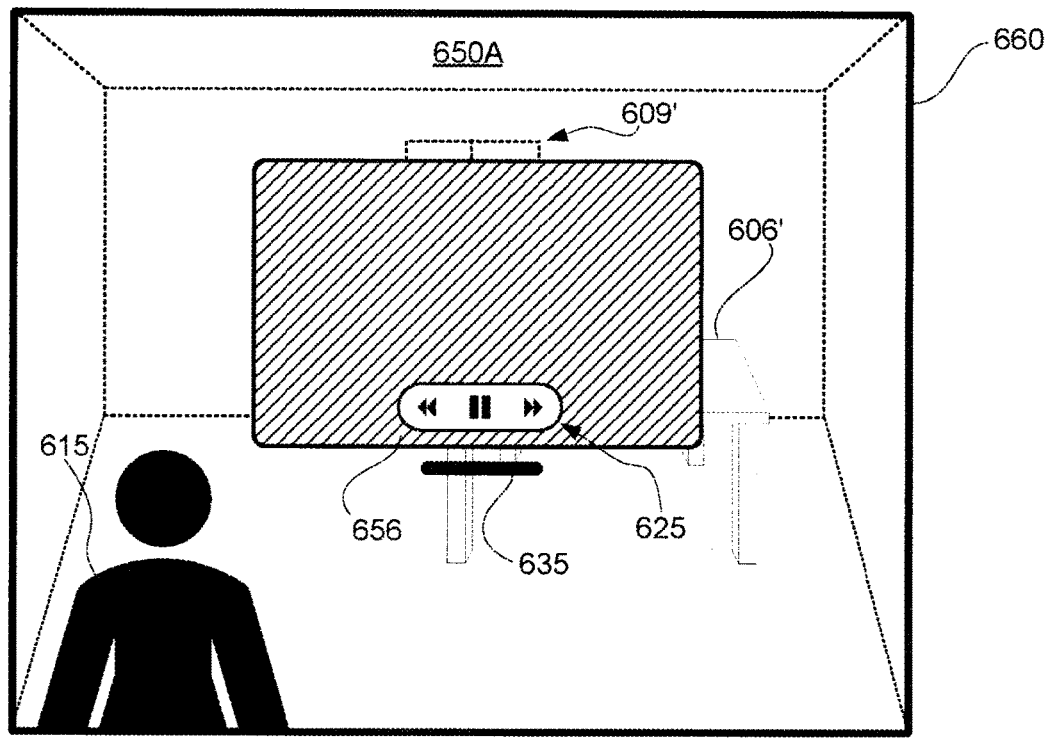
Figure 6C:
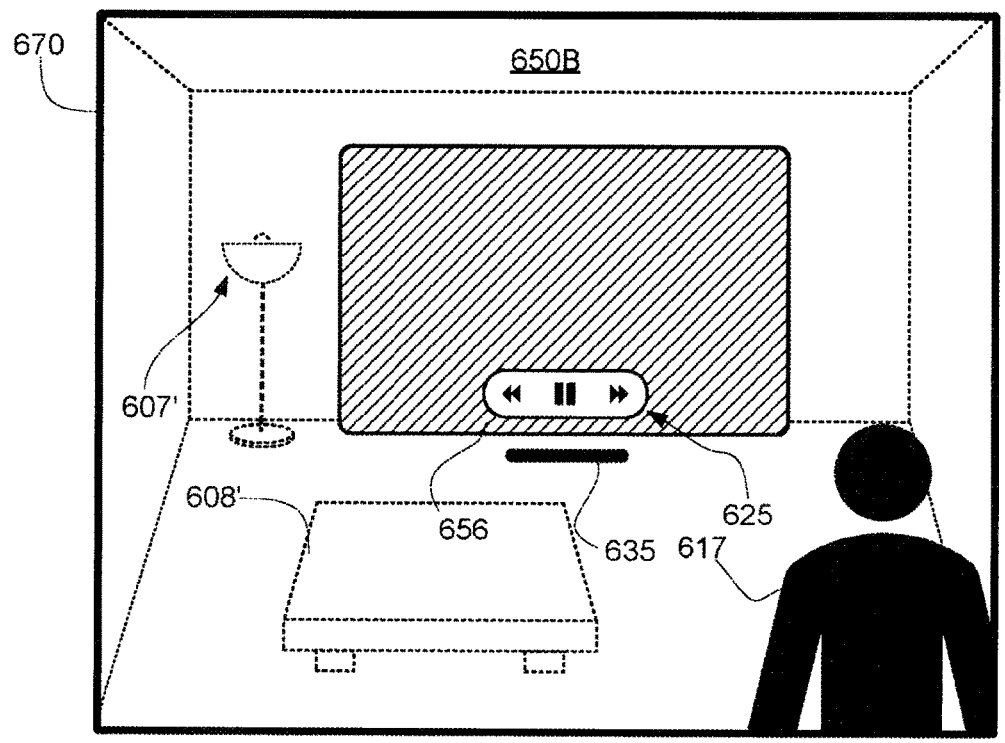

FIGS. 6A-6C illustrate example interactions with shared content of a third type in a multi-user communication session according to some examples of the disclosure. In some examples, while the first electronic device 660 is in the multi-user communication session with the second electronic device 670, the three-dimensional environment 650A is presented using electronic device 660 and the three-dimensional environment 650B is presented using electronic device 670. In some examples, the electronic devices 660/670 optionally correspond to electronic devices 560/570 discussed above, electronic devices 460/470 in FIGS. 4A-4F, and/or electronic devices 360/370 in FIG. 3. In some examples, the three-dimensional environments 650A/650B include captured portions of the physical environment in which electronic device 660/670 is located. For example, the three-dimensional environment 650A includes a table (e.g., a representation of table 606') and a window (e.g., representation of window 609'), and the three-dimensional environment 650B includes a coffee table (e.g., representation of coffee table 608') and a floor lamp (e.g., representation of floor lamp 607'). In some examples, the three-dimensional environments 650A/650B optionally correspond to three-dimensional environments 550A/550B described above, three-dimensional environments 450A/450B in FIGS. 4A-4F, and/or three-dimensional environments 350A/350B in FIG. 3. As described above, the three-dimensional environments also include avatars 615/617 corresponding to users of the electronic devices 670/660. In some examples, the avatars 615/617 optionally correspond to avatars 515/517 described above, avatars 415/417 in FIGS. 4A-4F, and/or avatars 315/317 in FIG. 3.

As shown in FIG. 6A, the first electronic device 660 is optionally displaying a plurality of virtual objects representative of application windows corresponding to respective applications running on the first electronic device 660 (e.g., one of the applications corresponding to virtual objects 410 in FIG. 4A). For example, the three-dimensional environment 650A includes a first virtual object 626 corresponding to a first application (e.g., Application A), a second virtual object 630 corresponding to a second application (e.g., Application B), and a third virtual object 632 corresponding to a third application (e.g., Video Player Application). In some examples, the first virtual object 626, the second virtual object 630, and the third virtual object 632 are displayed with respective orientations angled toward the viewpoint of the user of the first electronic device 660, such that a user interface displayed on each of the virtual objects faces toward the viewpoint of the user. In some examples, the first virtual object 626 may partially occlude the avatar 615 corresponding to the user of the second electronic device 670. In some examples, the third virtual object 632 corresponds to a video playback application running on the first electronic device 660 that is configured to display video content in three-dimensional environment 650A. For example, the third virtual object 632 includes an option 627 that is selectable to cause the electronic device 660 to display content (e.g., Content C) associated with the video playback application in three-dimensional environment 650A. In some examples, the content is an image, virtual object, video (e.g., a two-dimensional representation of a movie, an episode, a clip, etc., a three-dimensional representation of a movie, an episode, a clip, etc. that is bounded within a two or three-dimensional boundary or volume, or the like) that can be displayed in a full-screen mode in the three-dimensional environments 650A/650B.

As used herein, display of video content in a "full-screen mode" in the three-dimensional environments 650A/650B optionally refers to display of the video content at a respective size and/or with a respective visual emphasis in the three-dimensional environments 650A/650B. For example, the electronic devices 660/670 may display the video content at a size that is larger than (e.g., 1.2×, 1.4×, 1.5×, 2×, 2.5×, or 3×) the size of the third virtual object 632 containing the option 627 in three-dimensional environments 650A/650B. Additionally, for example, the video content may be displayed with a greater visual emphasis than other virtual objects and/or representations of physical objects displayed in three-dimensional environments 650A/650B. As described in more detail below, while the video content is displayed in the full-screen mode, the first, second, and third virtual objects 626, 630, and 632 may become visually deemphasized (e.g., may cease being displayed in three-dimensional environments 650A/650B), and the captured portions of the physical environment surrounding the electronic devices 660/670 may become faded and/or darkened in three-dimensional environments 650A/650B.

As described previously with reference to FIG. 5A, in some examples, virtual objects (e.g., application windows and user interfaces, representations of content, application icons, and the like) that are viewable by a user may be private while the user is participating in a multi-user communication session with one or more other users (e.g., via electronic devices that are communicatively linked in the multi-user communication session). For example, as discussed above, the user of the first electronic device 660 is optionally viewing the first, second, and third virtual objects 626, 630, and 632 in three-dimensional environment 650A. In some examples, a representation of each of the virtual objects is displayed in three-dimensional environment 650B at the second electronic device 670 with the avatar 617 corresponding to the user of the first electronic device 660. For example, the virtual objects 626, 630, and 632 displayed in the three-dimensional environment 650B have respective orientations angled toward the avatar 617 corresponding to the user of the first electronic device 660 (e.g., which optionally mirrors that shown at the first electronic device 660 in FIG. 6A). Additionally, in some examples, the representations of the plurality of virtual objects 626, 630, and 632 displayed in three-dimensional environment 650B are optionally occluded (e.g., faded or blurred) representations of the plurality of virtual objects 626, 630, and 632 displayed in three-dimensional environment 650A. For example, the user of the second electronic device 670 is prevented from viewing the contents of any of the virtual objects 626, 630, and 632 displayed in three-dimensional environment 650A at the first electronic device 660.

As shown in FIG. 6A, the user of the first electronic device 660 is optionally providing a selection input 672A directed to the selectable option 627 in the third virtual object 632. For example, the first electronic device 660 detects a pinch input (e.g., one in which the index finger and thumb of the user come into contact), a tap or touch input (e.g., provided by the index finger of the user), a verbal command, or some other direct or indirect input while the gaze of the user of the first electronic device 660 is directed to the selectable option 627. In some examples, in response to detecting the selection input 672A, the first electronic device 660 displays video content 656 associated with the third virtual object 632 (e.g., video playback application object) in three-dimensional environment 650A in a full-screen mode, as shown in FIG. 6B. For example, as shown in FIG. 6B, the first electronic device 660 replaces display of the third virtual object 632 with a two-dimensional representation of the video content 656 in three-dimensional environment 650A. For example, the video content 656 is displayed within a new, larger object in three-dimensional environment 650A. Additionally, in some examples, when presenting content in the full-screen mode, the first electronic device 660 visually deemphasizes display of the first virtual object 626 and the second virtual object 630. For example, as shown in FIG. 6B, while presenting the video content 656 in the full-screen mode, the first electronic device 660 ceases display of the first virtual object 626 and the second virtual object 630 in three-dimensional environment 650A.

As shown in FIG. 6B, in some examples, the video content 656 is displayed in three-dimensional environment 650A with one or more playback controls 625. For example, the one or more playback controls 625 include one or more selectable options for pausing playback of the video content, scrubbing (e.g., rewinding and/or fast-forwarding) through the video content, controlling a volume of audio associated with the video content, etc. Additionally, as shown, the first electronic device 660 optionally displays the full-screen video content 656 with an interaction affordance (e.g., a grabber or handlebar) 635. In some examples, the grabber or handlebar 635 may be selectable (e.g., via pinch, touch, or tap input) by the user of the first electronic device to initiate movement of the (e.g., object containing the) video content 656 within the three-dimensional environment 650A. In some examples, while the first electronic device 660 is presenting the video content 656 in the full-screen mode, the first electronic device 660 may visually deemphasize the representations of the captured portions of the physical environment surrounding the first electronic device 660. For example, as indicated by the dashed lines in FIG. 6B, the representation of the table 606', the representation of the window 609' and the representations of the floor, ceiling, and walls surrounding the electronic device 660 may be visually deemphasized (e.g., faded, darkened, or adjusted to be opaque) in the three-dimensional environment 650A such that attention is drawn predominantly to the video content 656 in the full-screen mode.

As discussed previously herein, in some examples, while the first electronic device 660 and the second electronic device 670 are communicatively linked in the multi-user communication session, when one electronic device displays certain types of content in the three-dimensional environment that has not been shared with the other electronic device, the avatars corresponding to the users of the electronic devices 660/670 cease to be displayed. For example, as shown in FIG. 6B, at the first electronic device 660, the avatar 615 corresponding to the user of the second electronic device 670 ceases to be displayed in three-dimensional environment 650A, but the audio corresponding to the voice of the user of the second electronic device 670 continues to be presented, as indicated by audio bubble 612. In some examples, the audio corresponding to the voice of the user of the second electronic device 670 may transition from a spatial presentation to a mono or stereo presentation. Similarly, as shown, at the second electronic device 670, the avatar 617 corresponding to the user of the first electronic device 660 ceases to be displayed in three-dimensional environment 650B, but the audio corresponding to the voice of the user of the first electronic device 660 continues to be presented, as indicated by audio bubble 614 in FIG. 6B. In some examples, the audio corresponding to the voice of the user of the first electronic device 660 may transition from a spatial presentation to a mono or stereo presentation.

In some examples, as previously described herein, the video content 656 may be shared with the second electronic device 670 for displaying the video content 656 in three-dimensional environment 650B. For example, while the first electronic device 660 and the second electronic device 670 are in the multi-user communication session, the user of the first electronic device 660 may provide one or more inputs for sharing the video content 656 with the second electronic device 670 (e.g., via a "share" affordance displayed in a respective user interface element or application user interface in three-dimensional environment 650A, a verbal command, etc.). In some examples, the second electronic device 670 may detect an indication corresponding to a request from the first electronic device 660 to share the content 656 with the second electronic device 670. In response to detecting the indication, the second electronic device 670 may display a respective user interface element 634 corresponding to the share request. For example, as shown in FIG. 6B, the respective user interface element 634 may include an option 623 that is selectable for causing the second electronic device 670 to accept the share request from electronic device 660 (e.g., to download the content, navigate to the content using an application that is running on the second electronic device 670, and/or save the content to a memory of the second electronic device 670) and display the video content 556 in three-dimensional environment 650B. As shown, the user of the second electronic device 670 is optionally providing a selection input 672B directed to the selectable option 623 in the respective user interface element 634 in three-dimensional environment 650B. For example, the second electronic device 670 optionally detects a pinch input, touch or tap input, verbal command, or some other direct or indirect input while the gaze of the user of the second electronic device 670 is directed to the selectable option 623.

In some examples, in response to detecting the selection input 672B, the second electronic device 670 optionally presents the video content 656 in the three-dimensional environment 650B, as shown in FIG. 6C. For example, as shown, the second electronic device 670 may present a two-dimensional representation of the video content 656 (e.g., within a larger, new object) in the three-dimensional environment 650B. As shown, the video content 656 is displayed with one or more controls 625 for controlling playback of the content in three-dimensional environment 650B. As similarly discussed above, the video content 656 is optionally displayed with an interaction affordance (e.g., grabber or handlebar) 635 that can be selected to initiate movement of the (e.g., object containing the) video content 656 in three-dimensional environment 650B. In some examples, while the second electronic device 670 is presenting the video content 656 in the full-screen mode, the second electronic device 670 may visually deemphasize the representations of the captured portions of the physical environment surrounding the second electronic device 670. For example, as indicated by the dashed lines in FIG. 6C, the representation of the coffee table 608', the representation of the floor lamp 607' and the representations of the floor, ceiling, and walls surrounding the electronic device 670 may be visually deemphasized (e.g., faded, darkened, or adjusted to be opaque) in the three-dimensional environment 650B such that attention is drawn predominantly to the video content 656 in the full-screen mode.

As shown in FIG. 6C, in the full-screen mode, the video content 656 may be displayed (e.g., substantially) centrally within the field of view of each user. For example, the video content 656 may be displayed toward a center of three-dimensional environment 650A at the first electronic device 660 and toward a center of three-dimensional environment 650B at the second electronic device 670. In some examples, in the full screen mode, the video content 656 may be displayed with a respective orientation that is angled toward a location that is between (e.g., an average of the locations of) the viewpoints of the users. In some examples, the video content can be moved within the three-dimensional environments 650A/650B to reposition and/or reorient the video content 656 to the users' collective liking. In some such examples, user interactions directed to the video content 656 displayed at the first electronic device 660 may correspondingly affect the video content 656 displayed at the second electronic device 670, and vice versa. For example, an input directed to the interaction affordance (e.g., the grabber or handlebar) 635 at the first electronic device 660 that causes the video content 656 to move within three-dimensional environment 650A may cause the video content 656 to move within three-dimensional environment 650B at the second electronic device 670 in accordance with the movement input. Similarly, a respective action involving the one or more playback controls 625 received at the first electronic device 660 (e.g., an input pausing the video content 656) causes the second electronic device 670 to also perform the respective action (e.g., pause the video content).

As shown in FIG. 6C, in some examples, while the first electronic device 660 and the second electronic device 670 are in the multi-user communication session, display of the video content 656 within the shared three-dimensional environment causes the avatars corresponding to the users of the electronic devices 660/670 to be redisplayed in the three-dimensional environment. For example, as shown, the avatar 615 corresponding to the user of the second electronic device 670 is optionally redisplayed in three-dimensional environment 650A, and the avatar 617 corresponding to the user of the first electronic device 660 is optionally redisplayed in three-dimensional environment 650B. In some examples, audio corresponding to the users of electronic devices 660/670 may also transition from a mono or stereo presentation to a spatial presentation. As described previously herein, the type of the content shared between the first electronic device 660 and the second electronic device 670 optionally determines whether the avatars corresponding to the users of the electronic devices 660/670 are displayed in the three-dimensional environments 650A/650B while the content is displayed. As discussed above, the content 656 shared between the first electronic device 660 and the second electronic device 670 is two-dimensional content (e.g., video content, image content, such as a photograph, a web page of a web browsing application, etc.), which may be displayed within a two-dimensional object in the three-dimensional environments 650A/650B. Because display of the avatars corresponding to the users of the electronic devices 660/670 would not obscure (e.g., block or interfere with a portion of) the video content 656 and/or distract from playback of the video content 656 (e.g., due to the central placement of the content 656 within the three-dimensional environments 650A/650B), the avatars 615/617 are thus redisplayed in the three-dimensional environment. Therefore, as outlined above, when sharing content that is non-immersive content in a multi-user communication session, the electronic devices 660/670 optionally display the avatars corresponding to the users of the electronic devices. In other examples, two-dimensional or three-dimensional content contained within a two-dimensional boundary or three-dimensional boundary or volume that is shared among electronic devices may also be presented with avatars corresponding to users of the electronic devices when spatial relationships between the content and the avatars can be maintained in a consistent manner among all users.

In some examples, the first electronic device 660 and the second electronic device 670 may reorient and/or reposition the avatars corresponding to the users of the electronic devices 660/670 when the two-dimensional content 656 is displayed in the shared three-dimensional environment. For example, as shown in FIG. 6C, the avatar 615 corresponding to the user of the second electronic device 670 may be repositioned to the left of the viewpoint of the user of the first electronic device 660 in three-dimensional environment 650A and may be oriented to face toward the content 656. Similarly, as shown, the avatar 617 corresponding to the user of the first electronic device 660 may be repositioned to the right of the viewpoint of the user of the second electronic device 670 in three-dimensional environment 650B and may be reoriented to face toward the content 656. Thus, the disclosed method provides for a shared and unobscured viewing experience for multiple users in a communication session while enabling individual user-interactions with the content in the three-dimensional environment.

As similarly described above, in some examples, the user of electronic devices 660/670 may provide one or more respective inputs corresponding to a request to cease displaying the video content 656 in three-dimensional environments 650A/650B. For example, while the first electronic device 660 and the second electronic device 670 are in the multi-user communication session, the user of the first electronic device 660 (or the second electronic device 670) may provide one or more inputs for ceasing display of the video content 656 in the three-dimensional environment 650A (or 650B) (e.g., via a "close" or "exit" affordance displayed in a respective user interface element in three-dimensional environment 650A (or 650B), a verbal command, etc.). In some such examples, in response to receiving the one or more respective inputs, the content 656 may cease being displayed at the first electronic device 660 (or the second electronic device 670). For example, the first electronic device 660 (or second electronic device 670) optionally ceases visually deemphasizing the captured portions of the physical environment surrounding the electronic device.

As similarly described above, in some examples, if the video content 656 were to cease being displayed in three-dimensional environment 650A (or 650B), the first electronic device 660 and the second electronic device 670 would cease displaying the avatars corresponding to the users of the electronic devices 660/670. For example, because the video content 656 would still be displayed at one of the two electronic devices, the avatar 615 corresponding to the user of the second electronic device 670 would cease being displayed in three-dimensional environment 650A and the avatar 617 corresponding to the user of the first electronic device 660 would cease being displayed in three-dimensional environment 560B. It should be understood that, in some such examples, though the avatars corresponding to the users of the electronic devices 660/670 would not be displayed in the three-dimensional environments, the presentation of the audio corresponding to the voices of the users of the electronic devices would optionally be maintained. However, in some examples, that audio may not be spatialized and may instead be presented in mono or stereo. In some examples, once the other electronic device ceases displaying the video content (e.g., due to user input), the first electronic device 660 and the second electronic device 670 would redisplay the avatars corresponding to the users of the electronic devices 660/670 in the three-dimensional environments (e.g., as similarly shown in FIG. 3).

As described herein, various types of content can be shared between multiple devices while in the multi-user communication session. Attention is now directed to sharing an alternative type of content (e.g., a fourth type of content) in the three-dimensional environment shared between the first electronic device and the second electronic device. As described below, non-immersive content displayed in a two-dimensional object or three-dimensional object that is shared between the first electronic device and the second electronic device and displayed in the three-dimensional environment optionally causes the first electronic device and the second electronic device to maintain displaying the avatars corresponding to the users in the shared three-dimensional environment.

Figure 7A:
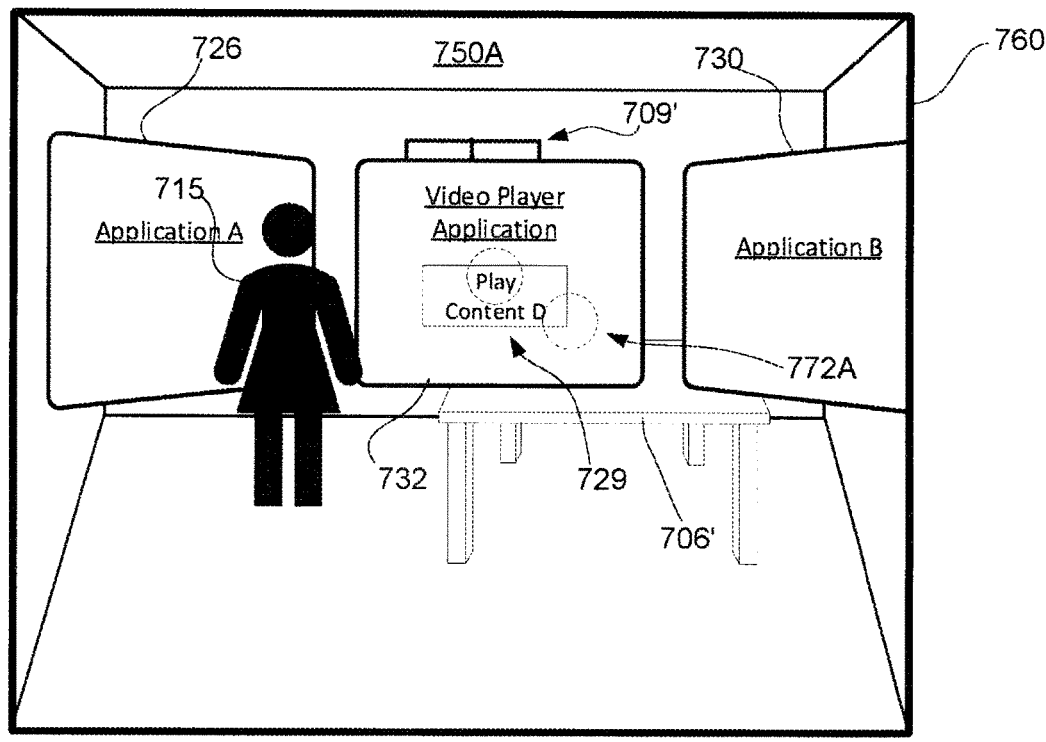
FIGS. 7A-7C illustrate example interactions with shared content of a fourth type in a multi-user communication session according to some examples of the disclosure.
Figure 7A:
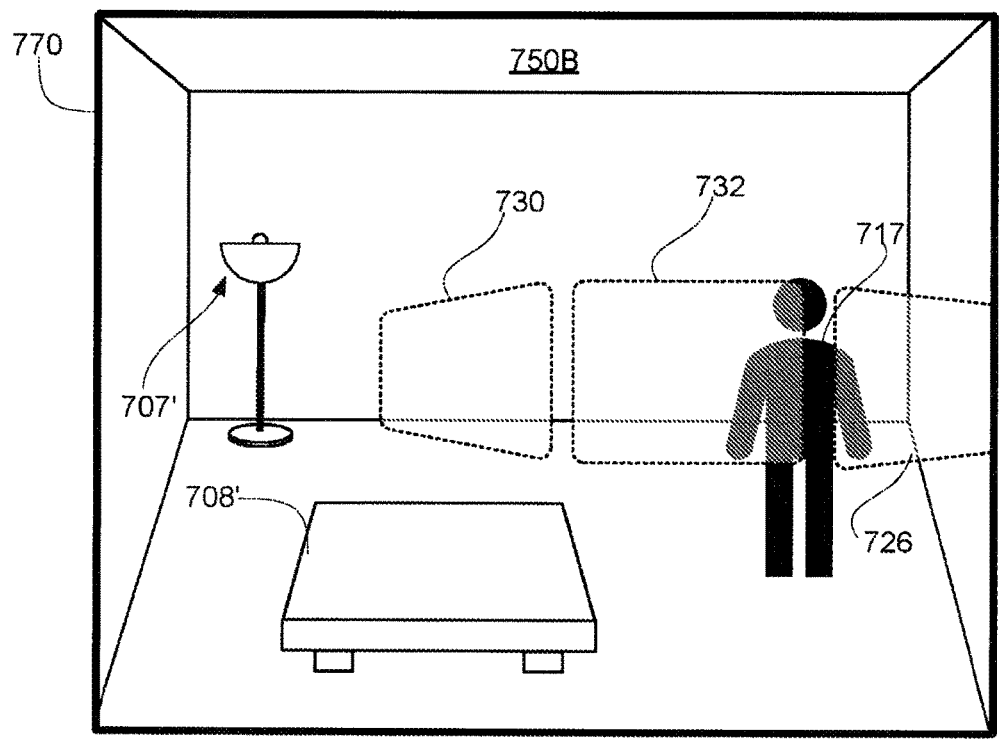
Figure 7B:
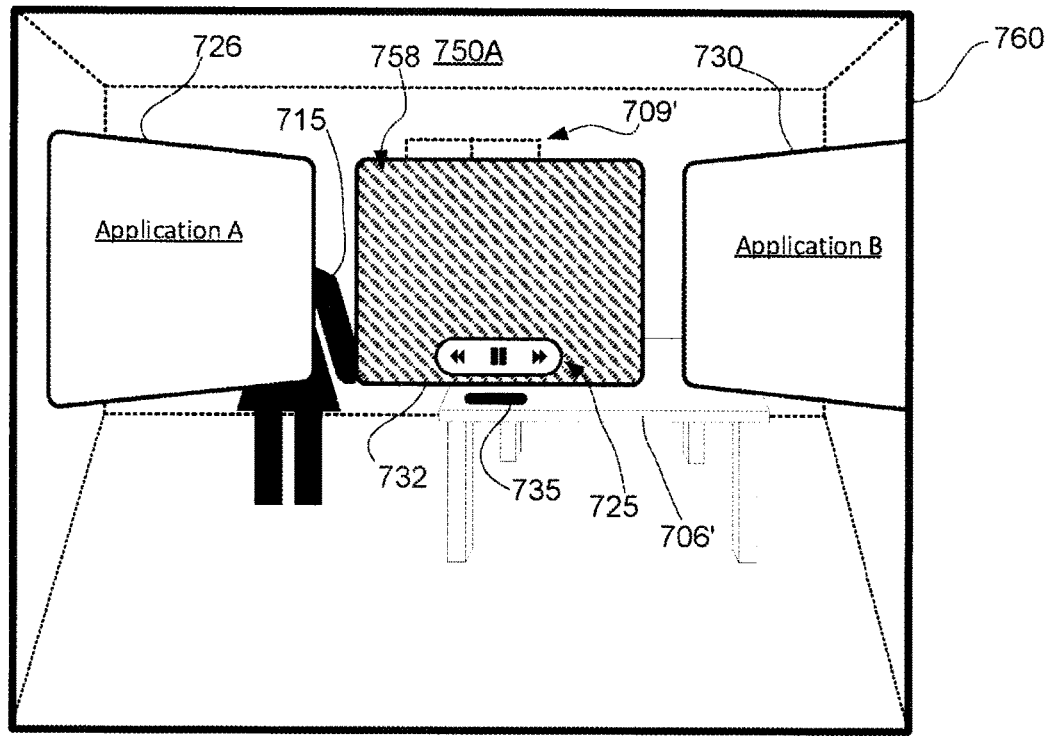
Figure 7B:
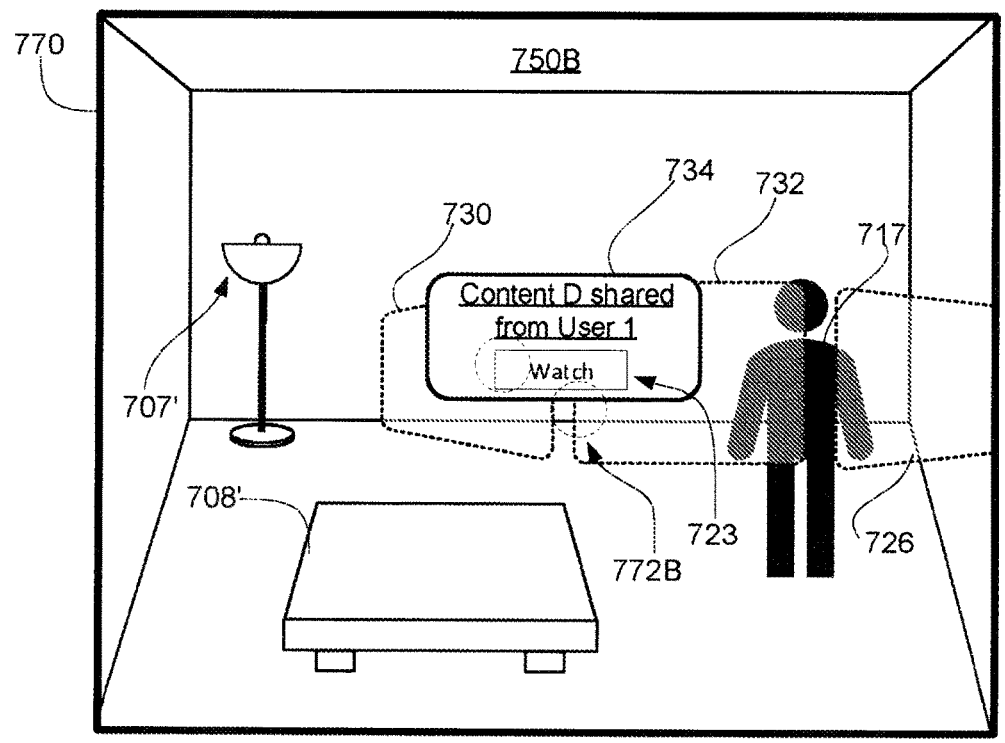
Figure 7C:
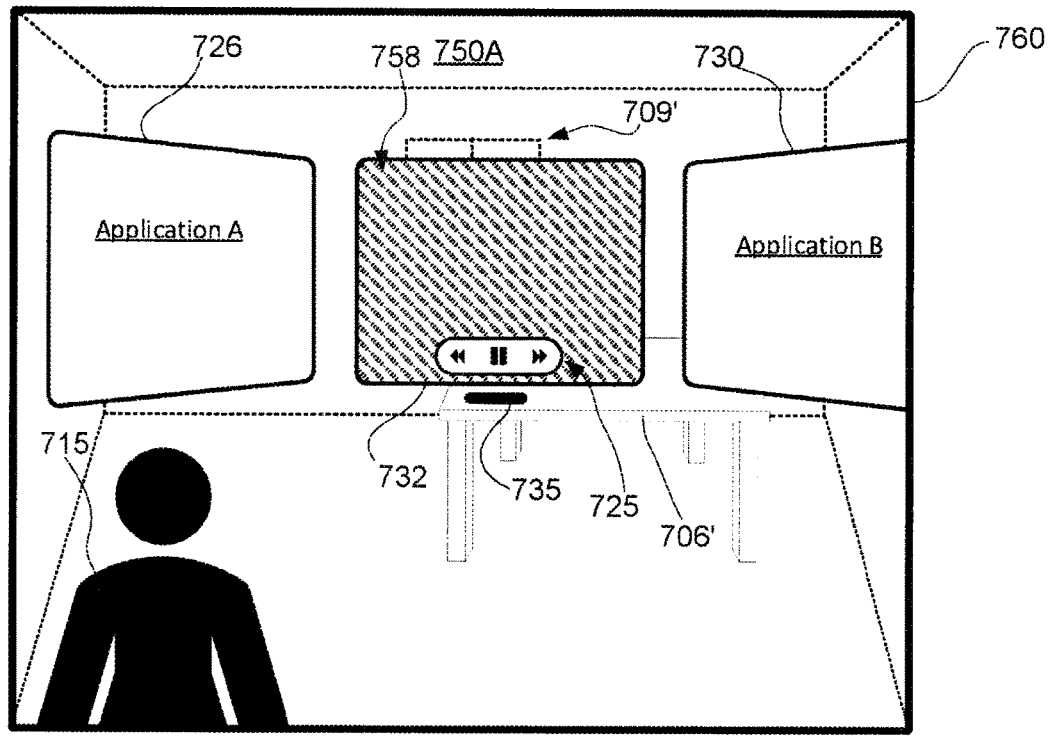
Figure 7C:
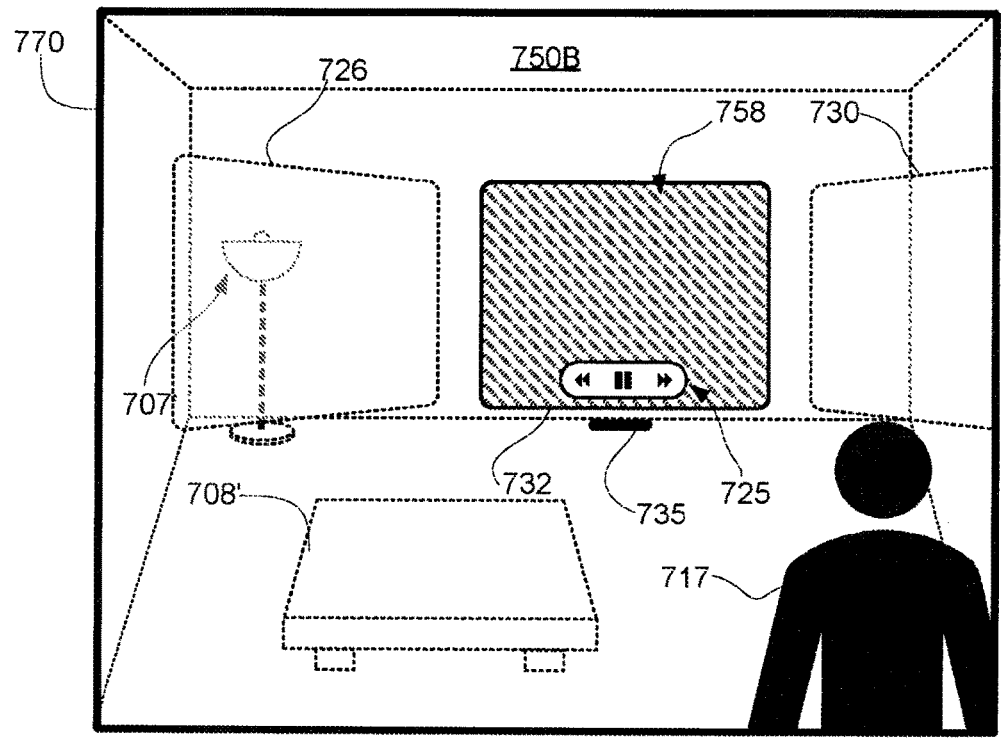

FIGS. 7A-7C illustrate example interactions with shared content of a fourth type in a multi-user communication session according to some examples of the disclosure. In some examples, while the first electronic device 760 is in the multi-user communication session with the second electronic device 770, the three-dimensional environment 750A is presented using electronic device 760 and the three-dimensional environment 750B is presented using electronic device 770. In some examples, the electronic devices 760/770 optionally correspond to electronic devices 660/670 discussed above, electronic devices 560/570 in FIGS. 5A-5D, electronic devices 460/470 in FIGS. 4A-4F, and/or electronic devices 360/370 in FIG. 3. In some examples, the three-dimensional environments 750A/750B include captured portions of the physical environment in which electronic devices 760/770 are located. For example, the three-dimensional environment 750A includes a table (e.g., a representation of table 706') and a window (e.g., representation of window 709'), and the three-dimensional environment 750B includes a coffee table (e.g., representation of coffee table 708') and a floor lamp (e.g., representation of floor lamp 707'). In some examples, the three-dimensional environments 750A/750B optionally corresponds to three-dimensional environments 650A/650B described above, three-dimensional environments 550A/550B in FIGS. 5A-5D, three-dimensional environments 450A/450B in FIGS. 4A-4F, and/or three-dimensional environments 350A/350B in FIG. 3. As described above, the three-dimensional environments also include avatars 715/717 corresponding to users of the electronic devices 770/760. In some examples, the avatars 715/717 optionally correspond to avatars 615/617 described above, avatars 515/517 in FIGS. 5A-5D, avatars 415/417 in FIGS. 4A-4F, and/or avatars 315/317 in FIG. 3.

As shown in FIG. 7A, the first electronic device 760 is optionally displaying a plurality of virtual objects representative of application windows corresponding to respective applications running on the first electronic device 760 (e.g., one of the applications corresponding to virtual objects 410 in FIG. 4A). For example, the three-dimensional environment 750A includes a first virtual object 726 corresponding to a first application (e.g., Application A), a second virtual object 730 corresponding to a second application (e.g., Application B), and a third virtual object 732 corresponding to a third application (e.g., Video Player Application). In some examples, the first virtual object 726, the second virtual object 730, and the third virtual object 732 are displayed with respective orientations angled toward the viewpoint of the user of the first electronic device 760, such that a user interface displayed on each of the virtual objects faces toward the viewpoint of the user. In some examples, the first virtual object may partially occlude the avatar 715 corresponding to the user of the second electronic device 770. In some examples, the third virtual object 732 corresponds to a video playback application running on the first electronic device 760 that is configured to display video content in three-dimensional environment 750A. For example, the third virtual object 732 includes an option 729 that is selectable to cause the electronic device 760 to display content (e.g., Content D) associated with the video playback application in three-dimensional environment 750A. In some examples, the content is a non-immersive (e.g., two-dimensional) video (e.g., a two-dimensional representation of a movie, an episode, a clip, an image, etc.) that can be displayed within the virtual object 732 in the three-dimensional environments 750A/750B.

As described previously with reference to FIG. 6A, in some examples, virtual objects (e.g., application windows and user interfaces, representations of content, application icons, and the like) that are viewable by a user may be private while the user is participating in a multi-user communication session with one or more other users (e.g., via electronic devices that are communicatively linked in the multi-user communication session). For example, as discussed above, the user of the first electronic device 760 is optionally viewing the first, second, and third virtual objects 726, 730, and 732 in three-dimensional environment 750A. In some examples, a representation of each of the virtual objects is displayed in three-dimensional environment 750B at the second electronic device 770 with the avatar 717 corresponding to the user of the first electronic device 760. For example, the virtual objects 726, 730, and 732 displayed in the three-dimensional environment 750B have respective orientations angled toward the avatar 717 corresponding to the user of the first electronic device 760 (e.g., which optionally mirrors that shown at the first electronic device 760 in FIG. 7A). Additionally, in some examples, the representations of the plurality of virtual objects 726, 730, and 732 displayed in three-dimensional environment 750B are optionally occluded (e.g., faded or blurred) representations of the plurality of virtual objects 726, 730, and 732 displayed in three-dimensional environment 750A. For example, the user of the second electronic device 770 is prevented from viewing the contents of any of the virtual objects 726, 730, and 732 displayed in three-dimensional environment 750A at the first electronic device 760.

As shown in FIG. 7A, the user of the first electronic device 760 is optionally providing a selection input 772A directed to the selectable option 729 in the third virtual object 732. For example, the first electronic device 760 detects a pinch input (e.g., one in which the index finger and thumb of the user come into contact), a tap or touch input (e.g., provided by the index finger of the user), a verbal command, or some other direct or indirect input while the gaze of the user of the first electronic device 760 is directed to the selectable option 729. In some examples, in response to detecting the selection input 772A, the first electronic device 760 displays video content 758 associated with the video playback application within the third virtual object 732 in three-dimensional environment 750A, as shown in FIG. 7B. For example, as shown in FIG. 7B, the first electronic device 760 displays a two-dimensional representation of the video content 758 in the third virtual object 732 in three-dimensional environment 750A. For example, the video content 758 is displayed within all or a predetermined portion of the third virtual object 732 in three-dimensional environment 750A. Additionally, in some examples, when presenting the content in the third virtual object 732, the first electronic device 760 maintains display of the first virtual object 726 and the second virtual object 730 in three-dimensional environment 750A.

As shown in FIG. 7B, in some examples, the video content 758 is displayed in the third virtual object 732 with one or more playback controls 725. For example, the one or more playback controls 725 include one or more selectable options for pausing playback of the video content, scrubbing (e.g., rewinding and/or fast-forwarding) through the video content, controlling a volume of audio associated with the video content, etc. Additionally, as shown, the first electronic device 760 optionally displays the third virtual object 732 with an interaction affordance 735 (e.g., a grabber or handlebar). In some examples, the first virtual object 726 and the second virtual object 730 may also be displayed with the interaction affordance 735, respectively. In some examples, the grabber or handlebar 735 may be selectable (e.g., via pinch, touch, or tap input) by the user of the first electronic device to initiate movement of the third virtual object 732 within the three-dimensional environment 750A. In some examples, while the first electronic device 760 is presenting the video content 758 in the third virtual object 732, the first electronic device 760 may visually deemphasize the representations of the captured portions of the physical environment surrounding the first electronic device 760. For example, as indicated by the dashed line in FIG. 7B, the representation of the table 706' and the representation of the window 709' may be visually deemphasized (e.g., faded, darkened, or adjusted to be opaque) in the three-dimensional environment 750A such that attention is drawn predominantly to the video content 758 within the third virtual object 732.

As discussed above with reference to FIGS. 4A-6C, in some examples, while the first electronic device and the second electronic device are communicatively linked in the multi-user communication session, when one electronic device displays certain types of content in the three-dimensional environment that has not been shared with the other electronic device, the avatars corresponding to the users of the electronic devices ceased to be displayed. However, as shown in FIG. 7B, in some examples, the avatars corresponding to the users of the electronic devices remain displayed despite only one electronic device displaying content in the three-dimensional environment. For example, as shown in FIG. 7B, at the first electronic device 760, the avatar 715 corresponding to the user of the second electronic device 770 remains displayed in three-dimensional environment 750A because the video content 758 is being displayed within the third virtual object 732 (e.g., and not as a new, larger representation, such as those discussed above with reference to FIGS. 4A-6C) or in a full screen mode. In some examples, at the second electronic device 770, the avatar 717 corresponding to the user of the first electronic device 760 remains displayed in three-dimensional environment 750B with the representations of the first virtual object 726, the second virtual object 730, and the third virtual object 732 (e.g., which are private to the user of the first electronic device 760), as shown in FIG. 7B.

In some examples, the third virtual object 732 (e.g., the video playback application window) may be shared with the second electronic device 770 for displaying the video content 758 within the third virtual object 732 in three-dimensional environment 750B. For example, while the first electronic device 760 and the second electronic device 770 are in the multi-user communication session, the user of the first electronic device 760 may provide one or more inputs for sharing the third virtual object 732 with the second electronic device 760 (e.g., via a "share" affordance displayed in a respective user interface element or application user interface in three-dimensional environment 750A, a verbal command, etc.). In some examples, the second electronic device 770 may detect an indication corresponding to a request from the first electronic device 760 to share the virtual object (e.g., and the content 758) with the second electronic device 770. In response to detecting the indication, the second electronic device 770 may display a respective user interface element 734 corresponding to the share request. For example, as shown in FIG. 7B, the respective user interface element 734 may include an option 723 that is selectable for causing the second electronic device 770 to accept the share request from electronic device 760 (e.g., to download the content, navigate to the content using an application that is running on the second electronic device 770, and/or save the content to a memory of the second electronic device 770) and display the video content 758 within the third virtual object 732 in three-dimensional environment 750B. As shown, the user of the second electronic device 770 is optionally providing a selection input 772B directed to the selectable option 723 in the respective user interface element 734 in three-dimensional environment 750B. For example, the second electronic device 770 optionally detects a pinch input, touch or tap input, verbal command, or some other direct or indirect input while the gaze of the user of the second electronic device 770 is directed to the selectable option 723.

In some examples, in response to detecting the selection input 772B, the second electronic device 770 optionally presents the video content 758 within the third virtual object 732 in the three-dimensional environment 750B, as shown in FIG. 7C. For example, as shown, the second electronic device 770 may present the third virtual object 732 containing the video content 758 in the three-dimensional environment 750B. Additionally, as shown, the second electronic device 770 optionally maintains display of the representations of the first virtual object 726 and the second virtual object 730 adjacent to the third virtual object 732 containing the content 758. As shown, the video content 758 is displayed with one or more controls 725 for controlling playback of the content in three-dimensional environment 750B. As similarly discussed above, the video content 758 is optionally displayed with an interaction affordance (e.g., grabber or handlebar) 735 that can be selected to initiate movement of the third virtual object 732 (e.g., and thus the video content 758) in three-dimensional environment 750B. In some examples, while the second electronic device 770 is presenting the video content 758 within the third virtual object 732, the second electronic device 770 may visually deemphasize the representations of the captured portions of the physical environment surrounding the second electronic device 770. For example, as indicated by the dashed lines in FIG. 7C, the representation of the coffee table 708', the representation of the floor lamp 707' and the representations of the floor, ceiling, and walls surrounding the electronic device 770 may be visually deemphasized (e.g., faded, darkened, or adjusted to be opaque) in the three-dimensional environment 750B such that attention is drawn predominantly to the video content 758 within the virtual object 732.

As shown in FIG. 7C, when shared, the video content 758 may be displayed within the field of view of each user. For example, the virtual object 732 containing the video content 758 may be displayed at a location in three-dimensional environment 750A at the first electronic device 760 that maintains spatial truth with the viewpoint of the user of the first electronic device 760, and at a location in three-dimensional environment 750B at the second electronic device 770 that maintains spatial truth with the viewpoint of the user of the second electronic device 770. In some examples, the virtual object 732 containing the video content 758 may be displayed with a respective orientation that is angled toward a location that is between (e.g., an average of) the locations of) the viewpoints of the user. In some examples, the virtual object 732 can be moved within the three-dimensional environments 750A/750B to reposition and/or reorient the video content 758 within the virtual object 732 to the users' collective liking. In some such examples, user interactions directed to the video content 758 displayed at the first electronic device 760 may correspondingly affect the video content 758 displayed at the second electronic device 770, and vice versa. For example, an input directed to the interaction affordance 735 at the first electronic device 760 that causes the third virtual object 732 containing the video content 758 to move within three-dimensional environment 750A may cause the third virtual object 732 containing the video content 758 to move within three-dimensional environment 750B at the second electronic device 770 in accordance with the movement input. Similarly, a respective action involving the one or more playback controls 725 received at the first electronic device 760 (e.g., an input pausing the video content 758) causes the second electronic device 770 to also perform the respective action (e.g., pause the video content).

As shown in FIG. 7C, in some examples, while the first electronic device 760 and the second electronic device 770 are in the multi-user communication session, display of the video content 756 within the shared three-dimensional environment causes the avatars corresponding to the users of the electronic devices 760/770 to remain displayed in the three-dimensional environment. For example, as shown, the avatar 715 corresponding to the user of the second electronic device 770 remains displayed in three-dimensional environment 750A, and the avatar 717 corresponding to the user of the first electronic device 760 remains displayed in three-dimensional environment 750B. As described previously herein, the type of the content shared between the first electronic device 760 and the second electronic device 770 optionally determines whether the avatars corresponding to the users of the electronic devices 760/770 are displayed in the three-dimensional environments 750A/750B while the content is displayed. As discussed above, the content 758 shared between the first electronic device 760 and the second electronic device 770 is two-dimensional content (e.g., video content, image content, such as a photograph, a web page of a web browsing application, etc.), which may be displayed within the third virtual object 732 in the three-dimensional environments 750A/750B. Because display of the avatars corresponding to the users of the electronic devices 760/770 would not obscure (e.g., block or interfere with a portion of) the video content 758 and/or distract from playback of the video content 758 (e.g., due to the central placement of the virtual object 732 containing the content 758 in the three-dimensional environments 750A/750B), the avatars 715/717 are thus redisplayed in the three-dimensional environments. Therefore, as outlined above, when sharing content that is two-dimensional content in a multi-user communication session, the electronic devices 760/770 optionally display the avatars corresponding to the users of the electronic devices. In other examples, two-dimensional or three-dimensional content contained within a two-dimensional boundary or three-dimensional boundary or volume that is shared among electronic devices may also be presented with avatars corresponding to users of the electronic devices when spatial relationships between the content and avatars can be maintained in a consistent manner among all users.

In some examples, the first electronic device 760 and the second electronic device 770 may reorient and/or reposition the avatars corresponding to the users of the electronic devices 760/770 when the two-dimensional video content 758 is displayed in the shared three-dimensional environment. For example, as shown in FIG. 7C, the avatar 715 corresponding to the user of the second electronic device 770 may be repositioned to the left of the viewpoint of the user of the first electronic device 760 in three-dimensional environment 750A and may be oriented to face toward the content 758 in virtual object 732. Similarly, as shown, the avatar 717 corresponding to the user of the first electronic device 760 may be repositioned to the right of the viewpoint of the user of the second electronic device 770 in three-dimensional environment 750B and may be reoriented to face toward the content 758 in virtual object 732. Thus, the disclosed method provides for a shared and unobscured viewing experience for multiple users in a communication session while enabling individual user-interactions with the content in the three-dimensional environment.

As similarly described above, in some examples, the users of electronic devices 760/770 may provide one or more respective inputs corresponding to a request to cease displaying the video content 758 within the third virtual object 732 in three-dimensional environments 750A/750B. For example, while the first electronic device 760 and the second electronic device 770 are in the multi-user communication session, the user of the first electronic device 760 (or the second electronic device 770) may provide one or more inputs for ceasing display of the video content 758 within the virtual object 732 in the three-dimensional environment 750A (or 750B) (e.g., via a "close" or "exit" affordance displayed in a respective user interface element in three-dimensional environment 750A (or 750B), a verbal command, etc.). In some such examples, in response to receiving the one or more respective inputs, the content 758 may cease being displayed at the first electronic device 760 (or the second electronic device 770). For example, the first electronic device 760 (or second electronic device 770) optionally ceases visually deemphasizing the captured portions of the physical environment surrounding the electronic device.

In some examples, if the video content 758 were to cease being displayed in three-dimensional environment 750A (or 750B), the first electronic device 760 and the second electronic device 770 would maintain display of the avatars corresponding to the users of the electronic devices 760/770. For example, although the video content 758 would no longer be displayed at one of the two electronic devices, the avatar 715 corresponding to the user of the second electronic device 770 would cease being displayed in three-dimensional environment 750A and the avatar 717 corresponding to the user of the first electronic device 760 would not obscure or distract from the other user's experience of the content 758, so the avatars 715 and 717 would optionally remain displayed. It should be understood that, once the other electronic device ceases displaying the video content (e.g., due to user input), the first electronic device 760 and the second electronic device 770 would maintain display of the avatars corresponding to the users of the electronic devices 760/770 in the three-dimensional environment (e.g., as similarly shown in FIG. 3).

It is understood that the examples shown and described herein are merely exemplary and that additional and/or alternative elements may be provided within the three-dimensional environment for interacting with the illustrative content. It should be understood that the appearance, shape, form and size of each of the various user interface elements and objects shown and described herein are exemplary and that alternative appearances, shapes, forms and/or sizes may be provided. For example, the virtual objects representative of application windows (e.g., virtual objects 626, 630 and 632) may be provided in an alternative shape than a rectangular shape, such as a circular shape, triangular shape, etc. In some examples, the various selectable options (e.g., the options 411 and 413, the option 523A, or the option 627), user interface elements (e.g., user interface element 526 or user interface element 634), control elements (e.g., playback controls 625 or 725), etc. described herein may be selected verbally via user verbal commands (e.g., "select option" verbal command). Additionally or alternatively, in some examples, the various options, user interface elements, control elements, etc. described herein may be selected and/or manipulated via user input received via one or more separate input devices in communication with the electronic device(s). For example, selection input may be received via physical input devices, such as a mouse, trackpad, keyboard, etc. in communication with the electronic device(s).

Additionally, it should be understood that, although the above methods are described with reference to two electronic devices, the above methods optionally apply for two or more electronic devices communicatively linked in a communication session. For example, while three, four, five, or more electronic devices are in a communication session represented by a three-dimensional environment, and content of a first type (e.g., an immersive scene or experience that provides the user with six degrees of freedom, such as an immersive art gallery/exhibit, video game, or three-dimensional model) is shared, a respective user viewing the content may see the avatars corresponding to (and hear spatial audio of) the users of other electronic devices within a three-dimensional environment corresponding to the content of the first type who are also viewing the content (e.g., with spatial truth as similarly described with reference to FIGS. 4A-4D). In some examples, a respective user who is not viewing the content of the first type may see the avatars corresponding to (and hear spatial audio of) the users of other electronic devices within the three-dimensional environment representing the communication session who are also not viewing the content. In some such examples, non-spatial audio (e.g., mono or stereo) may be provided for avatars that are not displayed in the shared three-dimensional environments.

If the content is the second type of content (e.g., an immersive video or scene/environment that provides the user with three degrees of freedom, such as an immersive movie, TV episode, sports game, musical recording), a respective user viewing the content may see the avatars corresponding to (and hear spatial audio of) the users of electronic devices within a three-dimensional environment corresponding to the content of the second type who are also viewing the content from different perspectives (e.g., as similarly described with reference to FIGS. 5A-5D). If the content is the second type of content, a respective user viewing the content may not see the avatars corresponding to (and hear spatial audio of) the users of electronic devices within the three-dimensional environment corresponding to the content of the second type who are also viewing the content from the same perspective. In some such examples, non-spatial audio (e.g., mono or stereo) may be provided for avatars that are not displayed in the three-dimensional environment corresponding to the content of the second type. In some examples, a respective user who is not viewing the content of the second type may see the avatars corresponding to (and hear spatial audio of) the users of other electronic devices within the three-dimensional environment representing the communication session who are also not viewing the content. In some such examples, non-spatial audio (e.g., mono or stereo) may be provided for avatars that are not displayed in the shared three-dimensional environments.

If the content is the third type of content (e.g., a non-immersive (two-dimensional) video/image/web page that is displayed in a full-screen mode, such as a two-dimensional representation of a movie, TV episode, sports game, musical recording, or user interface), a respective user viewing the content may see the avatars corresponding to (and hear spatial audio of) the users of electronic devices in the three-dimensional environment representing the communication session who are also viewing the content in the full-screen mode (e.g., as similarly described with reference to FIGS. 6A-6C). In some examples, a respective user who is not viewing the content of the third type may see the avatars corresponding to (and hear spatial audio of) the users of other electronic devices in the three-dimensional environment representing the communication session who are also not viewing the content in the full-screen mode. In some such examples, non-spatial audio (e.g., mono or stereo) may be provided for avatars that are not displayed in the shared three-dimensional environments. If the content is the fourth type of content (e.g., a video/image/web page that is displayed within a virtual object (e.g., an application window), such as a two-dimensional representation of a movie, TV episode, sports game, musical recording, user interface), the avatars corresponding to the users of the electronic devices are optionally displayed in the three-dimensional environment representing the communication session when presenting the content (e.g., as described with reference to FIGS. 7A-7C).

Figure 8A:
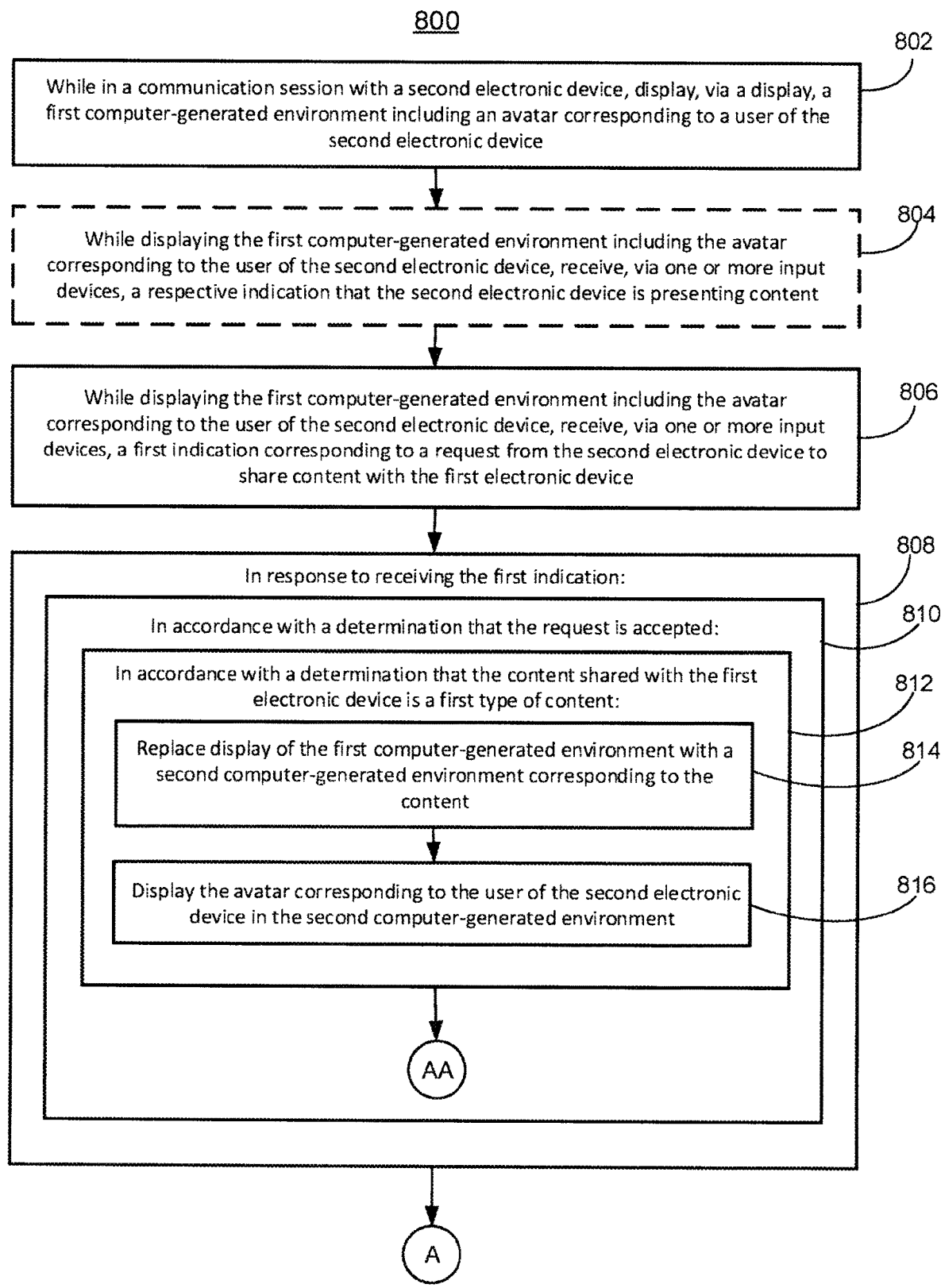
FIGS. 8A-8B illustrates a flow diagram illustrating an example process for displaying shared content in a multi-user communication session according to some examples of the disclosure.
Figure 8B:
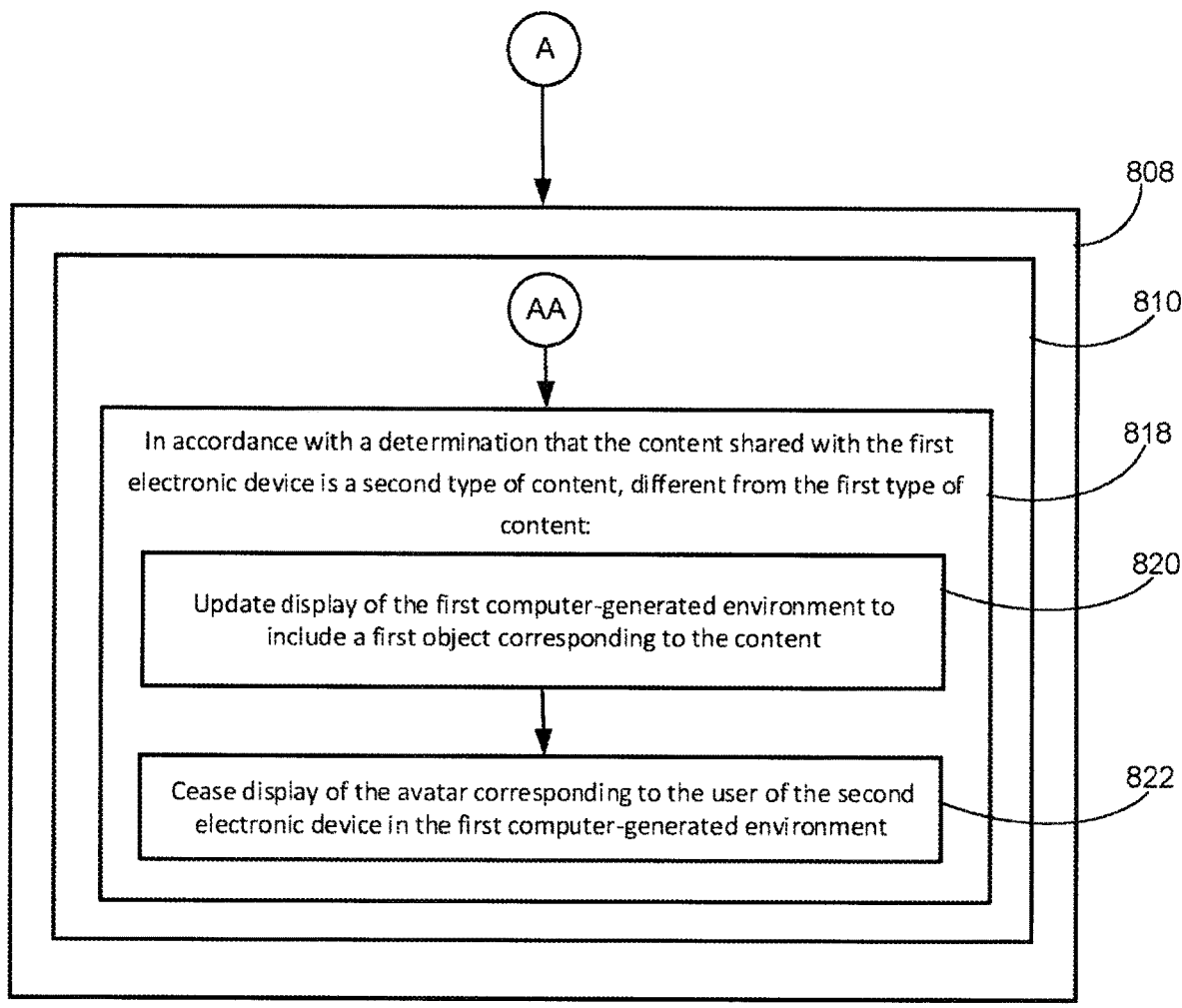

FIGS. 8A-8B illustrate a flow diagram illustrating an example process 800 for displaying shared content in a multi-user communication session according to some examples of the disclosure. In some examples, process 800 begins at a first electronic device in communication with a display, one or more input devices, and a second electronic device. In some examples, the first electronic device and the second electronic device are optionally a head-mounted display, respectively, similar or corresponding to device 200 of FIG. 2. As shown in FIG. 8A, in some examples, at 802, while in a communication session with the second electronic device (e.g., such as electronic device 370 in FIG. 3), the first electronic device (e.g., such as electronic device 360 in FIG. 3) may present, via the display (e.g., a display of the first electronic device), a first computer-generated environment (e.g., such as three-dimensional environment 350A/ 350B in FIG. 3) including an avatar corresponding to a user of the second electronic device (e.g., such as avatar 315 corresponding to the user of the second electronic device 370, as shown in FIG. 3). In some examples, the avatar corresponding to the user of the second electronic device may be provided with an audio effect (e.g., spatial audio) corresponding to a voice of the user of the second electronic device. In some examples, an avatar corresponding to a user of the first electronic device may be displayed in the first computer-generated environment at the second electronic device (e.g., such as avatar 317 corresponding to the user of the first electronic device 360, as shown in FIG. 3). In some examples, the avatar corresponding to the user of the first electronic device may be provided with an audio effect (e.g., spatial audio) corresponding to a voice of the user of the first electronic device.

As shown in FIG. 8A, in some examples, at 804, while displaying the first computer-generated environment including the avatar corresponding to the user of the second electronic device, the first electronic device optionally receives, via the one or more input devices, a respective indication that the second electronic device is presenting content. For example, as described above with reference to FIG. 4B, the electronic device 460 may present content 452 in three-dimensional environment 450A. In some examples, as described herein, if the content is of a first type (e.g., immersive content 452 with six degrees of freedom as shown in FIG. 4B), if the content is of a second type (e.g., immersive content 554 with three degrees of freedom as shown in FIG. 5B), and/or if the content is of a third type (e.g., non-immersive content 656 presented in full-screen mode as shown in FIG. 6B), the avatar (e.g., avatar 415/ 515/615) corresponding to the user of the second electronic device optionally ceases to be displayed in the three-dimensional environment. Additionally, in some examples, the audio corresponding to the voice of the user of the second electronic device is optionally no longer spatialized and is presented as mono or stereo audio. In some examples, as described herein, if the content is of a fourth type (e.g., non-immersive content 758 presented within object 732 as shown in FIG. 7B), display of the avatar (e.g., avatar 715) corresponding to the user of the second electronic device and presentation of the (e.g., spatial) audio corresponding to the voice of the user are optionally maintained in the three-dimensional environment.

In some examples, at 806, while presenting the first computer-generated environment including the avatar corresponding to the user of the second electronic device, the first electronic device may receive, via the one or more input devices (e.g., such as hand-tracking sensors 202 in FIG. 2), a first indication corresponding to a request from the second electronic device to share content with the first electronic device. In some examples, in response to receiving the first indication, the first electronic device displays a user interface element (e.g., such as user interface element 418 in FIG. 4C) corresponding to the content in the first computer-generated environment. In some examples, the user interface element includes a first option (e.g., option 419A in FIG. 4C) that is selectable to accept the share request from the second electronic device.

In some examples, at 808, in response to receiving the first indication, at 810, in accordance with a determination that the request is accepted (e.g., because a selection input (e.g., selection input 472B in FIG. 4C) directed to the first option in the user interface element has been received), at 812, in accordance with a determination that the content shared with the first electronic device is a first type of content (e.g., such as an immersive scene or experience in which the user of the electronic device is provided with six degrees of freedom), at 814, the first electronic device may replace display of the first computer-generated environment with a second computer-generated environment corresponding to the content. For example, as shown in FIG. 4D, the immersive content 452 (e.g., an immersive art gallery) is displayed at the first electronic device 460. Additionally, at 816, the first electronic device may display the avatar corresponding to the user of the second electronic device in the second computer-generated environment (e.g., such as the display of the avatar 415 corresponding to the user of the second electronic device 470 in the immersive content 452, as shown in FIG. 4D).

As shown in FIG. 8B, in some examples, at 818, in accordance with a determination that the content shared with the first electronic device is a second type of content, different from the first type of content (e.g., such as an immersive video in which the user of the electronic device is provided with three degrees of freedom), at 820, the first electronic device may update display of the first computer-generated environment to include a first object corresponding to the content. For example, as shown in FIG. 5C, the immersive video 554 (e.g., a three-dimensional representation of a movie or TV episode) is displayed at the first electronic device 560. Additionally, at 822, the first electronic device may cease display of the avatar corresponding to the user of the second electronic device in the first computer-generated environment (e.g., such as the cease of display of the avatar 515 corresponding to the user of the second electronic device 570 in three-dimensional environment 550A, as shown in FIG. 5C). In some examples, the audio corresponding to the voice of the user of the second electronic device continues to be presented at the first electronic device when the avatar corresponding to the user of the second electronic device is no longer displayed (e.g., such as the presentation of audio, represented by audio bubble 512, corresponding to the voice of the user of the second electronic device 570, as shown in FIG. 5C). In some examples, the audio corresponding to the voice of the user of the second electronic device optionally changes from spatial audio to non-spatial audio (e.g., mono or stereo audio).

It is understood that process 800 is an example and that more, fewer, or different operations can be performed in the same or in a different order. Additionally, the operations in process 800 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method. In some examples, the method comprises, at a first electronic device in communication with a display, one or more input devices, and a second electronic device: while in a communication session with the second electronic device, presenting, via the display, a first computer-generated environment including an avatar corresponding to a user of the second electronic device; while displaying the first computer-generated environment including the avatar corresponding to the user of the second electronic device, receiving, via the one or more input devices, a first indication corresponding to a request from the second electronic device to share content with the first electronic device; and in response to receiving the first indication, in accordance with a determination that the request is accepted, in accordance with a determination that the content shared with the first electronic device is a first type of content, replacing display of the first computer-generated environment with a second computer-generated environment corresponding to the content, and displaying the avatar corresponding to the user of the second electronic device in the second computer-generated environment, and in accordance with a determination that the content shared with the first electronic device is a second type of content, different from the first type of content, updating display of the first computer-generated environment to include a first object corresponding to the content, and ceasing display of the avatar corresponding to the user of the second electronic device in the first computer-generated environment.

Additionally or alternatively, in some examples, displaying the avatar corresponding to the user of the second electronic device includes presenting audio corresponding to a voice of the user of the second electronic device. In some examples, the method further comprises, in accordance with the determination that the content shared with the first electronic device is the second type of content, different from the first type of content, maintaining presentation of the audio corresponding to the voice of the user of the second electronic device in the first computer-generated environment after ceasing display of the avatar corresponding to the user of the second electronic device.

Additionally or alternatively, in some examples, presenting the audio corresponding to the voice of the user of the second electronic device includes presenting spatial audio corresponding to the voice of the user of the second electronic device in the first computer-generated environment. In some examples, in accordance with the determination that the content shared with the first electronic device is the second type of content, the audio corresponding to the voice of the user of the second electronic device presented in the first computer-generated environment is non-spatial audio.

Additionally or alternatively, in some examples, the first electronic device and the second electronic device are a head-mounted display, respectively.

Additionally or alternatively, in some examples, the method further comprises, in response to receiving the first indication, displaying, via the display, a user interface element corresponding to the content in the first computer-generated environment.

Additionally or alternatively, in some examples, the user interface element includes one or more options that are selectable to accept the request from the second electronic device to share the content with the first electronic device.

Additionally or alternatively, in some examples, the first type of content is content that includes a three-dimensional immersive environment.

Additionally or alternatively, in some examples, the second computer-generated environment corresponding to the content is a representation of the three-dimensional immersive environment. In some examples, the method further comprises: while displaying the second computer-generated environment, detecting, via the one or more input devices, movement of the first electronic device in a physical environment surrounding the first electronic device from a first location to a second location; and in response to detecting the movement of the first electronic device, changing a location of a viewpoint of the user of the first electronic device in the second computer-generated environment from a first respective location to a second respective location, wherein the second respective location in the second computer-generated environment is based on the second location in the physical environment, and maintaining display of the avatar corresponding to the user of the second electronic device in the second computer-generated environment.

Additionally or alternatively, in some examples, the second type of content is content that includes a viewpoint-limited three-dimensional immersive video, scene, or environment.

Additionally or alternatively, in some examples, the first object corresponding to the content is a representation of the view-point limited three-dimensional immersive video, scene, or environment. In some examples, the method further comprises: while displaying the first computer-generated environment including the first object, detecting, via the one or more input devices, movement of a respective portion of the user of the first electronic device from a first pose to a second pose; and in response to detecting the movement of the respective portion of the user, changing a viewpoint of the first object in the first computer-generated environment from a first viewpoint to a second viewpoint, different from the first viewpoint, wherein the second viewpoint is based on the second pose of the respective portion of the user, and restricting changing a location of the viewpoint of the user of the first electronic device in the first computer-generated environment.

Additionally or alternatively, in some examples, the method further comprises, in response to receiving the first indication, in accordance with a determination that the request is accepted, in accordance with a determination that the content shared with the first electronic device is a third type of content, different from the first type of content and the second type of content, updating display of the first computer-generated environment to include a second object, different from the first object, corresponding to the content, and maintaining display of the avatar corresponding to the user of the second electronic device in the first computer-generated environment.

Additionally or alternatively, in some examples, the third type of content is content that includes two-dimensional content configured to be displayed in the second object in the first computer-generated environment.

Additionally or alternatively, in some examples, before receiving the first indication corresponding to the request from the second electronic device to share content with the first electronic device, the first computer-generated environment includes a respective object. In some examples, after receiving the first indication and after the request has been accepted, in accordance with the determination that the content shared with the first electronic device is the third type of content, the respective object is no longer displayed in the first computer-generated environment.

Additionally or alternatively, in some examples, the method further comprises, in response to receiving the first indication, in accordance with a determination that the request is accepted, in accordance with a determination that the content shared with the first electronic device is a fourth type of content, different from the first type of content, the second type of content, and the third type of content: updating display of the first computer-generated environment to include a third object, different from the first object and the second object, corresponding to the content; and maintaining display of the avatar corresponding to the user of the second electronic device in the first computer-generated environment.

Additionally or alternatively, in some examples, the fourth type of content is an application object associated with an application running on the second electronic device, the application object is configured to display second content, and the third object corresponds to the application object in the first computer-generated environment.

Additionally or alternatively, in some examples, the method further comprises: after replacing display of the first computer-generated environment with the second computer-generated environment corresponding to the content and displaying the avatar corresponding to the user of the second electronic device in the second computer-generated environment in accordance with the determination that the content shared with the first electronic device is the first type of content, receiving, via the one or more input devices, a second input corresponding to a request to navigate away from the second computer-generated environment corresponding to the content; and in response to receiving the second input, replacing display of the second computer-generated environment with the first computer-generated environment, and forgoing display of the avatar corresponding to the user of the second electronic device in the first computer-generated environment.

Additionally or alternatively, in some examples, the method further comprises: while displaying the first computer-generated environment that does not include the avatar corresponding to the user of the second electronic device, receiving a second indication that the second electronic device is no longer displaying the second computer-generated environment; and in response to detecting the second indication, redisplaying the avatar corresponding to the user of the second electronic device in the first computer-generated environment.

Additionally or alternatively, in some examples, the method further comprises: after updating display of the first computer-generated environment to include the first object corresponding to the content and ceasing display of the avatar corresponding to the user of the second electronic device in the first computer-generated environment in accordance with the determination that the content shared with the first electronic device is the second type of content, receiving, via the one or more input devices, a second input corresponding to a request to cease display of the first object corresponding to the content; and in response to receiving the second input, ceasing display of the first object corresponding to the content in the first computer-generated environment, and forgoing redisplay of the avatar corresponding to the user of the second electronic device in the first computer-generated environment.

Additionally or alternatively, in some examples, the method further comprises: while displaying the first computer-generated environment that does not include the avatar corresponding to the user of the second electronic device, receiving a second indication that the second electronic device is no longer displaying the first object in the first computer-generated environment; and in response to detecting the second indication, redisplaying the avatar corresponding to the user of the second electronic device in the first computer-generated environment.

Additionally or alternatively, in some examples, when the first indication corresponding to the request from the second electronic device to share content with the first electronic device is received, the content is displayed at the second electronic device.

Additionally or alternatively, in some examples, the method further comprises: while displaying the first computer-generated environment including the avatar corresponding to the user of the second electronic device and before receiving the first indication corresponding to the request from the second electronic device to share content with the first electronic device, receiving, via the one or more input devices, a respective indication that the second electronic device is presenting content; and in response to receiving the respective indication, in accordance with a determination that the content presented at the second electronic device is the first type of content, ceasing display of the avatar corresponding to the user of the second electronic device in the first computer-generated environment, and in accordance with a determination that the content presented at the second electronic device is the second type of content, ceasing display of the avatar corresponding to the user of the second electronic device in the first computer-generated environment.

Additionally or alternatively, in some examples, the method further comprises, in response to receiving the respective indication: in accordance with a determination that the content presented at the second electronic device is a third type of content, different from the first type and the second type of content, ceasing display of the avatar corresponding to the user of the second electronic device in the first computer-generated environment; and in accordance with a determination that the content presented at the second electronic device is a fourth type of content, different from the first type, the second type, and the third type of content, maintaining display of the avatar corresponding to the user of the second electronic device in the first computer-generated environment.

Some examples of the disclosure are directed to an electronic device, comprising one or more processors, memory, and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising one or more processors, memory, and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:
    at a first electronic device in communication with a display, one or more input devices, and a second electronic device:
        while in a communication session with the second electronic device, presenting, via the display, a first computer-generated environment including an avatar corresponding to a user of the second electronic device;
        while displaying the first computer-generated environment including the avatar corresponding to the user of the second electronic device, receiving, via the one or more input devices, a first indication corresponding to a request from the second electronic device to share content with the first electronic device; and
        in response to receiving the first indication:
            in accordance with a determination that the request is accepted:
                in accordance with a determination that the content shared with the first electronic device is a first type of content:
                    replacing display of the first computer-generated environment with a second computer-generated environment corresponding to the content; and
                    displaying the avatar corresponding to the user of the second electronic device in the second computer-generated environment; and
                in accordance with a determination that the content shared with the first electronic device is a second type of content, different from the first type of content:
                    updating display of the first computer-generated environment to include a first object corresponding to the content; and
                    ceasing display of the avatar corresponding to the user of the second electronic device in the first computer-generated environment.

2. The method of claim 1, wherein displaying the avatar corresponding to the user of the second electronic device includes presenting audio corresponding to a voice of the user of the second electronic device, the method further comprising:
    in accordance with the determination that the content shared with the first electronic device is the second type of content, different from the first type of content, maintaining presentation of the audio corresponding to the voice of the user of the second electronic device in the first computer-generated environment after ceasing display of the avatar corresponding to the user of the second electronic device;
    wherein:
        presenting the audio corresponding to the voice of the user of the second electronic device includes presenting spatial audio corresponding to the voice of the user of the second electronic device in the first computer-generated environment; and
        in accordance with the determination that the content shared with the first electronic device is the second type of content, the audio corresponding to the voice of the user of the second electronic device presented in the first computer-generated environment is non-spatial audio.

3. The method of claim 1, wherein the first type of content is content that includes a three-dimensional immersive environment, and the second computer-generated environment corresponding to the content is a representation of the three-dimensional immersive environment, the method further comprising:

while displaying the second computer-generated environment, detecting, via the one or more input devices, movement of the first electronic device in a physical environment surrounding the first electronic device from a first location to a second location; and in response to detecting the movement of the first electronic device:

changing a location of a viewpoint of the user of the first electronic device in the second computer-generated environment from a first respective location to a second respective location, wherein the second respective location in the second computer-generated environment is based on the second location in the physical environment; and maintaining display of the avatar corresponding to the user of the second electronic device in the second computer-generated environment.

4. The method of claim 1, wherein the second type of content is content that includes a viewpoint-limited three-dimensional immersive video, scene, or environment, and the first object corresponding to the content is a representation of the viewpoint-limited three-dimensional immersive video, scene, or environment, the method further comprising:

while displaying the first computer-generated environment including the first object, detecting, via the one or more input devices, movement of a respective portion of the user of the first electronic device from a first pose to a second pose; and in response to detecting the movement of the respective portion of the user:

changing a viewpoint of the first object in the first computer-generated environment from a first viewpoint to a second viewpoint, different from the first viewpoint, wherein the second viewpoint is based on the second pose of the respective portion of the user; and restricting changing a location of the viewpoint of the user of the first electronic device in the first computer-generated environment.

5. The method of claim 1, further comprising:
in response to receiving the first indication:
in accordance with a determination that the request is accepted:
in accordance with a determination that the content shared with the first electronic device is a third type of content, different from the first type of content and the second type of content:
updating display of the first computer-generated environment to include a second object, different from the first object, corresponding to the content; and
maintaining display of the avatar corresponding to the user of the second electronic device in the first computer-generated environment.

6. The method of claim 5, wherein:
the third type of content is content that includes two-dimensional content configured to be displayed in the second object in the first computer-generated environment; or the third type of content is an application object associated with an application running on the second electronic device, the application object configured to display second content.

7. The method of claim 1, further comprising:
after replacing display of the first computer-generated environment with the second computer-generated environment corresponding to the content and displaying the avatar corresponding to the user of the second electronic device in the second computer-generated environment in accordance with the determination that the content shared with the first electronic device is the first type of content, receiving, via the one or more input devices, a second input corresponding to a request to navigate away from the second computer-generated environment corresponding to the content; and in response to receiving the second input:
replacing display of the second computer-generated environment with the first computer-generated environment; and
forgoing display of the avatar corresponding to the user of the second electronic device in the first computer-generated environment.

8. The method of claim 1, further comprising:
after updating display of the first computer-generated environment to include the first object corresponding to the content and ceasing display of the avatar corresponding to the user of the second electronic device in the first computer-generated environment in accordance with the determination that the content shared with the first electronic device is the second type of content, receiving, via the one or more input devices, a second input corresponding to a request to cease display of the first object corresponding to the content; and in response to receiving the second input:
ceasing display of the first object corresponding to the content in the first computer-generated environment; and
forgoing redisplay of the avatar corresponding to the user of the second electronic device in the first computer-generated environment.

9. A first electronic device comprising:
one or more processors;
memory; and
one or more programs stored in the memory and configured to be executed by the one or more processors, the one or more programs including instructions for performing a method comprising:
while in a communication session with a second electronic device, presenting, via a display, a first computer-generated environment including an avatar corresponding to a user of the second electronic device;
while displaying the first computer-generated environment including the avatar corresponding to the user of the second electronic device, receiving, via one or more input devices, a first indication corresponding to a request from the second electronic device to share content with the first electronic device; and
in response to receiving the first indication:
in accordance with a determination that the request is accepted:
in accordance with a determination that the content shared with the first electronic device is a first type of content:

replacing display of the first computer-generated environment with a second computer-generated environment corresponding to the content; and displaying the avatar corresponding to the user of the second electronic device in the second computer-generated environment; and in accordance with a determination that the content shared with the first electronic device is a second type of content, different from the first type of content:

updating display of the first computer-generated environment to include a first object corresponding to the content; and ceasing display of the avatar corresponding to the user of the second electronic device in the first computer-generated environment.

10. The first electronic device of claim 9, wherein displaying the avatar corresponding to the user of the second electronic device includes presenting audio corresponding to a voice of the user of the second electronic device, the method further comprising:

in accordance with the determination that the content shared with the first electronic device is the second type of content, different from the first type of content, maintaining presentation of the audio corresponding to the voice of the user of the second electronic device in the first computer-generated environment after ceasing display of the avatar corresponding to the user of the second electronic device;

wherein:

presenting the audio corresponding to the voice of the user of the second electronic device includes presenting spatial audio corresponding to the voice of the user of the second electronic device in the first computer-generated environment; and in accordance with the determination that the content shared with the first electronic device is the second type of content, the audio corresponding to the voice of the user of the second electronic device presented in the first computer-generated environment is non-spatial audio.

11. The first electronic device of claim 9, wherein the first type of content is content that includes a three-dimensional immersive environment, and the second computer-generated environment corresponding to the content is a representation of the three-dimensional immersive environment, the method further comprising:

while displaying the second computer-generated environment, detecting, via the one or more input devices, movement of the first electronic device in a physical environment surrounding the first electronic device from a first location to a second location; and in response to detecting the movement of the first electronic device:

changing a location of a viewpoint of the user of the first electronic device in the second computer-generated environment from a first respective location to a second respective location, wherein the second respective location in the second computer-generated environment is based on the second location in the physical environment; and maintaining display of the avatar corresponding to the user of the second electronic device in the second computer-generated environment.

12. The first electronic device of claim 9, wherein the second type of content is content that includes a viewpoint-limited three-dimensional immersive video, scene, or environment, and the first object corresponding to the content is a representation of the viewpoint-limited three-dimensional immersive video, scene, or environment, the method further comprising:

while displaying the first computer-generated environment including the first object, detecting, via the one or more input devices, movement of a respective portion of the user of the first electronic device from a first pose to a second pose; and in response to detecting the movement of the respective portion of the user:

changing a viewpoint of the first object in the first computer-generated environment from a first viewpoint to a second viewpoint, different from the first viewpoint, wherein the second viewpoint is based on the second pose of the respective portion of the user; and restricting changing a location of the viewpoint of the user of the first electronic device in the first computer-generated environment.

13. The first electronic device of claim 9, wherein the method further comprises:

in response to receiving the first indication:

in accordance with a determination that the request is accepted:

in accordance with a determination that the content shared with the first electronic device is a third type of content, different from the first type of content and the second type of content:

updating display of the first computer-generated environment to include a second object, different from the first object, corresponding to the content; and maintaining display of the avatar corresponding to the user of the second electronic device in the first computer-generated environment.

14. The first electronic device of claim 13, wherein:

the third type of content is content that includes two-dimensional content configured to be displayed in the second object in the first computer-generated environment; or the third type of content is an application object associated with an application running on the second electronic device, the application object configured to display second content.

15. The first electronic device of claim 9, wherein the method further comprises:

after replacing display of the first computer-generated environment with the second computer-generated environment corresponding to the content and displaying the avatar corresponding to the user of the second electronic device in the second computer-generated environment in accordance with the determination that the content shared with the first electronic device is the first type of content, receiving, via the one or more input devices, a second input corresponding to a request to navigate away from the second computer-generated environment corresponding to the content; and in response to receiving the second input:

replacing display of the second computer-generated environment with the first computer-generated environment; and forgoing display of the avatar corresponding to the user of the second electronic device in the first computer-generated environment.

16. The first electronic device of claim 9, wherein the method further comprises:
- after updating display of the first computer-generated environment to include the first object corresponding to the content and ceasing display of the avatar corresponding to the user of the second electronic device in the first computer-generated environment in accordance with the determination that the content shared with the first electronic device is the second type of content, receiving, via the one or more input devices, a second input corresponding to a request to cease display of the first object corresponding to the content; and
- in response to receiving the second input:
  - ceasing display of the first object corresponding to the content in the first computer-generated environment; and
  - forgoing redisplay of the avatar corresponding to the user of the second electronic device in the first computer-generated environment.

17. A non-transitory computer readable storage medium storing one or more programs, the one or more programs comprising instructions, which when executed by one or more processors of a first electronic device, cause the first electronic device to perform a method comprising:
- while in a communication session with a second electronic device, presenting, via a display, a first computer-generated environment including an avatar corresponding to a user of the second electronic device;
- while displaying the first computer-generated environment including the avatar corresponding to the user of the second electronic device, receiving, via one or more input devices, a first indication corresponding to a request from the second electronic device to share content with the first electronic device; and
- in response to receiving the first indication:
  - in accordance with a determination that the request is accepted:
    - in accordance with a determination that the content shared with the first electronic device is a first type of content:
      - replacing display of the first computer-generated environment with a second computer-generated environment corresponding to the content; and
      - displaying the avatar corresponding to the user of the second electronic device in the second computer-generated environment; and
    - in accordance with a determination that the content shared with the first electronic device is a second type of content, different from the first type of content:
      - updating display of the first computer-generated environment to include a first object corresponding to the content; and
      - ceasing display of the avatar corresponding to the user of the second electronic device in the first computer-generated environment.

18. The non-transitory computer readable storage medium of claim 17, wherein the method further comprises:
- in response to receiving the first indication:
  - in accordance with a determination that the request is accepted:
    - in accordance with a determination that the content shared with the first electronic device is a third type of content, different from the first type of content and the second type of content:
      - updating display of the first computer-generated environment to include a second object, different from the first object, corresponding to the content; and
      - maintaining display of the avatar corresponding to the user of the second electronic device in the first computer-generated environment.

19. The non-transitory computer readable storage medium of claim 18, wherein:
- the third type of content is content that includes two-dimensional content configured to be displayed in the second object in the first computer-generated environment; or
- the third type of content is an application object associated with an application running on the second electronic device, the application object configured to display second content.

20. The non-transitory computer readable storage medium of claim 17, wherein the method further comprises:
- after replacing display of the first computer-generated environment with the second computer-generated environment corresponding to the content and displaying the avatar corresponding to the user of the second electronic device in the second computer-generated environment in accordance with the determination that the content shared with the first electronic device is the first type of content, receiving, via the one or more input devices, a second input corresponding to a request to navigate away from the second computer-generated environment corresponding to the content; and
- in response to receiving the second input:
  - replacing display of the second computer-generated environment with the first computer-generated environment; and
  - forgoing display of the avatar corresponding to the user of the second electronic device in the first computer-generated environment.

* * * * *